(12) United States Patent
Leeman et al.

(10) Patent No.: US 10,545,305 B2
(45) Date of Patent: Jan. 28, 2020

(54) DISTRIBUTION DEVICE WITH INCREMENTALLY ADDED SPLITTERS

(71) Applicant: COMMSCOPE CONNECTIVITY BELGIUM BVBA, Kessel-Lo (BE)

(72) Inventors: Samuel Leeman, Kessel-Lo (BE); David Jan Irma Van Baelen, Winksele (BE); Stephane Collart, Olen (BE); Vincent Francois Michel Cnops, Gelrode (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/042,511

(22) Filed: Jul. 23, 2018

(65) Prior Publication Data

US 2019/0056559 A1    Feb. 21, 2019

Related U.S. Application Data

(63) Continuation of application No. 14/653,888, filed as application No. PCT/EP2013/077292 on Dec. 19, 2013, now Pat. No. 10,031,305.

(Continued)

(51) Int. Cl.
*G02B 6/44* (2006.01)

(52) U.S. Cl.
CPC ......... *G02B 6/4452* (2013.01); *G02B 6/4454* (2013.01); *G02B 6/4457* (2013.01)

(58) Field of Classification Search
CPC .................... G02B 6/444; G02B 6/4452–4455

(Continued)

(56) References Cited

U.S. PATENT DOCUMENTS

| 1,276,825 A | 8/1918 | Swope |
| 1,442,999 A | 1/1923 | Boyle |

(Continued)

FOREIGN PATENT DOCUMENTS

| AU | 2008264211 A1 | 1/2009 |
| CN | 1799296 A | 7/2006 |

(Continued)

OTHER PUBLICATIONS

7 Inch Modules, ADC Telecommunications, Inc, © 1998, "7 Inch Connector Module with IFC", pp. 127.

(Continued)

*Primary Examiner* — Robert Tavlykaev
(74) *Attorney, Agent, or Firm* — Merchant & Gould P.C.

(57) ABSTRACT

A fiber distribution system (10) includes a fiber distribution hub (20, 300); at least one fiber distribution terminal (30, 100); and a cable (40) wrapped around a spool (110) of the fiber distribution terminal (30, 100). The fiber distribution terminal (30, 100) includes a spool (110) and a management tray (120) that rotate together. A second connectorized end (40b) of the cable (40) is held at a fiber optic adapter (125) on the tray (120). After dispensing the first connectorized end (40a) to the hub (20), an optical splitter (70, 130, 140) can be mounted to the tray (120). The splitter (26, 70, 130, 140, 306) has output adapters at which patch cords (50) can be inserted to connect subscribers to the system. The fiber distribution hub can use the same format of splitters (26, 70, 130, 140, 306). Other distributed splitter systems are provided with splicing and/or adding of splitters as needed.

7 Claims, 54 Drawing Sheets

Related U.S. Application Data

(60) Provisional application No. 61/739,461, filed on Dec. 19, 2012, provisional application No. 61/840,832, filed on Jun. 28, 2013, provisional application No. 61/883,320, filed on Sep. 27, 2013, provisional application No. 61/908,054, filed on Nov. 23, 2013.

(58) Field of Classification Search
USPC .................................................. 385/134–137
See application file for complete search history.

(56) References Cited

U.S. PATENT DOCUMENTS

| | | |
|---|---|---|
| 1,446,410 A | 2/1923 | Bennett et al. |
| 1,474,580 A | 11/1923 | Clark et al. |
| RE20,995 E | 2/1939 | Beasley |
| 2,282,156 A | 5/1942 | Benes |
| 2,502,496 A | 4/1950 | Wickman |
| 2,521,226 A | 9/1950 | Keller |
| 2,727,703 A | 12/1955 | Bonnett |
| 2,767,426 A | 10/1956 | Grupp |
| 3,131,729 A | 5/1964 | Leysinger |
| 3,346,705 A | 10/1967 | Slinkard et al. |
| 3,433,579 A | 3/1969 | Runnion |
| 3,612,424 A | 10/1971 | Friedel |
| 3,657,491 A | 4/1972 | Ryder et al. |
| 3,667,417 A | 6/1972 | Clinkenbeard |
| 3,837,448 A | 9/1974 | Hagstrom |
| 3,920,308 A | 11/1975 | Murray |
| 3,940,086 A | 2/1976 | Stoquelet |
| 3,983,977 A | 10/1976 | Crabb |
| 4,053,118 A | 10/1977 | Aikins |
| 4,081,258 A | 3/1978 | Goell et al. |
| 4,143,746 A | 3/1979 | Lowery |
| 4,201,278 A | 5/1980 | Balde |
| 4,384,688 A | 5/1983 | Smith |
| 4,470,558 A | 9/1984 | Stamper |
| 4,520,239 A | 5/1985 | Schwartz |
| 4,587,801 A | 5/1986 | Missout et al. |
| 4,635,875 A | 1/1987 | Apple |
| 4,650,933 A | 3/1987 | Benda et al. |
| 4,657,140 A | 4/1987 | Zagar et al. |
| 4,666,237 A | 5/1987 | Mallinson |
| 4,767,073 A | 8/1988 | Malzacher |
| 4,768,961 A | 9/1988 | Lau |
| 4,770,639 A | 9/1988 | Lau |
| 4,797,114 A | 1/1989 | Lau |
| 4,820,200 A | 4/1989 | Lau |
| 4,840,568 A | 6/1989 | Burroughs et al. |
| 4,869,437 A | 9/1989 | Berz et al. |
| 4,883,337 A | 11/1989 | Dahlgren |
| 4,913,369 A | 4/1990 | Lia et al. |
| 4,939,798 A | 7/1990 | Last |
| 4,940,859 A | 7/1990 | Peterson |
| 4,953,194 A | 8/1990 | Hansen et al. |
| 4,953,810 A | 9/1990 | Stadig |
| 4,968,929 A | 11/1990 | Hauck et al. |
| 4,978,310 A | 12/1990 | Shichida |
| 5,016,554 A | 5/1991 | Harris, Jr. et al. |
| 5,052,940 A | 10/1991 | Bengal |
| 5,066,149 A | 11/1991 | Wheeler et al. |
| 5,066,256 A | 11/1991 | Ward, Sr. |
| 5,071,211 A | 12/1991 | Debortoli |
| 5,074,863 A | 12/1991 | Dines |
| 5,100,221 A | 3/1992 | Carney et al. |
| 5,107,532 A | 4/1992 | Hansen et al. |
| 5,161,988 A | 11/1992 | Krupka |
| 5,166,970 A | 11/1992 | Ward |
| 5,167,001 A | 11/1992 | Debortoli et al. |
| 5,172,841 A | 12/1992 | Friedman |
| 5,185,843 A | 2/1993 | Aberson et al. |
| 5,189,410 A | 2/1993 | Kosugi et al. |
| 5,199,878 A | 4/1993 | Dewey et al. |
| 5,214,673 A | 5/1993 | Morgenstern et al. |
| 5,222,164 A | 6/1993 | Bass, Sr. et al. |
| 5,246,377 A | 9/1993 | Kawahara et al. |
| 5,265,187 A | 11/1993 | Morin et al. |
| 5,265,815 A | 11/1993 | Soyka et al. |
| 5,280,861 A | 1/1994 | Corriveau |
| 5,305,405 A | 4/1994 | Emmons et al. |
| 5,310,356 A | 5/1994 | Obata et al. |
| 5,317,663 A | 5/1994 | Beard et al. |
| 5,326,040 A | 7/1994 | Kramer |
| 5,335,874 A | 8/1994 | Shrum et al. |
| 5,339,379 A | 8/1994 | Kutsch et al. |
| 5,353,367 A | 10/1994 | Czosnowski et al. |
| 5,363,465 A | 11/1994 | Korkowski et al. |
| 5,393,249 A | 2/1995 | Morgenstern et al. |
| 5,394,503 A | 2/1995 | Dietz, Jr. et al. |
| 5,413,494 A | 5/1995 | Dewey et al. |
| 5,418,334 A | 5/1995 | Williams |
| 5,419,717 A | 5/1995 | Abendschein et al. |
| 5,432,875 A | 7/1995 | Korkowski et al. |
| 5,434,944 A | 7/1995 | Kerry et al. |
| 5,448,015 A | 9/1995 | Jamet et al. |
| 5,448,675 A | 9/1995 | Leone et al. |
| 5,467,062 A | 11/1995 | Burroughs et al. |
| 5,473,715 A | 12/1995 | Schofield et al. |
| 5,483,467 A | 1/1996 | Krupka et al. |
| 5,490,229 A | 2/1996 | Ghandeharizadeh et al. |
| 5,494,234 A | 2/1996 | Kramer |
| 5,494,446 A | 2/1996 | DeLucia et al. |
| 5,497,444 A | 3/1996 | Wheeler |
| 5,519,275 A | 5/1996 | Scott et al. |
| 5,522,561 A | 6/1996 | Koyamatsu et al. |
| 5,528,453 A | 6/1996 | Berman et al. |
| 5,544,836 A | 8/1996 | Pera |
| 5,551,545 A | 9/1996 | Gelfman |
| 5,582,525 A | 12/1996 | Louwagie et al. |
| 5,613,030 A | 3/1997 | Hoffer et al. |
| 5,627,925 A | 5/1997 | Alferness et al. |
| 5,638,481 A | 6/1997 | Arnett |
| 5,657,412 A | 8/1997 | Caudrelier |
| 5,685,741 A | 11/1997 | Dewey et al. |
| 5,694,511 A | 12/1997 | Pimpinella et al. |
| 5,701,380 A | 12/1997 | Larson et al. |
| 5,703,990 A | 12/1997 | Robertson et al. |
| 5,709,347 A | 1/1998 | Hoffmann et al. |
| 5,712,942 A | 1/1998 | Jennings et al. |
| 5,717,810 A | 2/1998 | Wheeler |
| 5,718,397 A | 2/1998 | Stevens |
| 5,734,774 A | 3/1998 | Morrell |
| 5,740,298 A * | 4/1998 | Macken ............... G02B 6/4471 385/135 |
| 5,749,148 A | 5/1998 | White, III et al. |
| 5,768,463 A * | 6/1998 | Foss .................... G02B 6/4442 206/557 |
| 5,773,757 A | 6/1998 | Kenney et al. |
| 5,787,219 A | 7/1998 | Mueller et al. |
| 5,821,510 A | 10/1998 | Cohen et al. |
| 5,854,824 A | 12/1998 | Bengal et al. |
| 5,915,640 A | 6/1999 | Wagter et al. |
| 5,946,440 A | 8/1999 | Puetz |
| 5,957,401 A | 9/1999 | O'Donnell |
| 5,987,203 A | 11/1999 | Abel et al. |
| 5,987,207 A | 11/1999 | Hoke |
| 5,992,787 A | 11/1999 | Burke |
| 6,002,331 A | 12/1999 | Laor |
| 6,035,032 A | 3/2000 | Daoud |
| 6,061,492 A * | 5/2000 | Strause ............... G02B 6/4452 385/134 |
| 6,077,108 A | 6/2000 | Lorscheider et al. |
| 6,095,837 A | 8/2000 | David et al. |
| 6,116,961 A | 9/2000 | Henneberger et al. |
| 6,135,254 A | 10/2000 | Liao |
| 6,176,559 B1 | 1/2001 | Tiramani et al. |
| 6,208,796 B1 | 3/2001 | Williams Vigliaturo |
| 6,215,938 B1 | 4/2001 | Reitmeier et al. |
| 6,220,413 B1 | 4/2001 | Walters et al. |
| 6,220,762 B1 | 4/2001 | Kanai et al. |
| 6,222,908 B1 | 4/2001 | Bartolutti et al. |
| 6,222,975 B1 | 4/2001 | Gilbert et al. |
| 6,223,675 B1 | 5/2001 | Watt et al. |
| 6,226,111 B1 | 5/2001 | Chang et al. |

(56) References Cited

U.S. PATENT DOCUMENTS

| | | |
|---|---|---|
| 6,234,830 B1 | 5/2001 | Ensz et al. |
| 6,238,235 B1 | 5/2001 | Shavit et al. |
| 6,263,136 B1 | 7/2001 | Jennings et al. |
| 6,285,293 B1 | 9/2001 | German et al. |
| 6,286,777 B1 | 9/2001 | Black |
| 6,300,877 B1 | 10/2001 | Schannach et al. |
| 6,307,998 B2 | 10/2001 | Williams Vigliaturo |
| 6,315,598 B1 | 11/2001 | Elliot et al. |
| 6,328,608 B1 | 12/2001 | Olson et al. |
| 6,330,148 B1 | 12/2001 | Won et al. |
| 6,330,307 B1 | 12/2001 | Bloch et al. |
| 6,349,893 B1 | 2/2002 | Daoud |
| 6,350,148 B1 | 2/2002 | Bartolutti et al. |
| 6,361,360 B1 | 3/2002 | Hwang et al. |
| 6,363,183 B1 | 3/2002 | Koh |
| 6,367,347 B1 | 4/2002 | Blaschke et al. |
| 6,370,294 B1 | 4/2002 | Pfeiffer et al. |
| 6,418,262 B1 | 7/2002 | Puetz et al. |
| 6,419,175 B1 | 7/2002 | Rankin, VI |
| 6,421,322 B1 | 7/2002 | Koziy et al. |
| 6,424,710 B1 | 7/2002 | Bartolutti et al. |
| 6,424,781 B1 * | 7/2002 | Puetz ............ G02B 6/4452 385/135 |
| 6,427,035 B1 | 7/2002 | Mahony |
| 6,433,274 B1 | 8/2002 | Doss et al. |
| 6,456,768 B1 | 9/2002 | Boncek et al. |
| D466,479 S | 12/2002 | Pein et al. |
| 6,494,396 B2 | 12/2002 | Sugata |
| 6,499,861 B1 | 12/2002 | German et al. |
| 6,507,691 B1 | 1/2003 | Hunsinger et al. |
| 6,511,231 B2 | 1/2003 | Lampert et al. |
| 6,511,330 B1 | 1/2003 | Norris |
| 6,522,737 B1 | 2/2003 | Bartolutti et al. |
| 6,522,826 B2 | 2/2003 | Gregory |
| 6,532,332 B2 | 3/2003 | Solheid et al. |
| 6,533,216 B1 | 3/2003 | Bumgarner et al. |
| 6,535,682 B1 | 3/2003 | Puetz et al. |
| 6,554,221 B2 | 4/2003 | Hinds |
| 6,554,484 B2 | 4/2003 | Lampert |
| 6,554,652 B1 | 4/2003 | Musolf et al. |
| 6,556,738 B2 | 4/2003 | Pfeiffer et al. |
| 6,556,763 B1 | 4/2003 | Puetz et al. |
| 6,574,586 B1 | 6/2003 | David et al. |
| 6,579,014 B2 | 6/2003 | Melton et al. |
| 6,591,051 B2 | 7/2003 | Solheid et al. |
| 6,599,024 B2 | 7/2003 | Zimmel |
| 6,614,953 B2 | 9/2003 | Strasser et al. |
| 6,616,080 B1 | 9/2003 | Edwards et al. |
| 6,616,459 B2 | 9/2003 | Norris |
| 6,626,697 B1 | 9/2003 | Martin et al. |
| 6,632,106 B2 | 10/2003 | Musolf et al. |
| 6,636,152 B2 | 10/2003 | Schannach et al. |
| RE38,311 E | 11/2003 | Wheeler |
| 6,643,443 B2 | 11/2003 | Holman et al. |
| 6,647,197 B1 | 11/2003 | Marrs et al. |
| 6,668,108 B1 | 12/2003 | Helkey et al. |
| 6,669,129 B1 | 12/2003 | Shah |
| 6,684,179 B1 | 1/2004 | David |
| 6,688,780 B2 | 2/2004 | Duran |
| 6,711,339 B2 | 3/2004 | Puetz et al. |
| 6,715,619 B2 | 4/2004 | Kim et al. |
| 6,719,382 B2 | 4/2004 | Sucharczuk et al. |
| 6,721,484 B1 | 4/2004 | Blankenship et al. |
| 6,725,177 B2 | 4/2004 | David et al. |
| 6,743,044 B2 | 6/2004 | Musolf et al. |
| 6,745,971 B1 | 6/2004 | Renzoni |
| 6,758,314 B2 | 7/2004 | Woodruff |
| 6,760,530 B1 | 7/2004 | Mandry |
| 6,760,531 B1 | 7/2004 | Solheid et al. |
| 6,761,594 B2 | 7/2004 | Johnsen et al. |
| 6,792,191 B1 | 9/2004 | Clapp, Jr. et al. |
| 6,793,408 B2 | 9/2004 | Levy et al. |
| 6,802,735 B2 | 10/2004 | Pepe et al. |
| 6,808,116 B1 | 10/2004 | Eslambolchi et al. |
| 6,810,193 B1 | 10/2004 | Mueller |
| 6,814,624 B2 | 11/2004 | Clark et al. |
| 6,819,854 B1 | 11/2004 | Young et al. |
| 6,822,874 B1 | 11/2004 | Marler |
| 6,824,312 B2 | 11/2004 | McClellan et al. |
| 6,830,465 B2 | 12/2004 | Norris et al. |
| 6,832,035 B1 | 12/2004 | Daoud et al. |
| 6,834,517 B2 | 12/2004 | Sheehy, Jr. |
| 6,845,207 B2 | 1/2005 | Schray |
| 6,848,952 B2 | 2/2005 | Norris |
| 6,850,685 B2 | 2/2005 | Tinucci et al. |
| 6,856,748 B1 | 2/2005 | Elkins, II et al. |
| 6,863,446 B2 | 3/2005 | Ngo |
| 6,885,798 B2 | 4/2005 | Zimmel |
| 6,885,799 B2 | 4/2005 | Lee |
| 6,890,187 B2 | 5/2005 | Norris |
| 6,898,368 B2 | 5/2005 | Colombo et al. |
| 6,901,200 B2 | 5/2005 | Schray |
| 6,905,363 B2 | 6/2005 | Musolf et al. |
| 6,915,058 B2 | 7/2005 | Pons |
| 6,932,517 B2 | 8/2005 | Swayze et al. |
| 6,933,441 B2 | 8/2005 | Fuller et al. |
| 6,937,725 B2 | 8/2005 | Liao |
| 6,937,807 B2 | 8/2005 | Franklin et al. |
| D510,068 S | 9/2005 | Haggay et al. |
| 6,944,387 B2 | 9/2005 | Howell et al. |
| 6,948,680 B2 | 9/2005 | Ganster |
| 6,961,675 B2 | 11/2005 | David |
| 6,971,895 B2 | 12/2005 | Sago et al. |
| 6,976,867 B2 | 12/2005 | Navarro et al. |
| 6,983,095 B2 | 1/2006 | Reagan et al. |
| 6,997,410 B1 | 2/2006 | Huang |
| 7,000,863 B2 | 2/2006 | Bethea et al. |
| 7,011,538 B2 | 3/2006 | Chang |
| 7,016,590 B2 | 3/2006 | Tanaka et al. |
| 7,017,721 B1 | 3/2006 | Bradford et al. |
| 7,027,704 B2 | 4/2006 | Frohlich et al. |
| 7,029,322 B2 | 4/2006 | Ernst et al. |
| 7,036,601 B2 | 5/2006 | Berg et al. |
| 7,050,041 B1 | 5/2006 | Smith et al. |
| 7,052,281 B1 | 5/2006 | Meyberg et al. |
| 7,077,710 B2 | 7/2006 | Haggay et al. |
| 7,081,808 B2 | 7/2006 | Colombo et al. |
| 7,112,090 B2 | 9/2006 | Caveney et al. |
| 7,118,284 B2 | 10/2006 | Nakajima et al. |
| 7,123,810 B2 | 10/2006 | Parrish |
| 7,139,461 B2 | 11/2006 | Puetz et al. |
| 7,142,764 B2 | 11/2006 | Allen et al. |
| 7,149,398 B2 | 12/2006 | Solheid et al. |
| 7,153,142 B2 | 12/2006 | Shifris et al. |
| 7,165,728 B2 | 1/2007 | Durrant et al. |
| 7,190,874 B1 | 3/2007 | Barth et al. |
| 7,193,422 B2 | 3/2007 | Velleca et al. |
| 7,194,181 B2 | 3/2007 | Holmberg et al. |
| 7,210,858 B2 | 5/2007 | Sago et al. |
| 7,218,827 B2 | 5/2007 | Vongseng et al. |
| 7,218,828 B2 | 5/2007 | Feustel et al. |
| 7,220,144 B2 | 5/2007 | Elliot et al. |
| 7,226,217 B1 | 6/2007 | Benton et al. |
| 7,233,731 B2 | 6/2007 | Solheid et al. |
| 7,234,944 B2 | 6/2007 | Nordin et al. |
| 7,297,018 B2 | 11/2007 | Caveney et al. |
| 7,303,220 B2 | 12/2007 | Zellak |
| 7,306,101 B2 | 12/2007 | Murry |
| 7,310,474 B2 | 12/2007 | Kanasaki et al. |
| 7,312,715 B2 | 12/2007 | Shalts et al. |
| D559,186 S | 1/2008 | Kelmer |
| 7,315,224 B2 | 1/2008 | Gurovich et al. |
| 7,315,681 B2 | 1/2008 | Kewitsch |
| 7,333,606 B1 | 2/2008 | Swam et al. |
| 7,333,706 B2 | 2/2008 | Parikh et al. |
| 7,346,253 B2 | 3/2008 | Bloodsworth et al. |
| 7,346,254 B2 | 3/2008 | Kramer et al. |
| 7,352,289 B1 | 4/2008 | Harris |
| 7,364,108 B2 | 4/2008 | Kim et al. |
| 7,369,739 B2 | 5/2008 | Kline et al. |
| 7,370,106 B2 | 5/2008 | Caveney |
| 7,376,322 B2 | 5/2008 | Zimmel et al. |
| 7,376,323 B2 | 5/2008 | Zimmel |
| 7,397,997 B2 | 7/2008 | Ferris et al. |

(56) References Cited

U.S. PATENT DOCUMENTS

| | | |
|---|---|---|
| 7,400,813 B2 | 7/2008 | Zimmel |
| 7,400,814 B1 | 7/2008 | Hendrickson et al. |
| 7,406,242 B1 | 7/2008 | Braga |
| 7,418,181 B2 | 8/2008 | Zimmel et al. |
| 7,418,184 B1 | 8/2008 | Gonzales et al. |
| 7,453,706 B2 | 11/2008 | Clark et al. |
| 7,470,068 B2 | 12/2008 | Kahle et al. |
| 7,477,829 B2 | 1/2009 | Kaplan |
| 7,479,032 B2 | 1/2009 | Hoath et al. |
| 7,495,931 B2 | 2/2009 | Clark et al. |
| 7,509,016 B2 * | 3/2009 | Smith .............. H04Q 1/142 385/135 |
| 7,519,000 B2 | 4/2009 | Caveney et al. |
| 7,522,806 B2 | 4/2009 | Hendrickson et al. |
| 7,533,841 B1 | 5/2009 | Harrison et al. |
| 7,534,137 B2 | 5/2009 | Caveney et al. |
| 7,536,075 B2 | 5/2009 | Zimmel |
| 7,546,018 B2 | 6/2009 | Hendrickson et al. |
| 7,552,872 B2 | 6/2009 | Tokita et al. |
| 7,570,861 B2 | 8/2009 | Smrha et al. |
| 7,591,667 B2 | 9/2009 | Gatnau Navarro et al. |
| 7,593,617 B2 | 9/2009 | Klunder et al. |
| 7,606,459 B2 | 10/2009 | Zimmel et al. |
| 7,636,507 B2 | 12/2009 | Lu et al. |
| 7,676,136 B2 | 3/2010 | Wakileh et al. |
| 7,697,811 B2 | 4/2010 | Murano et al. |
| 7,697,812 B2 * | 4/2010 | Parikh ............ G02B 6/4446 385/134 |
| 7,706,656 B2 | 4/2010 | Zimmel |
| 7,711,233 B2 | 5/2010 | Mahoney |
| 7,715,679 B2 | 5/2010 | Kowalczyk |
| 7,751,672 B2 | 7/2010 | Smith et al. |
| 7,751,673 B2 * | 7/2010 | Anderson ........ G02B 6/4455 385/135 |
| 7,756,379 B2 | 7/2010 | Kowalczyk et al. |
| 7,760,984 B2 | 7/2010 | Solheid et al. |
| 7,809,234 B2 | 10/2010 | Smith et al. |
| 7,811,119 B2 | 10/2010 | Caveney et al. |
| 7,816,602 B2 | 10/2010 | Landry et al. |
| 7,835,611 B2 | 11/2010 | Zimmel |
| 7,853,112 B2 | 12/2010 | Zimmel et al. |
| 7,869,426 B2 | 1/2011 | Hough et al. |
| 7,869,682 B2 | 1/2011 | Kowalczyk et al. |
| 7,872,738 B2 | 1/2011 | Abbott |
| 7,885,505 B2 | 2/2011 | Zimmel |
| 7,894,701 B2 | 2/2011 | Kowalczyk et al. |
| 7,912,336 B2 | 3/2011 | Zimmel |
| 8,019,191 B2 * | 9/2011 | Laurisch ........... G02B 6/4455 385/134 |
| 8,023,791 B2 | 9/2011 | Zimmel et al. |
| 8,081,857 B2 | 12/2011 | Nair et al. |
| 8,086,084 B2 * | 12/2011 | Bran de Leon .... G02B 6/4454 385/134 |
| 8,107,816 B2 | 1/2012 | Bolster et al. |
| 8,121,457 B2 | 2/2012 | Zimmel et al. |
| 8,131,126 B2 | 3/2012 | Kowalczyk et al. |
| 8,157,582 B2 | 4/2012 | Frey et al. |
| 8,180,192 B2 | 5/2012 | Zimmel |
| 8,189,983 B2 * | 5/2012 | Brunet ............. G02B 6/4452 385/135 |
| 8,189,984 B2 | 5/2012 | Kowalczyk et al. |
| 8,229,267 B2 | 7/2012 | Kowalczyk et al. |
| 8,254,740 B2 | 8/2012 | Smith et al. |
| 8,297,708 B2 | 10/2012 | Mizobata et al. |
| 8,326,107 B2 | 12/2012 | Cooke et al. |
| 8,331,753 B2 | 12/2012 | Zimmel et al. |
| 8,340,491 B2 | 12/2012 | Zimmel |
| 8,346,045 B2 | 1/2013 | Zimmel et al. |
| 8,380,035 B2 | 2/2013 | Kowalczyk et al. |
| 8,422,847 B2 | 4/2013 | Kowalczyk et al. |
| 8,488,934 B2 * | 7/2013 | Zhou ............... G02B 6/4454 385/135 |
| 8,494,329 B2 | 7/2013 | Nhep et al. |
| 8,494,333 B2 | 7/2013 | Kowalczyk et al. |
| 8,494,334 B2 | 7/2013 | Kowalczyk et al. |
| 8,520,997 B2 | 8/2013 | Zimmel |
| 8,542,972 B2 | 9/2013 | Zimmel |
| 8,554,044 B2 | 10/2013 | Bran de Leon et al. |
| 8,565,572 B2 | 10/2013 | Krampotich et al. |
| 8,577,198 B2 | 11/2013 | Solheid et al. |
| 8,634,689 B2 | 1/2014 | Zimmel |
| 8,660,429 B2 | 2/2014 | Bolster et al. |
| 8,705,928 B2 | 4/2014 | Zimmel et al. |
| 8,705,929 B2 | 4/2014 | Kowalczyk et al. |
| 8,774,585 B2 | 7/2014 | Kowalczyk et al. |
| 8,798,428 B2 | 8/2014 | Zimmel et al. |
| RE45,153 E | 9/2014 | Hendrickson et al. |
| 8,891,931 B2 | 11/2014 | Kowalczyk et al. |
| 8,929,706 B2 | 1/2015 | Teymouri |
| 8,929,708 B2 | 1/2015 | Pimentel et al. |
| 8,938,147 B2 | 1/2015 | Krampotich et al. |
| 9,146,371 B2 | 9/2015 | Zimmel |
| 9,170,392 B2 | 10/2015 | Krampotich et al. |
| 9,197,346 B2 | 11/2015 | Bolster et al. |
| 9,213,159 B2 | 12/2015 | Zimmel et al. |
| 9,239,442 B2 | 1/2016 | Zhang |
| 9,261,663 B2 | 2/2016 | Loeffelholz et al. |
| 9,261,666 B2 | 2/2016 | Kowalczyk et al. |
| 9,274,285 B2 | 3/2016 | Courchaine et al. |
| 9,335,504 B2 | 5/2016 | Solheid et al. |
| 9,341,802 B2 | 5/2016 | Krampotich et al. |
| 9,417,401 B2 | 8/2016 | Zhang |
| 9,494,760 B2 | 11/2016 | Simmons et al. |
| 9,563,017 B2 | 2/2017 | Zimmel et al. |
| 9,606,319 B2 | 3/2017 | Kowalczyk et al. |
| 9,678,292 B2 | 6/2017 | Landry et al. |
| 10,031,305 B2 | 7/2018 | Leeman et al. |
| 2001/0019002 A1 | 9/2001 | Walters et al. |
| 2001/0048044 A1 | 12/2001 | Sugata |
| 2002/0003186 A1 | 1/2002 | Hinds |
| 2002/0023814 A1 | 2/2002 | Poutiatine |
| 2002/0023984 A1 | 2/2002 | Oppmann et al. |
| 2002/0083538 A1 | 7/2002 | Silverman et al. |
| 2002/0126980 A1 | 9/2002 | Holman et al. |
| 2002/0164121 A1 | 11/2002 | Brennan, III et al. |
| 2002/0171002 A1 | 11/2002 | Krestsch et al. |
| 2003/0037480 A1 | 2/2003 | Davis |
| 2003/0042348 A1 | 3/2003 | Salentine et al. |
| 2003/0142817 A1 | 7/2003 | Liao |
| 2003/0230667 A1 | 12/2003 | Ganster |
| 2004/0052498 A1 | 3/2004 | Colombo et al. |
| 2004/0065443 A1 | 4/2004 | Berg et al. |
| 2004/0084271 A1 | 5/2004 | Woodruff |
| 2004/0170369 A1 | 9/2004 | Pons |
| 2004/0175090 A1 | 9/2004 | Vastmans et al. |
| 2004/0200332 A1 | 10/2004 | Chen |
| 2004/0209505 A1 | 10/2004 | Wade et al. |
| 2004/0240807 A1 | 12/2004 | Frohlich et al. |
| 2004/0244430 A1 | 12/2004 | Sheehy, Jr. |
| 2004/0258384 A1 | 12/2004 | Trebesch et al. |
| 2005/0053341 A1 | 3/2005 | Zimmel |
| 2005/0062881 A1 | 3/2005 | Caci et al. |
| 2005/0103515 A1 | 5/2005 | Fuller et al. |
| 2005/0128769 A1 | 6/2005 | Gozum et al. |
| 2005/0129379 A1 | 6/2005 | Reagan et al. |
| 2005/0145522 A1 | 7/2005 | Bloodworth et al. |
| 2005/0184186 A1 | 8/2005 | Tsoi et al. |
| 2005/0185910 A1 | 8/2005 | Zimmel |
| 2005/0213920 A1 | 9/2005 | Tanaka et al. |
| 2005/0232551 A1 | 10/2005 | Chang et al. |
| 2005/0232565 A1 | 10/2005 | Heggestad et al. |
| 2005/0247136 A1 | 11/2005 | Cross et al. |
| 2005/0258203 A1 | 11/2005 | Weaver |
| 2005/0258411 A1 | 11/2005 | Zeitler |
| 2006/0008231 A1 | 1/2006 | Reagan et al. |
| 2006/0028198 A1 | 2/2006 | Hoopengarner |
| 2006/0045458 A1 | 3/2006 | Sasaki et al. |
| 2006/0054760 A1 | 3/2006 | Murry |
| 2006/0148279 A1 | 7/2006 | German et al. |
| 2006/0160395 A1 | 7/2006 | Macauley et al. |
| 2006/0163403 A1 | 7/2006 | Dickson |
| 2006/0169856 A1 | 8/2006 | Dorenkamp et al. |
| 2006/0183362 A1 | 8/2006 | Mullaney et al. |

(56) References Cited

U.S. PATENT DOCUMENTS

| | | |
|---|---|---|
| 2006/0185953 A1 | 8/2006 | Gieseke |
| 2006/0186255 A1 | 8/2006 | Rooker |
| 2006/0187696 A1 | 8/2006 | Lanni |
| 2006/0210230 A1 | 9/2006 | Kline et al. |
| 2006/0228086 A1 | 10/2006 | Holmberg et al. |
| 2006/0231672 A1 | 10/2006 | Eastwood et al. |
| 2006/0264094 A1 | 11/2006 | Young |
| 2006/0266605 A1 | 11/2006 | Caamano et al. |
| 2006/0280418 A1 | 12/2006 | Mahoney |
| 2007/0023559 A1 | 2/2007 | Scapillato et al. |
| 2007/0025675 A1 | 2/2007 | Kramer |
| 2007/0036503 A1 | 2/2007 | Solheid et al. |
| 2007/0036506 A1 | 2/2007 | Kewitsch |
| 2007/0096538 A1 | 5/2007 | Niemi et al. |
| 2007/0108333 A1 | 5/2007 | Kuramoto |
| 2007/0147765 A1 | 6/2007 | Gniadek et al. |
| 2007/0165995 A1 | 7/2007 | Reagan et al. |
| 2007/0176045 A1 | 8/2007 | Chen |
| 2007/0189691 A1 | 8/2007 | Barth et al. |
| 2007/0189692 A1 | 8/2007 | Zimmel et al. |
| 2007/0237470 A1 | 10/2007 | Aronson et al. |
| 2008/0011514 A1 | 1/2008 | Zheng et al. |
| 2008/0011990 A1 | 1/2008 | Kostet et al. |
| 2008/0013893 A1 | 1/2008 | Zheng et al. |
| 2008/0013909 A1 | 1/2008 | Kostet et al. |
| 2008/0031585 A1 | 2/2008 | Solheid et al. |
| 2008/0035778 A1 | 2/2008 | Belden et al. |
| 2008/0037945 A1 | 2/2008 | Gniadek et al. |
| 2008/0079341 A1 | 4/2008 | Anderson et al. |
| 2008/0093187 A1 | 4/2008 | Roberts et al. |
| 2008/0100467 A1 | 5/2008 | Downie et al. |
| 2008/0116312 A1 | 5/2008 | Eastwood et al. |
| 2008/0124038 A1 | 5/2008 | Kowalczyk et al. |
| 2008/0170831 A1 | 7/2008 | Hendrickson et al. |
| 2008/0175550 A1 | 7/2008 | Coburn et al. |
| 2008/0199139 A1 | 8/2008 | Henderson |
| 2008/0218947 A1 | 9/2008 | Atkinson |
| 2008/0236209 A1 | 10/2008 | Conti et al. |
| 2008/0292261 A1 | 11/2008 | Kowalczyk et al. |
| 2008/0315030 A1 | 12/2008 | Hendrickson et al. |
| 2009/0022468 A1 | 1/2009 | Zimmel |
| 2009/0057085 A1 | 3/2009 | Caamano et al. |
| 2009/0060440 A1 | 3/2009 | Wright et al. |
| 2009/0060441 A1 | 3/2009 | Kowalczyk et al. |
| 2009/0067802 A1* | 3/2009 | Hoehne .............. G02B 6/4455 385/135 |
| 2009/0074370 A1 | 3/2009 | Kowalczyk et al. |
| 2009/0097846 A1 | 4/2009 | Kozischek et al. |
| 2009/0098763 A1 | 4/2009 | Below et al. |
| 2009/0103879 A1* | 4/2009 | Tang .................. G02B 6/4452 385/135 |
| 2009/0110359 A1 | 4/2009 | Smith et al. |
| 2009/0166404 A1 | 7/2009 | German et al. |
| 2009/0190894 A1 | 7/2009 | Nhep et al. |
| 2009/0215310 A1 | 8/2009 | Hoath et al. |
| 2009/0257726 A1 | 10/2009 | Redmann et al. |
| 2009/0263097 A1 | 10/2009 | Solheid |
| 2009/0290842 A1 | 11/2009 | Bran de Leon et al. |
| 2009/0317047 A1 | 12/2009 | Smith |
| 2009/0324187 A1 | 12/2009 | Wakileh et al. |
| 2010/0054680 A1 | 3/2010 | Lochkovic et al. |
| 2010/0054682 A1 | 3/2010 | Cooke |
| 2010/0054684 A1 | 3/2010 | Cooke et al. |
| 2010/0074587 A1 | 3/2010 | Loeffelholz et al. |
| 2010/0090830 A1 | 4/2010 | Conti et al. |
| 2010/0129030 A1 | 5/2010 | Giraud et al. |
| 2010/0166376 A1 | 7/2010 | Nair et al. |
| 2010/0211664 A1 | 8/2010 | Raza et al. |
| 2010/0211665 A1 | 8/2010 | Raza et al. |
| 2010/0211697 A1 | 8/2010 | Raza et al. |
| 2010/0215049 A1 | 8/2010 | Raza et al. |
| 2010/0226654 A1 | 9/2010 | Smith et al. |
| 2010/0322580 A1 | 12/2010 | Beamon et al. |
| 2010/0322583 A1 | 12/2010 | Cooke et al. |
| 2010/0329623 A1 | 12/2010 | Smith et al. |
| 2010/0329624 A1 | 12/2010 | Zhou et al. |
| 2011/0026894 A1* | 2/2011 | Rudenick .............. G02B 6/445 385/135 |
| 2011/0044599 A1 | 2/2011 | Kowalczyk et al. |
| 2011/0058785 A1 | 3/2011 | Solheid et al. |
| 2011/0091170 A1 | 4/2011 | Bran de Leon et al. |
| 2011/0092100 A1 | 4/2011 | Coffey et al. |
| 2011/0094274 A1 | 4/2011 | Conti et al. |
| 2011/0103761 A1 | 5/2011 | LeBlanc et al. |
| 2011/0158598 A1 | 6/2011 | LeBlanc et al. |
| 2011/0164853 A1 | 7/2011 | Corbille et al. |
| 2011/0211799 A1 | 9/2011 | Conner et al. |
| 2011/0262095 A1 | 10/2011 | Fabrykowski et al. |
| 2011/0274403 A1 | 11/2011 | LeBlanc et al. |
| 2011/0293235 A1 | 12/2011 | Nieves et al. |
| 2012/0027355 A1 | 2/2012 | LeBlanc et al. |
| 2013/0094828 A1 | 4/2013 | Loeffelholz et al. |
| 2013/0114930 A1 | 5/2013 | Smith et al. |
| 2013/0114937 A1 | 5/2013 | Zimmel et al. |
| 2013/0170810 A1 | 7/2013 | Badar et al. |
| 2013/0170811 A1 | 7/2013 | Kowalczyk et al. |
| 2013/0242866 A1 | 9/2013 | Lin et al. |
| 2013/0243386 A1 | 9/2013 | Pimentel et al. |
| 2014/0010512 A1 | 1/2014 | Kowalczyk et al. |
| 2014/0010513 A1 | 1/2014 | Kowalczyk et al. |
| 2014/0219622 A1 | 8/2014 | Coan et al. |
| 2014/0334790 A1 | 11/2014 | Zhang |
| 2015/0063770 A1 | 3/2015 | Kowalczyk et al. |
| 2015/0093088 A1 | 4/2015 | Matz et al. |
| 2015/0110442 A1 | 4/2015 | Zimmel et al. |
| 2015/0137461 A1 | 5/2015 | Coenegracht et al. |
| 2015/0241654 A1 | 8/2015 | Allen et al. |
| 2015/0286023 A1 | 10/2015 | Van Baelen et al. |
| 2015/0301301 A1 | 10/2015 | Mullaney |
| 2015/0355428 A1 | 12/2015 | Leeman et al. |
| 2016/0370551 A1 | 12/2016 | Hill et al. |
| 2017/0097486 A1 | 4/2017 | Barrantes et al. |
| 2017/0123175 A1 | 5/2017 | Van Baelen et al. |
| 2017/0153407 A1 | 6/2017 | Van Baelen et al. |
| 2017/0199344 A1 | 7/2017 | Kowalczyk et al. |
| 2019/0036316 A1 | 1/2019 | Van Baelen |

FOREIGN PATENT DOCUMENTS

| | | |
|---|---|---|
| CN | 203101690 U | 7/2013 |
| CN | 103238095 A | 8/2013 |
| DE | 41 30 706 A1 | 3/1993 |
| DE | 42 26 368 A1 | 2/1994 |
| DE | 42 29 510 A1 | 3/1994 |
| DE | 202 01 170 U1 | 5/2002 |
| DE | 102 44 304 B3 | 3/2004 |
| DE | 103 50 954 A1 | 5/2005 |
| DE | 10 2009 008 068 A1 | 8/2010 |
| EP | 0 730 177 A2 | 9/1996 |
| EP | 0 828 356 A2 | 3/1998 |
| EP | 1 092 996 A2 | 4/2001 |
| EP | 1 107 031 A1 | 6/2001 |
| EP | 1 179 745 A2 | 2/2002 |
| EP | 1 473 578 A2 | 11/2004 |
| EP | 1 626 300 A1 | 2/2006 |
| EP | 2 434 317 A1 | 3/2012 |
| EP | 2 618 195 A2 | 7/2013 |
| FR | 2 566 997 A1 | 1/1986 |
| GB | 2 236 398 A | 4/1991 |
| GB | 2 300 978 A | 11/1996 |
| JP | 1-123203 A | 5/1989 |
| JP | 9-236709 | 9/1997 |
| JP | 11-87006 A | 3/1999 |
| JP | 11-349230 | 12/1999 |
| JP | 2003-114339 | 4/2003 |
| JP | 2005-73365 | 3/2005 |
| JP | 2005-249858 | 9/2005 |
| JP | 2007-121398 A | 5/2007 |
| JP | 2007-121609 | 5/2007 |
| JP | 2010-122597 | 6/2010 |
| WO | WO 96/36896 | 11/1996 |
| WO | WO 00/07053 | 2/2000 |
| WO | WO 00/75706 A2 | 12/2000 |
| WO | WO 02/099528 A1 | 12/2002 |

(56) References Cited

FOREIGN PATENT DOCUMENTS

| WO | WO 02/103429 A2 | 12/2002 |
|---|---|---|
| WO | WO 03/093889 A1 | 11/2003 |
| WO | WO 2005/045487 A2 | 5/2005 |
| WO | WO 2006/127397 A1 | 11/2006 |
| WO | WO 2009/048680 A1 | 4/2009 |
| WO | WO 2010/001400 A1 | 1/2010 |
| WO | WO 2010/040256 A1 | 4/2010 |
| WO | WO 2010/081186 A1 | 7/2010 |
| WO | WO 2010/121639 A1 | 10/2010 |
| WO | WO 2010/134157 A1 | 11/2010 |
| WO | WO 2012/074688 A2 | 6/2012 |
| WO | WO 2012/112344 A1 | 8/2012 |
| WO | WO 2013/117598 A1 | 8/2013 |
| WO | WO 2015/193384 A2 | 12/2015 |
| WO | WO 2016/066780 A1 | 5/2016 |

OTHER PUBLICATIONS

ADC Telecommunications, Inc., DSX-3 Digital Signal Cross-Connect (DSX3) System Application Guide, Document No. ADCP-80-323, 1st Edition, Issue 2, Dec. 1996, p. 1-10; p. 1-11.
ADC Telecommunications, Inc., DSX-1 Digital Signal Cross Connect PIX-DSX-1—Fifth Edition, dated Oct. 1994, 36 Pages.
ADC Telecommunications, Inc., DSX-3 Digital Signal Cross-Connect, Doc. No. 274, dated Oct. 2004, 65 pp.
ADC Telecommunications, Inc., OmniReach FTTP Solutions, Doc. No. 1276550, dated May 2004, 12 pp.
ADC Telecommunications, Inc., PxPlus™ DS1 Digital Signal Cross-Connect, dated Jan. 1997, 12 Pages.
AFLGlobal: "LGX Optical Coupler Modules" May 17, 2012 XP002744968 retrieved from the Internet: URL.https://web.archive.org/web/20120517022939/http://www.aflglobal.com/Products/Fiber-Inside-Plant/Couplers-Splitters/Optical-Coupler-Modules.aspx.
Australian Examination Report for Application No. 2015205930; dated Jul. 13, 2016; 4 pages.
Australian Office Action (Appln. No. 2008247361), dated Nov. 8, 2013.
*Avaya's Enhanced SYSTIMAX® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.
Description of Admitted Prior Art, 30 pages.
European Search Report for Application No. 13163032.9 dated Jul. 4, 2013.
European Search Report for Application No. 15182271.5 dated Dec. 2, 2015.
F3DF Modules, ADC Telecommunications, Inc. © 1995, "Individual 12-Pack Assemblies", pp. 90.
Fiber Cable Management Products, Third Edition, ADC Telecommunications, Inc., © 1995, 1998.
Fiber Distribution Frame, Pre-Terminated Rear Load Connector Module, Installation Instructions, ADC Telecommunications, Inc., © 2000.
Fiber Main Distribution Frame (FMDF), Fiber Terminal Block, Installation Instructions, ADC Telecommunications, Inc., © 2001.
Fiber Panel Products—Cable Management Tray Panels, ADC Telecommunications, Inc., © 1994, 1996 "72 Fiber Distribution Module (FDM) with Intrafacility Fiber Cable", pp. 56.
Fiber Panel Products, Second Edition, ADC Telecommunications, Inc., © 1994, 1996.
FL2000 Products—Preconfigured Panels, ADC Telecommunications, Inc., © 2000 "Rack or Cabinet Mount Termination Panel with Multifiber Cable", pp. 13.
FL2000 Products, ADC Telecommunications, Inc., © 1994, 1996.
FL2000 Products, ADC Telecommunications, Inc., © 1994, 1996, "Rack Mount Panel with Intrafacility Fiber Cable", pp. 16.
IFC Style Frame Modules, ADC Telecommunications, Inc., © 1995, "Connector Module Equipped with IFC", pp. 27.
*Intelligent patching systems carving out a 'large' niche*, Cabling Installation & Maintenance, vol. 12, Issue 7, Jul. 2004 (5 pages).
*IntelliMAC: The intelligent way to make Moves, Adds or Changes!* NORDX/CDT © 2003 (6 pages).
International Search Report and Written Opinion for PCT/US2008/062764 dated Aug. 8, 2008.
International Search Report and Written Opinion for PCT/US2008/075196 dated Nov. 18, 2008.
International Search Report and Written Opinion for PCT/US2008/072218 dated Mar. 18, 2009.
International Search Report and Written Opinion for PCT/US2010/052872 dated Jan. 12, 2011.
International Search Report and Written Opinion for PCT/US2011/041605 dated Feb. 24, 2012.
International Search Report and Written Opinion for Application No. PCT/EP2013/077292 dated May 28, 2014.
International Search Report and Written Opinion for Application No. PCT/EP2015/063620 dated Feb. 5, 2016.
International Search Report and Written Opinion for Application No. PCT/EP2016/079513 dated Mar. 3, 2017.
International Search Report and Written Opinion of the International Searching Authority for International Patent Application No. PCT/EP2017/051908 dated Jul. 18, 2017, 19 pages.
Meredith, L., "Managers missing point of intelligent patching," *Daa Center News*, Jun. 21, 2005, obtained Dec. 2, 2008 from http://searchdatacenter.techtarget.com/news/article/0,289142,sid80_gci1099991,00.html.
Next Generation Frame (NGF), Product Family Ordering Guide, ADC Telecommunications, Inc., © 1996, 1999, 2000, "Fiber Termination Blocks (FTB) Preterminated", pp. 8.
Next Generation Frame (NGF), Product Family Ordering Guide, ADC Telecommunications, Inc., © 1996, 1999, 2000.
Next Generation Frames—Fiber Termination Blocks, ADC Telecommunication, Inc., © 1998, "Fiber Termination Blocks (FTB) Preterminated" pp. 6.
Notice of Allowance for U.S. Appl. No. 13/924,191 dated Dec. 3, 2013.
Ohtsuki, F. et al., "Design of Optical Connectors with ID Modules," *Electronics and Communications in Japan*, Part 1, vol. 77, No. 2, pp. 94-105 (Feb. 1994).
Supplemental Notice of Allowability for U.S. Appl. No. 13/924,191 dated Mar. 10, 2014.
Supplemental Notice of Allowability for U.S. Appl. No. 13/924,191 dated Mar. 14, 2014.
*SYSTIMAX® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.
TrueNet; TFP Series Rack Mount Fiber Panels, Spec Sheet; May 2008; 8 pages.
Value-Added Module System, ADC Telecommunications, Inc., © 1993, 1194, 1998, "12-Pack Module Assemblies", pp. 30-31.
Complaint relating to Civil Action No. 5:11-cv-02509-JS, *ADC Telecommunications, Inc v. Opterna Am, Inc*. filed Apr. 11, 2011 (14 pages).
Plaintiff's Notice of Dismissal relating to Civil Action No. 5:11-cv-02509-JS, *ADC Telecommunications, Inc v. Opterna Am, Inc*. filed Jul. 12, 2011 (1 page).
Complaint relating to Civil Action No. 1:11cv-735 (GBL-IDD), *ADC Telecommunications, Inc v. Opterna Am, Inc*. filed Jul. 12, 2011 (5 pages).
Complaint, *CommScope Technologies LLC v. Clearfield, Inc*., Case No. 0:17-cv-00307, 77 pages (Jan. 31, 2017).
Complaint Exhibit G, *CommScope Technologies LLC v. Clearfield, Inc*., Case No. 0:17-cv-00307-PJS-BRT, 3 pages (Jan. 31, 2017).
Complaint Exhibit H, *CommScope Technologies LLC v. Clearfield, Inc*., Case No. 0:17-cv-00307-PJS-BRT, 3 pages (Jan. 31, 2017).
Answer, *CommScope Technologies LLC v. Clearfield, Inc*., Case No. 0:17-cv-00307-PJS-BRT, 27 pages (Apr. 24, 2017).
Defendant Clearfield Inc.'s Preliminary Invalidity Claim Charts and Disclosures, *CommScope Technologies LLC v. Clearfield, Inc*., Case No. 0:17-cv-00307-PJS-BRT, 62 pages (Oct. 6, 2017).

(56) References Cited

OTHER PUBLICATIONS

Defendant Clearfield Inc.'s Invalidity Claim Chart Exhibit 10, *CommScope Technologies LLC v. Clearfield, Inc.*, Case No. 0:17-cv-00307-PJS-BRT, 36 pages (Oct. 6, 2017).
Defendant Clearfield Inc.'s Invalidity Claim Chart Exhibit 11, *CommScope Technologies LLC v. Clearfield, Inc.*, Case No. 0:17-cv-00307-PJS-BRT, 60 pages (Oct. 6, 2017).
Defendant Clearfield Inc.'s Invalidity Claim Chart Table D, *CommScope Technologies LLC v. Clearfield, Inc.*, Case No. 0:17-cv-00307-PJS-BRT, 7 pages (Oct. 6, 2017).
Defendant Clearfield Inc.'s Invalidity Claim Chart Table E, *CommScope Technologies LLC v. Clearfield, Inc.*, Case No. 0:17-cv-00307-PJS-BRT, 7 pages (Oct. 6, 2017).
Plaintiff CommScope Technologies LLC's Memorandum in Support of Motion to Compel Discovery, *CommScope Technologies LLC v. Clearfield, Inc.*, Case No. 0:17-cv-00307-PJS-BRT, 21 pages (Oct. 9, 2017).
Plaintiff CommScope Technologies LLC's Response to Defendant's First Set of Interrogatories to Plaintiff (Nos. 1-15), *CommScope Technologies LLC v. Clearfield, Inc.*, Case No. 0:17-cv-00307-PJS-BRT, 26 pages (Oct. 9, 2017).
Plaintiff CommScope Technologies LLC's Supplemental Response to Defendant's Interrogatory No. 2, *CommScope Technologies LLC v. Clearfield, Inc.*, Case No. 0:17-cv-00307-PJS-BRT, 5 pages (Oct. 9, 2017).
Plaintiff CommScope's Initial Claim Charts including Exhibits J and K, *CommScope Technologies LLC v. Clearfield, Inc.*, Case No. 0:17-cv-00307-PJS-BRT, 28 pages (Oct. 9, 2017).
Defendant Clearfield Inc.'s Revised Preliminary Invalidity Claim Charts and Disclosures, Civil Action No. 17-cv-00307-PJS-BRT, 51 pages (Dec. 11, 2017).
Defendant Clearfield Inc.'s Revised Invalidity Claim Chart Exhibit 10, *CommScope Technologies LLC v. Clearfield, Inc.*, Case No. 0:17-cv-00307-PJS-BRT, 38 pages (Dec. 11, 2017).
Defendant Clearfield Inc.'s Revised Invalidity Claim Chart Exhibit 11, *CommScope Technologies LLC v. Clearfield, Inc.*, Case No. 0:17-cv-00307-PJS-BRT, 39 pages (Dec. 11, 2017).
Defendant Clearfield Inc.'s Revised Invalidity Claim Chart Table D, *CommScope Technologies LLC v. Clearfield, Inc.*, Case No. 0:17-cv-00307-PJS-BRT, 7 pages (Dec. 11, 2017).
Defendant Clearfield Inc.'s Revised Invalidity Claim Chart Table E, *CommScope Technologies LLC v. Clearfield, Inc.*, Case No. 0:17-cv-00307-PJS-BRT, 6 pages (Dec. 11, 2017).
Defendant Clearfield Inc.'s Second Revised Preliminary Invalidity Claim Charts and Disclosures, Civil Action No. 17-cv-00307-PJS-BRT, 65 pages (Jan. 12, 2018).
Exhibit 10 to Second Revised Preliminary Invalidity Claim Charts and Disclosures, Civil Action No. 17-cv-00307-PJS-BRT, 43 pages (Jan. 12, 2018).
Exhibit 11 to Second Revised Preliminary Invalidity Claim Charts and Disclosures, Civil Action No. 17-cv-00307-PJS-BRT, 47 pages (Jan. 12, 2018).
Commscope's Response to Clearfield's Second Revised Invalidity Claim Charts and Disclosure, Civil Action No. 17-cv-00307-PJS-BRT, 105 pages (Jan. 19, 2018).
Exhibit J to Second Revised Preliminary Invalidity Claim Charts and Disclosures, Civil Action No. 17-cv-00307-PJS-BRT, 21 pages (Jan. 19, 2018).
Exhibit K to Second Revised Preliminary Invalidity Claim Charts and Disclosures, Civil Action No. 17-cv-00307-PJS-BRT, 19 pages (Jan. 19, 2018).
Joint Status Report, *CommScope Technologies LLC v. Clearfield, Inc.*, Case No. 0:17-cv-00307-PJS-BRT, 11 pages (Feb. 9, 2018.
Joint Status Report Exhibit A, *CommScope Technologies LLC v. Clearfield, Inc.*, Case No. 0:17-cv-00307-PJS-BRT, 33 pages (Feb. 9, 2018).
Joint Status Report Exhibit B, *CommScope Technologies LLC v. Clearfield, Inc.*, Case No. 0:17-cv-00307-PJS-BRT, 21 pages (Feb. 9, 2018).
Stipulation of Dismissal, *CommScope Technologies LLC v. Clearfield, Inc.*, Case No. 0:17-cv-00307-PJS-BRT, 2 pages (Feb. 19, 2018).
Order of Dismissal, *CommScope Technologies LLC v. Clearfield, Inc.*, Case No. 0:17-cv-00307-PJS-BRT, 1 page (Feb. 20, 2018).
Petition for *Inter Partes* Review of U.S. Pat. No. 8,705,929, *Clearfield Inc. v. CommScope Technologies LLC*, Case No. IPR2017-02122, 67 pages (Sep. 15, 2017).
Inter Partes Review Case No. IPR2017-02122, Ex. 1003—Declaration of Dr. Michael Lebby, 141 pages (Sep. 15, 2017).
Inter Partes Review Case No. IPR2017-02122, Ex. 1004—U.S. Pat. No. 6,220,413 B1.
Inter Partes Review Case No. IPR2017-02122, Ex. 1005—U.S. Pat. No. 6,933,441 B2.
Inter Partes Review Case No. IPR2017-02122, Ex. 1006—U.S. Pat. No. 4,201,278.
Inter Partes Review Case No. IPR2017-02122, Ex. 1007—Prosecution History of U.S. Appl. No. 12/182,705, filed Jul. 30, 2008., 332 pages.
Inter Partes Review Case No. IPR2017-02122, Ex. 1008—PCT Patent No. WO 2009/048680 A1.
Inter Partes Review Case No. IPR2017-02122, Ex. 1009—European Patent No. 2 618 195 A2.
Inter Partes Review Case No. IPR2017-02122, Ex. 1010—EP App. No. 13163032.9.
Inter Partes Review Case No. IPR2017-02122, Ex. 1011—U.S. Pat. No. 4,657,140.
Inter Partes Review Case No. IPR2017-02122, Ex. 1012—USConec MTP® Brand Connectors Data Sheet (© 2014), 2 pages.
Inter Partes Review Case No. IPR2017-02122, Ex. 1013—Katsuki Suematsu et al., "Super Low-Loss, Super High-Density Multi-Fiber Optical Connectors," Furukawa Review (n. 23), 2003 ("Suematsu").
Inter Partes Review Case No. IPR2017-02122, Ex. 1014—U.S. Pat. No. 6,885,799 B2.
Preliminary Response by Patent Owner Under 37 C.F.R. § 42.107, Case IPR2017-02122, Paper No. 6, 71 pages (Dec. 22, 2017).
Ex. 2001—Declaration of Casimer DeCusatis in Support of Patent Owner's Preliminary Response, Case IPR2017-02122.
Ex. 2002—Office Action dated Jun. 19, 2009 in connection with U.S. Appl. No. 12/182,705.
Ex. 2003—Response to Jun. 19, 2009 Office Action in connection with U.S. Appl. No. 12/182,705.
Ex. 2004—U.S. Patent Application Publication No. 2006/021 0230 ("Kline").
Ex. 2005—Excerpts from the Merriam-Webster's Collegiate Dictionary (Tenth Edition) (2000).
Ex. 2006—Excerpts from the New Oxford American Dictionary (Third Edition) (2010).

\* cited by examiner

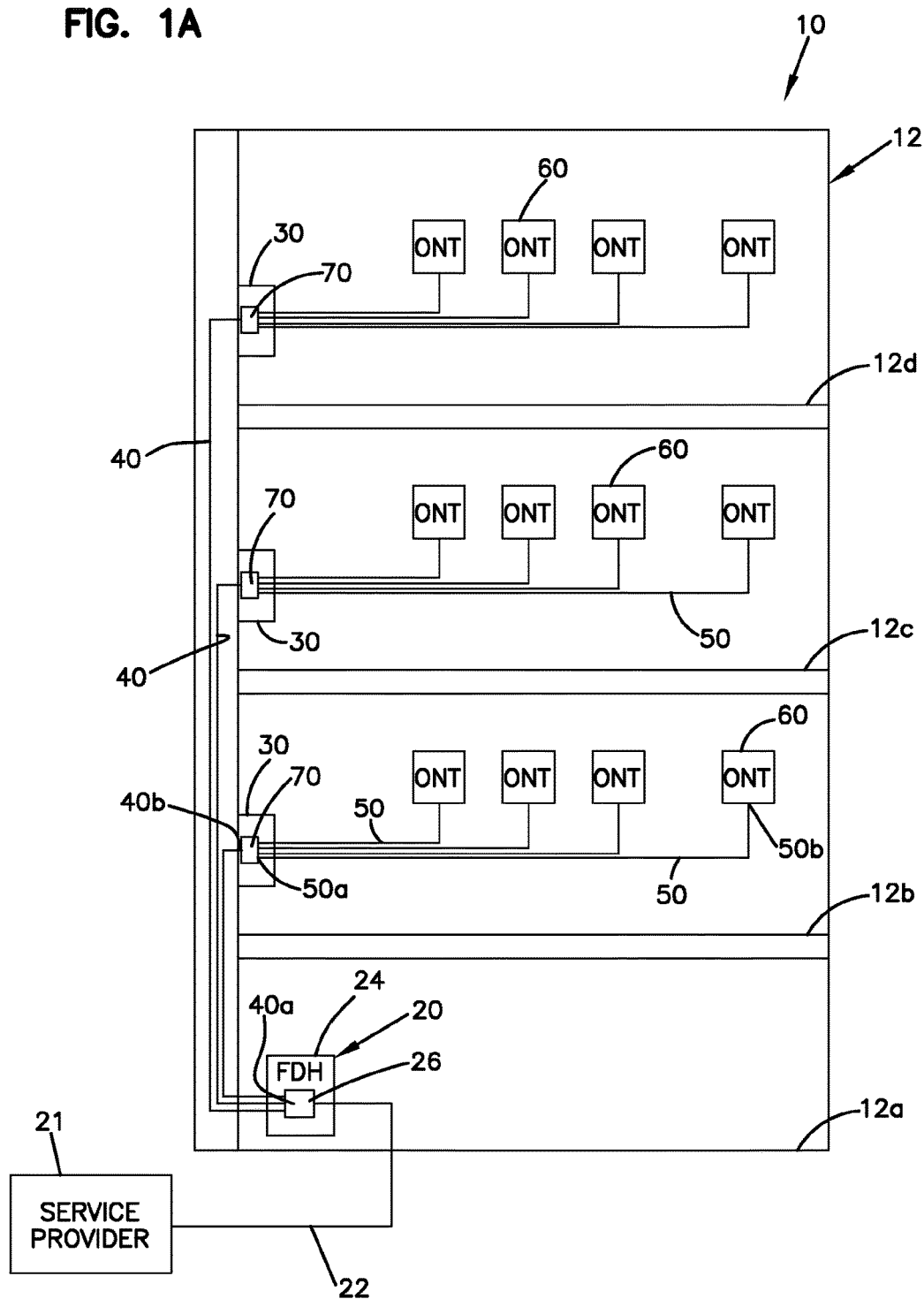

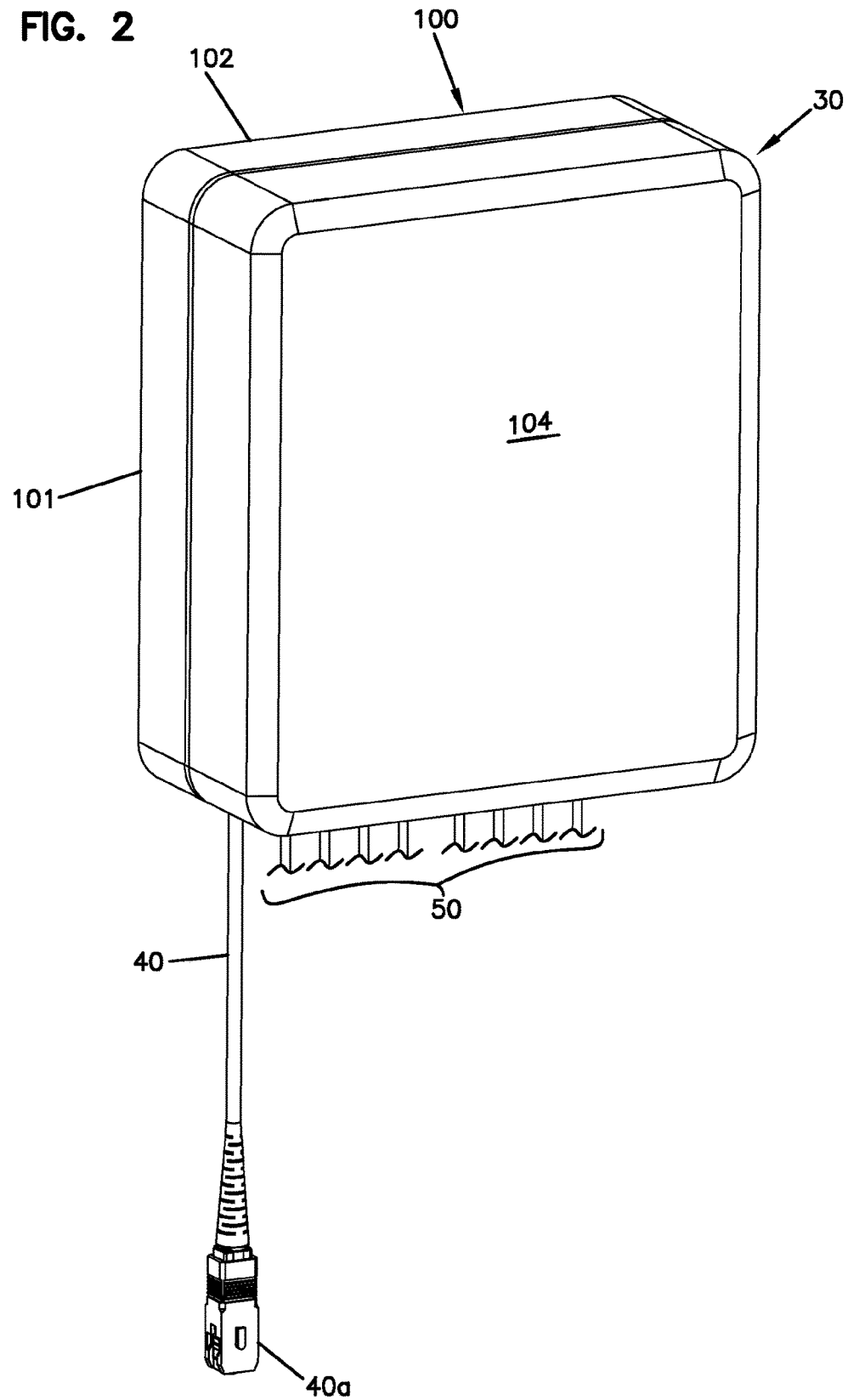

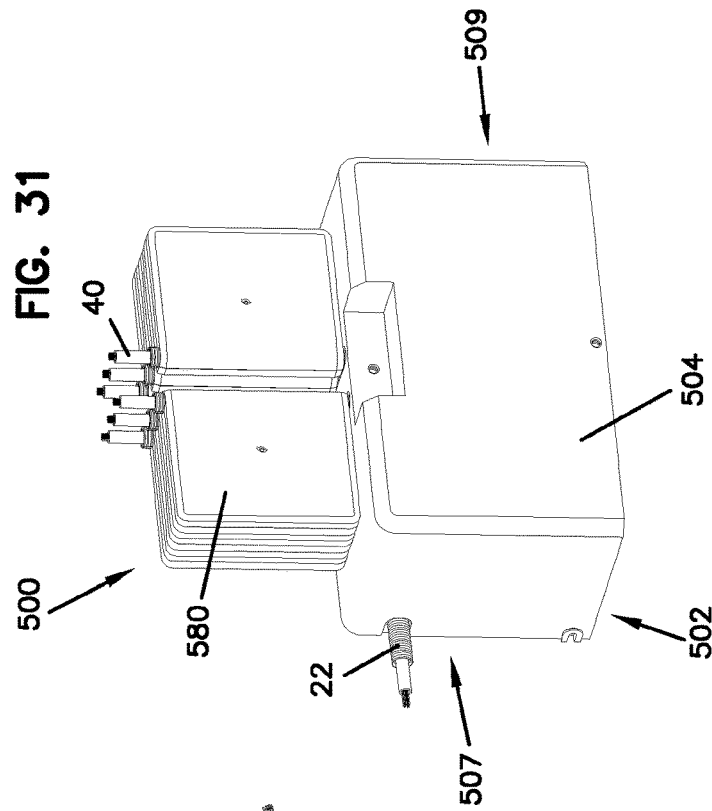
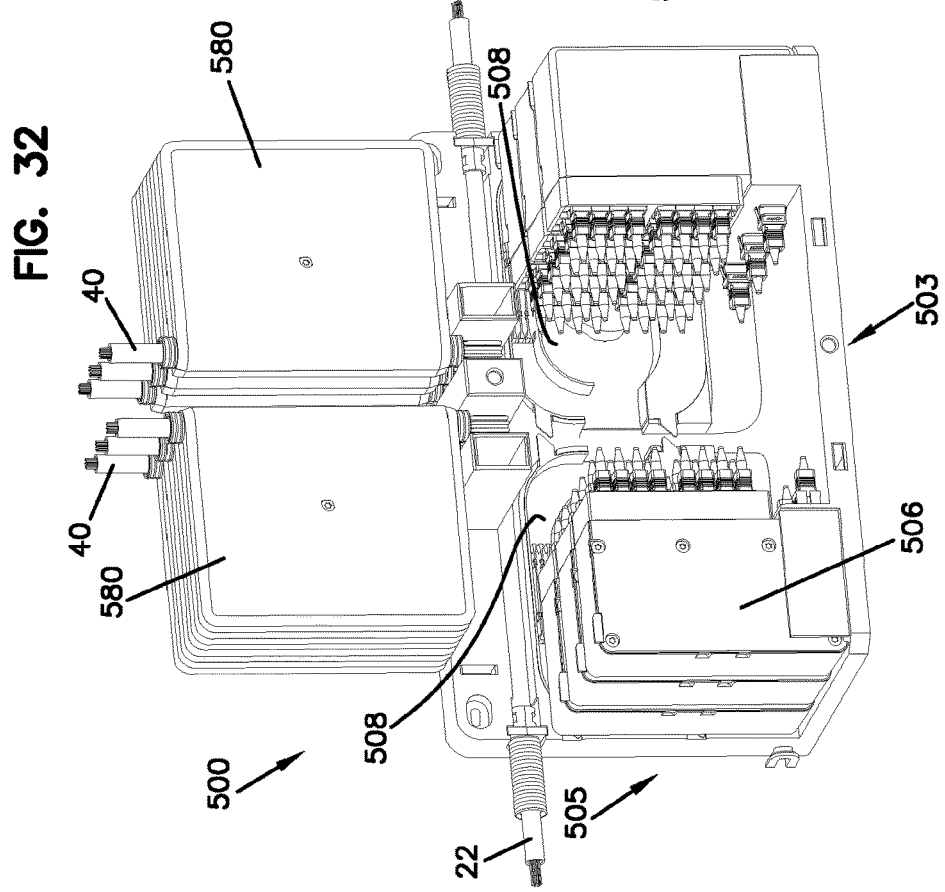

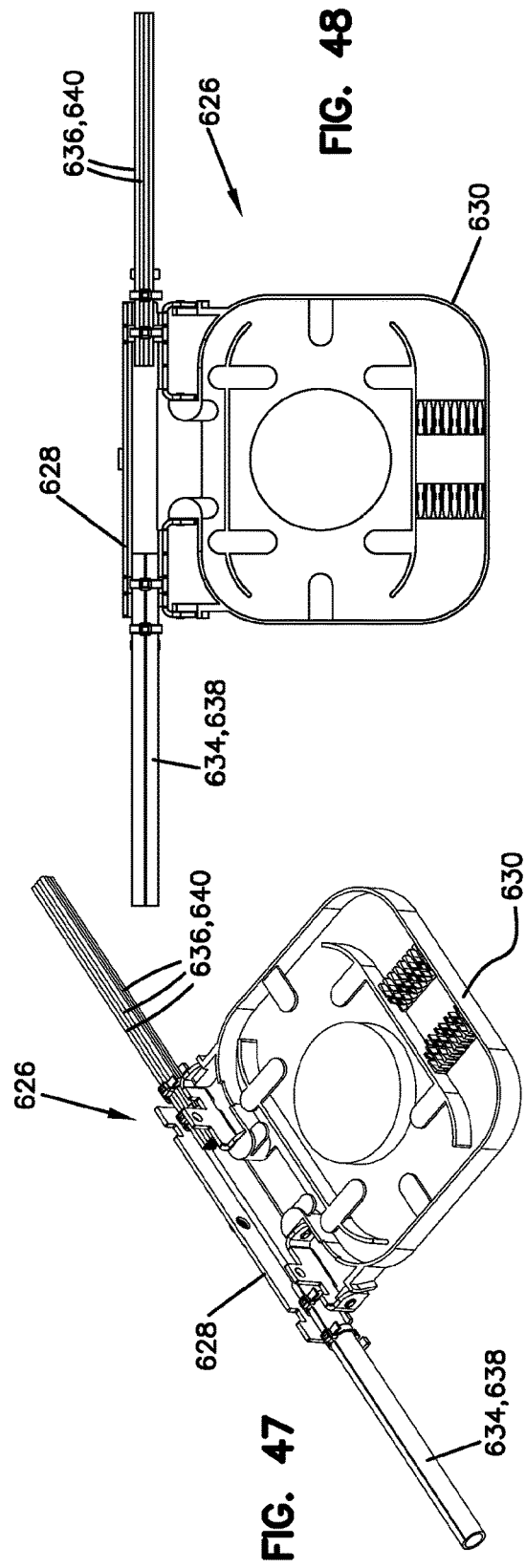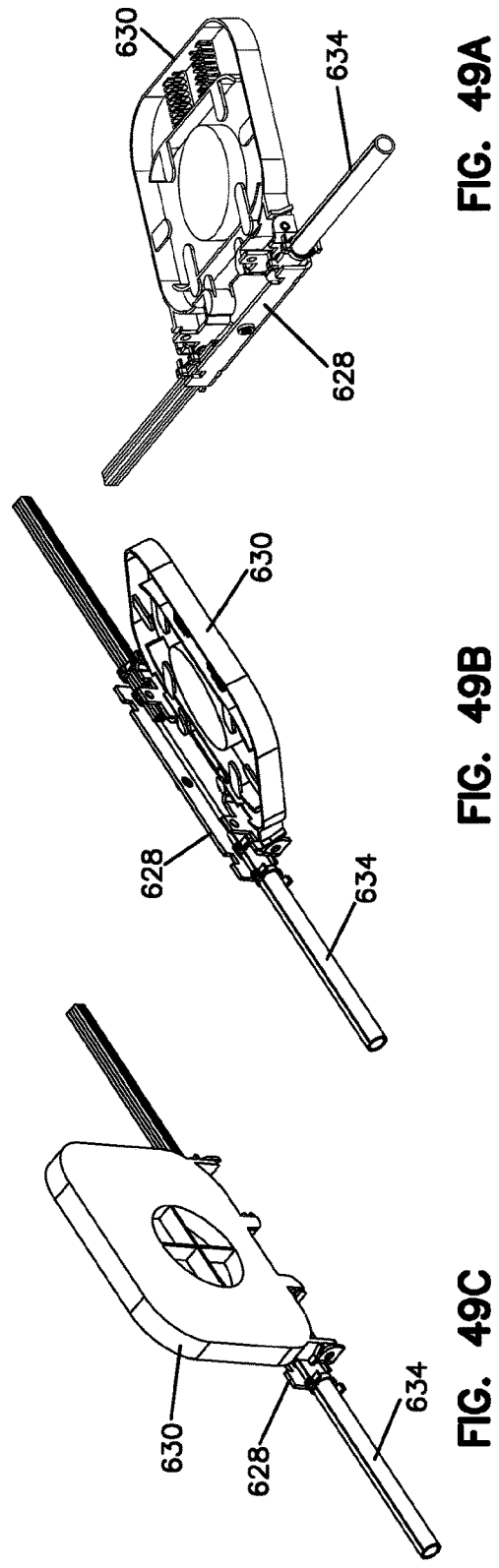

DISTRIBUTION DEVICE WITH INCREMENTALLY ADDED SPLITTERS

This application is a Continuation of U.S. patent application Ser. No. 14/653,888, filed on 19 Jun. 2015, now U.S. Pat. No. 10,031,305, which is a National Stage Application of PCT/EP2013/077292, filed on 19 Dec. 2013, which claims benefit of U.S. Provisional Ser. No. 61/739,461, filed on 19 Dec. 2012, U.S. Provisional Ser. No. 61/840,832, filed on 28 Jun. 2013, U.S. Provisional Ser. No. 61/883,320, filed on 27 Sep. 2013, and U.S. Provisional Ser. No. 61/908,054, filed on 23 Nov. 2013 and which applications are incorporated herein by reference. To the extent appropriate, a claim of priority is made to each of the above disclosed applications.

BACKGROUND

As demand for telecommunications increases, fiber optic networks are being extended in more and more areas. In facilities such as multiple dwelling units (MDU's), apartments, condominiums, businesses, etc., fiber optic distribution terminals are used to provide subscriber access points to the fiber optic network. Fiber optic distribution terminals are often installed at separate floors of an MDU and are connected to the fiber optic network through cables connected to a network hub. The length of cable needed between the fiber optic enclosure and the network hub varies depending upon the location of the fiber optic enclosure with respect to the network hub. As a result, there is a need for a fiber optic enclosure that can effectively manage varying lengths of cable. Cables are also used to interconnect the subscriber access points provided by the fiber distribution terminals with subscriber interface units (e.g., Optical Network Terminals) provided at subscriber locations (e.g., at each residence of an MDU). With respect to such fiber distribution systems, there is also a need for techniques to effectively manage excess cable length while also taking into consideration space constraints.

SUMMARY

One aspect of the present disclosure relates to a fiber distribution device including a rotatable arrangement about which a length of fiber optic cable is coiled. The fiber optic cable includes at least one optical fiber contained within a cable jacket. An optical splitter can be added to the fiber distribution device subsequent to deployment of the fiber distribution device (e.g., when service is requested) from the fiber distribution device.

In some implementations, the optical splitter has a configuration that enables subsequent installation of the splitter in the device.

In some implementations, the input of the optical splitter may include either an adapter port or a connector configured to be received at an adapter port.

Another aspect of the present disclosure relates to a fiber distribution system including a fiber distribution hub and one or more fiber distribution devices that can be installed at different locations within a building. Both the hub and the device can be initially deployed without splitters.

In certain implementations, the device can be deployed with no output adapters at which subscriber patch cords can be connected to the device.

In certain implementations, the hub can be deployed with no output adapters at which cables dispensed from the devices can be connected to the hub.

Optical splitters having adapter output ports can be incrementally installed at the hub and/or the devices.

In certain implementations, the output splitters of the hub and devices are interchangeable with each other.

Another aspect of the present disclosure relates to an optical splitter module including a splitter body, a splitter input region, and a splitter output region. The splitter body holds an optical splitter that splits signals received at the input region to the output region of the module. The splitter output region includes two or more optical adapters having empty, outward-facing ports. The splitter input region of certain types of splitter modules includes one or more optical adapters having an empty, outward-facing port. The splitter input region of other types of splitter modules includes an optical connector.

In some examples, the input region is disposed at a notched region of the body so that a splitter input port or connector is inwardly recessed from the splitter output ports.

The optical splitter held within the splitter body can have any of a variety of ratios (e.g., 1:2, 1:4, 1:8, 1:16, 1:32, 1:64, etc.). In certain examples, a first splitter module can have a first splitter body holding an optical splitter having a first split ratio (e.g., 1:4) and a second splitter module can have a second splitter body holding an optical splitter having a second split ratio (e.g., 1:8) wherein the first and second splitter bodies have the same dimensions. Some splitters can be 2:4 or 2:8, with two inputs and 4 outputs or eight outputs for each input.

In certain implementations, the output region of the first splitter module has the same dimensions as the output region of the second splitter module.

In certain implementations, the splitter modules can include fiber optic connector storage locations for extra and connector or connectors.

Another aspect of the disclosure relates to a fiber distribution hub including an enclosure, a plurality of fiber optic splitters mounted within the enclosure and a plurality of fanouts mounted to the enclosure. Each of the fanouts includes a splice region for splicing riser cables to connectorized pigtails that lead to outputs of the fiber optic splitters, wherein inputs of the fiber optic splitters receive fibers spliced from a feeder cable entering the enclosure.

Another aspect of the disclosure relates to a fiber distribution hub including an enclosure, a plurality of fiber optic splitters mounted within the enclosure and a plurality of integrated splice and cable termination devices mounted to the enclosure. Each of the splices is on a pivotally mounted tray includes a splice region for splicing cables to connectorized pigtails that lead to inputs and/or outputs of the fiber optic splitters.

Another aspect of the present disclosure relates to a fiber distribution device including a length of fiber optic cable with a connectorized end matable to an adapter for connecting to either a fiber optic connector and a cable or a fiber optic splitter with a plurality of outputs. An optical splitter can be added to the fiber distribution device subsequent to deployment of the fiber distribution device (e.g., when service is requested) from the fiber distribution device. The optical splitter has a configuration that enables subsequent installation of the splitter in the device. The input of the optical splitter may include either an adapter port or a connector configured to be received at an adapter port.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 1A is a schematic view of a fiber optic distribution system in accordance with the principles of the present disclosure shown incorporated into a multi-dwelling unit;

FIG. 2 is a front perspective view of an example fiber distribution terminal with a cover disposed in a closed position;

FIG. 31 is a front perspective view of a fiber distribution hub including optical splitters and fanouts;

FIG. 32 illustrates the fiber distribution hub of FIG. 31 with the cover thereof removed to show the internal features;

FIG. 47 shows the splice tray terminated to two different cables;

FIG. 48 is a top view of the splice tray of FIG. 47 terminated to two different cables;

FIGS. 49A-49C show the splice cassette pivoting relative to the cable termination bracket;

DETAILED DESCRIPTION

Figure 1B:
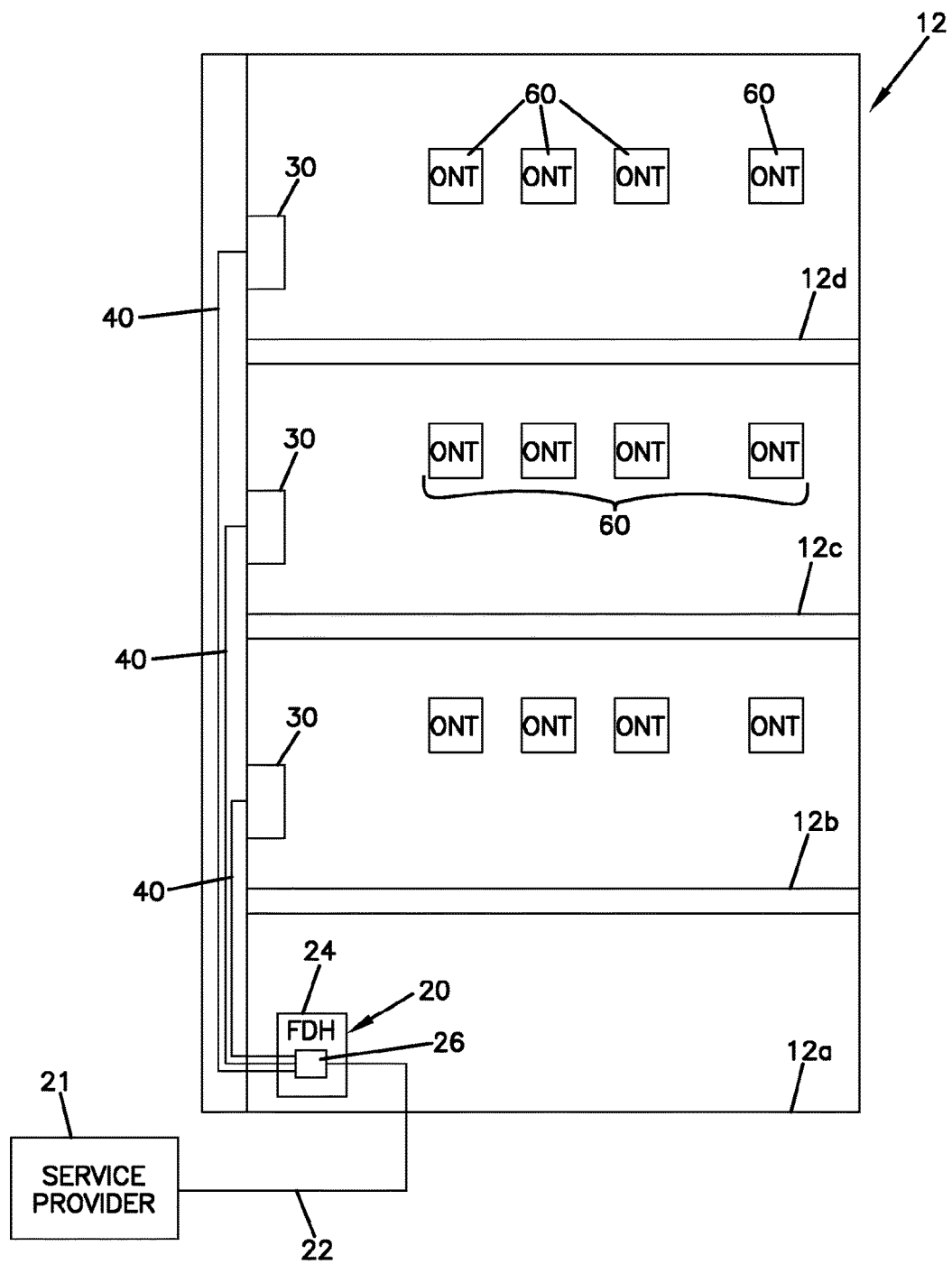
FIG. 1B is a schematic view of the fiber optic distribution system of FIG. 1A after the initial installation and prior to a service request.

Reference will now be made in detail to the exemplary aspects of the present disclosure that are illustrated in the accompanying drawings. Wherever possible, the same reference numbers will be used throughout the drawings to refer to the same or like structure.

Referring to FIG. 1A, an example fiber optic distribution system 10 in accordance with the principles of the present disclosure is shown. The fiber optic distribution system 10 is shown incorporated into a building, such as a multi-dwelling unit (MDU) 12, having multiple floors 12a, 12b, 12c and 12d (i.e., multiple levels). The floor 12a can be a basement. A riser 14 can run between the various floors 12a-12d. While depicted in an MDU, it will be appreciated that the fiber distribution system 10 can be used in other types of buildings and other types of applications.

The fiber distribution system 10 is shown including a fiber distribution hub 20 installed at the floor 12a (e.g., typically in the basement or lowest floor of the building). The fiber distribution hub 20 is shown receiving at least one feed fiber 22 routed from a service provider 21 (e.g., from a central office of a service provider). The fiber distribution hub 20 can include a housing 24 that is capable of receiving one or more optical splitters 26. Each optical splitter 26 is configured to split optical signals supplied to the fiber distribution hub 20 by the feed fiber 22. In various implementations, an optical splitter mounted at the hub 20 can be a 1:2 splitter, a 1:4 splitter, a 1:8 splitter, a 1:16 splitter, a 1:32 splitter, and/or a 1:64 splitter. Outputs of the optical splitter 26 can be optically connected to optical fibers routed to the various floors 12b-12d of the building.

The optical splitters 26 can be incrementally installed at the hub 20 as service is needed. For example, the hub 20 may initially be devoid of splitters 26. When one or more subscribers request service, one or more splitters 26 may be installed at the hub 20. In some implementations, the splitters 26 have output pigtails extending therefrom that can connect at adapters to the optical fibers routed to the floors 12b-12d. In other implementations, the splitters 26 have output adapters configured to receive connectorized ends of the optical fibers routed to the various floors 12b-12d or intermediate fibers. The splitter input also may include a connectorized pigtail, an unconnectorized pigtail, or an adapter. The housing 24 can also enclose various structures for making optical connections between optical fibers of optical cables. For example, the housing can include a plurality of fiber optic adapters for connecting fiber optic connectors, splice trays for protecting optical splices between optical fibers, or other types of structures.

The fiber distribution system 10 is shown including fiber distribution terminals 30 at each of the upper floors 12b-12d. Fiber optic cables 40 interconnect the fiber distribution hub 20 and the fiber distribution terminals 30. The fiber optic cables 40 can each include one or more optical fibers contained within a protective jacket. The optical fibers of the fiber optic cables 40 can be optically coupled to the feed fiber 22 through the optical splitter 26 at the hub 20. At the fiber distribution terminals 30, the fiber optic cables 40 can be optically coupled to patch cords 50, which can be routed (e.g., horizontally along the floor) to optical network terminals (ONT's) 60 or other types of interface devices (e.g., an interface box, an interface panel, etc.) corresponding to different subscriber locations (e.g., apartments, residences, offices, condominiums, etc.) on each floor 12a-12d. An ONT 60 is an active device that converts optical signals from the service provider to electrical signals used at the subscriber locations.

If the fiber optic cables 40 contain single optical fibers, then optical splitters 70 can be provided in each of the fiber distribution terminals 30 for splitting signals carried by the optical fibers of the fiber optic cables 40. The patch cords 50 are optically coupled to the splitters 70 to carry the split signals to the ONT's 60. In some implementations, the optical splitters 70 splits the signals to connectorized pigtails housed within the fiber distribution terminals 30, which are routed to adapters mounted within the fiber distribution terminals 30. In other implementations, the optical splitters 70 have output adapter ports at which the patch cords 50 can be inserted to receive the split signals. In certain implementations, the optical splitters 70 can provide a split ratio of at least 1:4. In one example, the optical splitters 70 can provide a split ratio of 1:8. In another example, the optical splitters 70 can provide a split ratio of 1:4. In another example, the optical splitters 70 can provide a split ratio of 1:16.

The patch cords 50 can include first and second connectorized ends 50a, 50b. In some implementations, the first connectorized ends 50a are optically connected to the connectorized pigtails within the fiber distribution terminals 30 by fiber optic adapters within the fiber distribution terminals 30. In other implementations, the first connectorized ends 50a are optically connected to splitter output adapters within the fiber distribution terminals 30. The second connectorized ends 50b of the patch cords 50 can be coupled to the ONT's 60.

In other examples, the fiber optic cables 40 can each include a plurality of optical fibers that are optically connected to the feed fiber 22. For such examples, the fiber distribution terminals 30 can include fan-out devices (e.g., fan-out modules) that separate the optical fibers of the fiber optic cables 40 routed to each fiber distribution terminal 30 into a plurality of connectorized pigtails that can be optically connected to subscriber locations via patch cords 50 as described above. The ends of the fiber optic cables 40 that interface with the fiber distribution hub 20 can be terminated with multi-fiber fiber optical connectors. In this type of example, all of the optical splitting of the building can be accomplished at the fiber distribution hub 20. In contrast, the previous example uses a distributed optical splitting strategy where optical splitting can occur at the fiber distribution hub 20 and/or at each floor 12b-12d.

In some implementations, all of the components of the fiber distribution system 10 are installed within the MDU 12 simultaneously. In other implementations, however, some of the components are initially installed and other components are installed only after those components are needed for service. For example, FIG. 1B shows the fiber distribution system 10 after an initial installation but prior to a service request from any of the floors 12b-12d in accordance with some implementations. The fiber optic cables 40 are routed from the fiber distribution terminals 30 to the hub 20. However, none of the fiber distribution terminals 30 include optical splitters 70 and no patch cords 50 have been installed. When service is requested by one of the ONT's 60, a splitter 70 can be installed at the corresponding fiber distribution terminal 30 and a patch cord 50 can be routed between the splitter 70 and the ONT 60.

Figure 3:
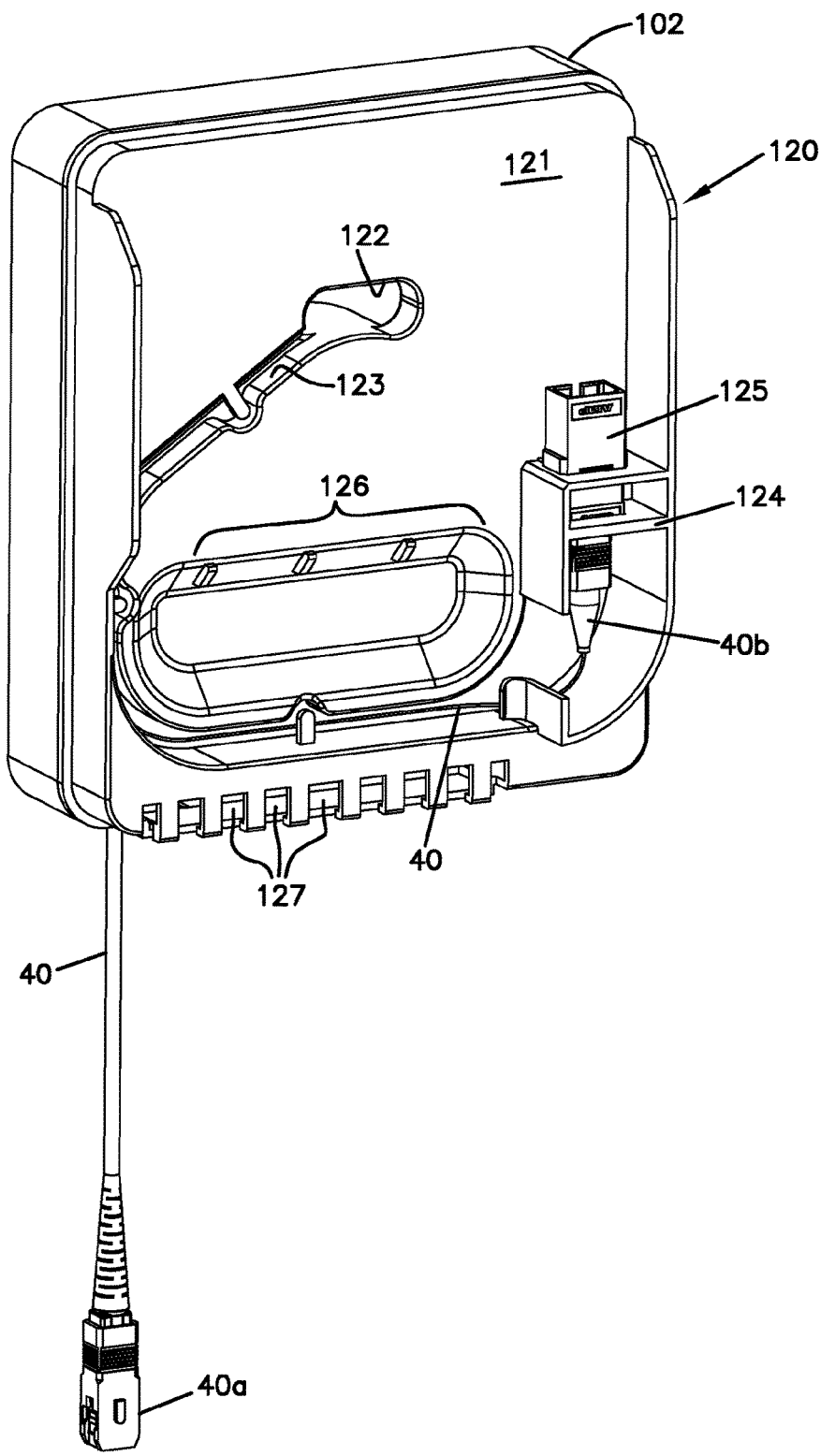
FIG. 3 is a front perspective view of the fiber distribution terminal of FIG. 2 with the cover removed so that a rotatable arrangement is visible.
Figure 4:
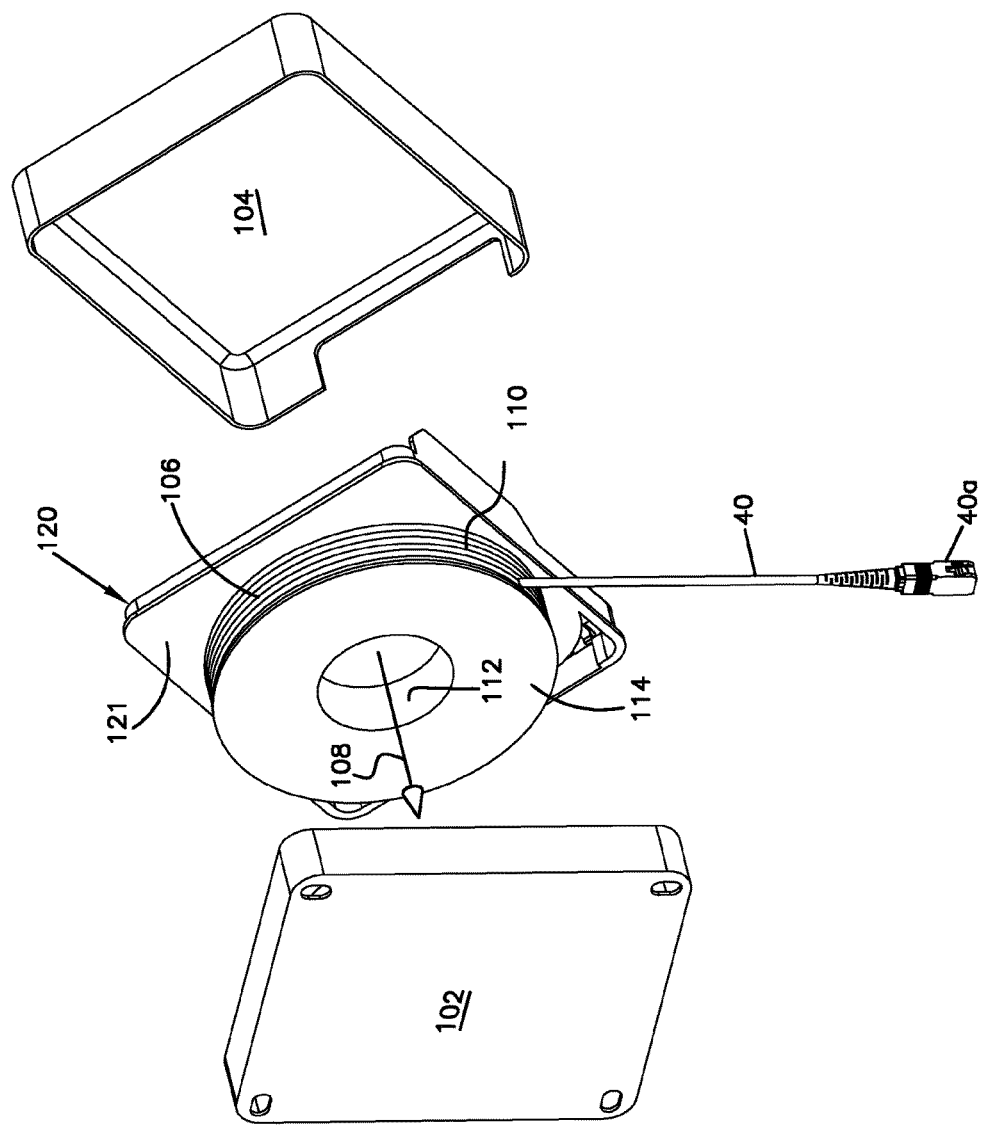
FIG. 4 is a rear perspective view of the fiber distribution terminal of FIG. 3 with the rotatable arrangement exploded from a base.

FIGS. 2-11 show an example fiber distribution terminal 100 that is one example of a configuration for the fiber distribution terminals 30 of FIG. 1A. The fiber distribution terminal 100 includes a housing 101 having a base 102 and a front cover 104. The front cover 104 is movable (e.g., pivotally moveable) relative to the base 102 between an open position and a closed position (see FIG. 2). In certain implementations, the front cover 104 is removable from the base 102. The fiber distribution terminal 100 also includes a rotatable arrangement 106 positioned within housing 101. The rotatable arrangement 106 can rotate relative to the housing 101 about an axis of rotation 108 (FIG. 4). The rotatable arrangement 106 can be rotatably mounted on a spindle 109 coupled to the base 102 and aligned along the axis of rotation 108 (See FIG. 5).

Figure 5:
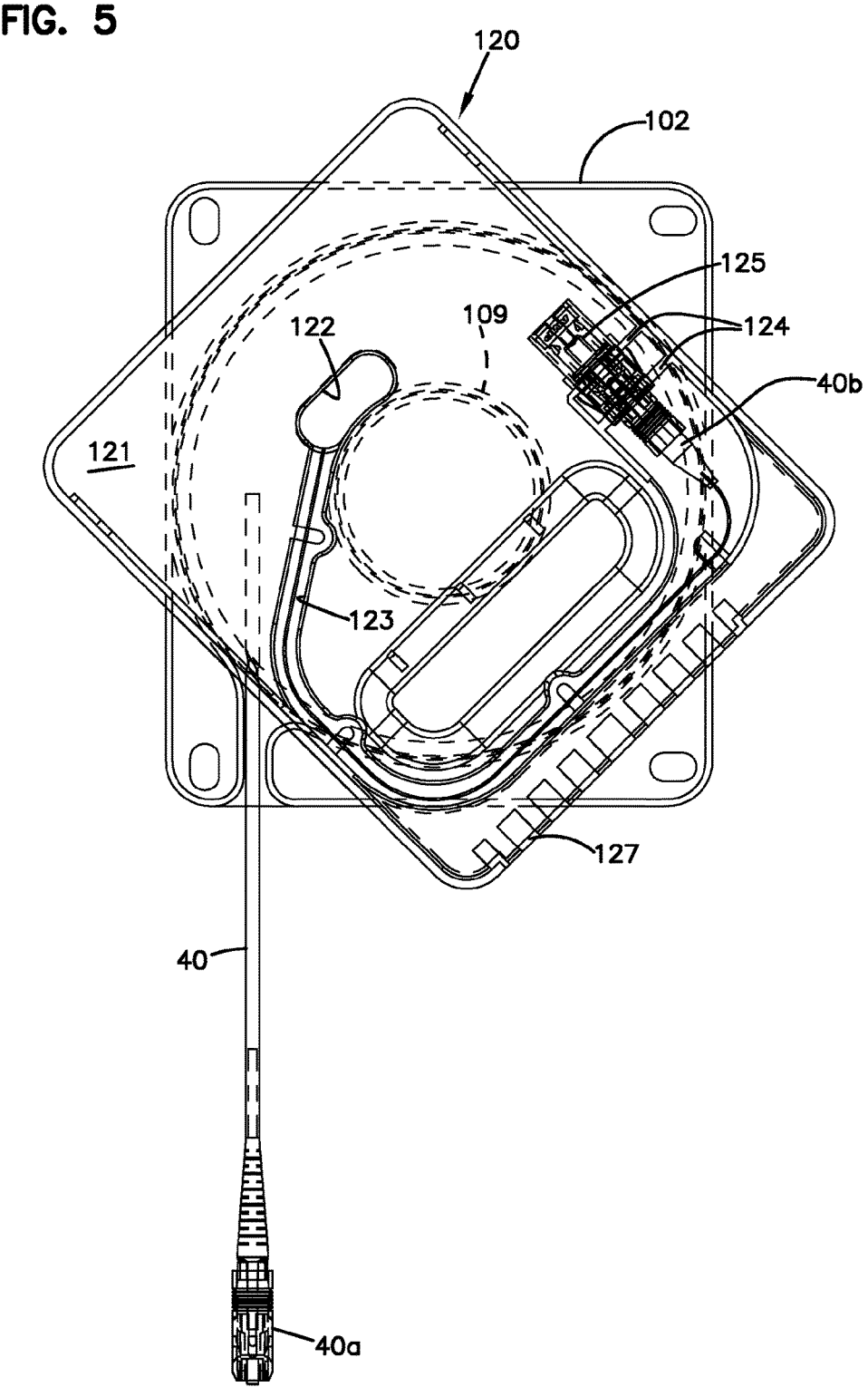
FIG. 5 is a front perspective view of the fiber distribution terminal of FIG. 4.
Figure 6:
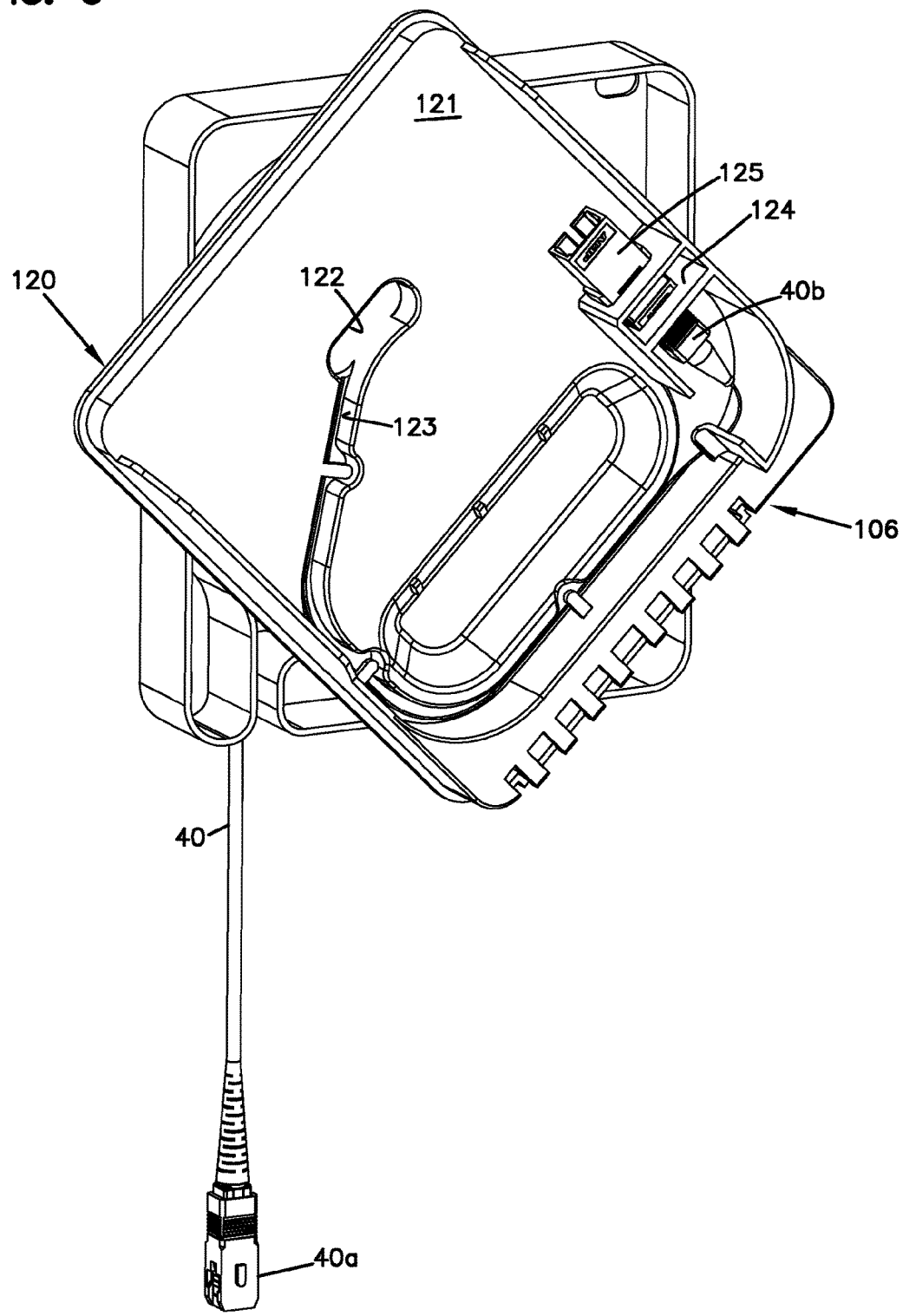
FIG. 6 is a front perspective view of the fiber distribution terminal of FIG. 3 with the rotatable arrangement assembled on the base.

Referring to FIGS. 3-5, the rotatable arrangement 106 includes a spool 110 and a management tray 120 that rotate unitarily with each other. The spool 110 includes a drum portion 112 about which the fiber optic cable 40 is coiled. The spool 110 also includes a flange 114 that retains the cable 40 on the spool 110. The spool 110 includes a second flange spaced from the first flange 114 along the axis of rotation 108. In some implementations, the second flange forms a management tray 120 at which the cable 40 is coupled to the patch cords 50. In one example, the fiber optic cable 40 can include a single optical fiber and can include a first end 40a (FIG. 3) that is connectorized by a single fiber optical connector (e.g., an SC connector, an LC connector, etc.). The first end 40a of the fiber optic cable 40 can be routed to the fiber distribution hub 20 for connection to the feed fiber 22 as described above.

The fiber management tray 120 includes a base 121 extending generally parallel with the flange 114. The base 121 defines an aperture 122 through which a second end 40b of the fiber optic cable 40 can be routed to an opposite side of the base 121 from the spool 110. In certain implementations, a bend radius limiter extends rearwardly from the base 121 at the aperture 122 to inhibit excessive bending of the cable 40 when the cable 40 transitions through the aperture 122. The base 121 also defines a channel 123 or other structures for providing fiber bend radius protection for routing the second end 40b of the cable 40 to a holding location 124 on the management tray 120. In some implementations, the cable second end 40b is connectorized by a single fiber optical connector (e.g., an SC connector, an LC connector, etc.). In such implementations, an adapter 125 can be disposed at the holding location 124 and the connectorized end 40b can be inserted into one port of the adapter 125 (see FIG. 3).

To deploy the fiber distribution terminal 100, the terminal 100 is positioned at the desired floor 12b-12d and the fiber optic cable 40 is paid off from the spool 110 by pulling on the first end 40a of the fiber optic cable 40. The first end 40a of the fiber optic cable 40 is pulled down the riser 14 to the fiber distribution hub 20. As the fiber optic cable 40 is paid off from the spool 110, the rotatable arrangement 106 rotates relative to the housing 101 about the axis of rotation 108 defined by the spindle 109. The management tray 120, the adapter 125, and the second end 40b of the cable 40 are carried with the rotatable arrangement 106 and rotate in unison with (i.e., in concert with) the rotatable arrangement 106 about the axis of rotation 108 as the fiber optic cable 40 is paid off from the rotatable arrangement 106 (see FIG. 6).

After the cable 40 has been connected to the fiber distribution hub 20, the second end 40b of the cable 40 remains at the adapter 125 awaiting a subscriber on the relevant floor 12b-12d to request service. In certain implementations, the rotatable arrangement 106 can be rotationally locked in position when the cable is dispensed. Upon a request for service, an optical splitter 70 can be installed on the management tray 120 (see FIG. 7). The optical splitter 70 includes a body/housing 71 having at least one input region 72 and at least one output region 74. The optical splitter body 71 also defines a connection interface 75 that mounts the splitter body 71 to the base 121 of the tray 120. For example, the connection interface 75 may couple to a mounting interface 126 (e.g., latches, snaps, dove tail, etc.) on the tray 120 (see FIG. 5). In certain implementations, the terminal 100 includes surrounding structure that holds the splitter body 71 in position.

Figure 7:
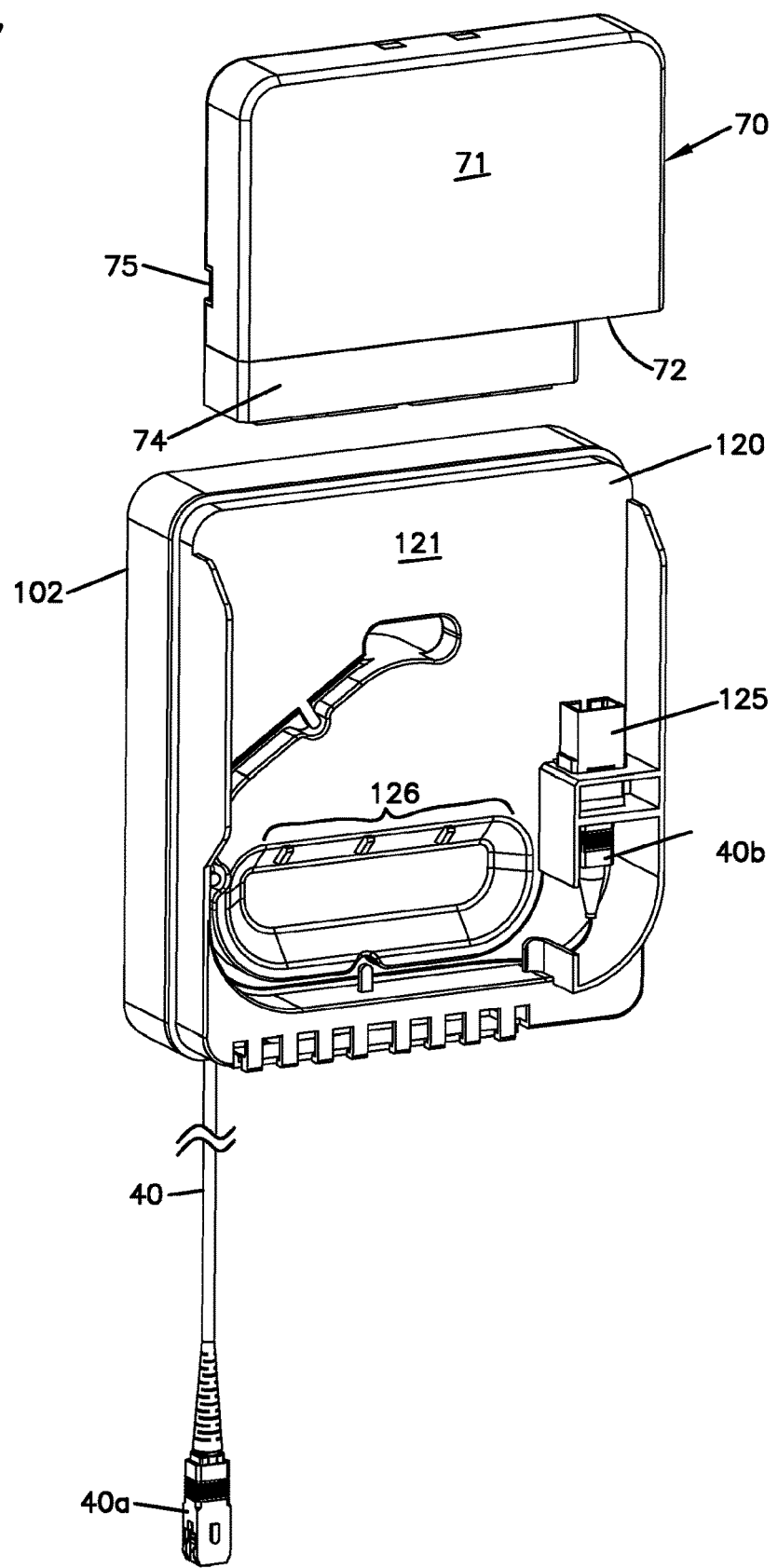
FIG. 7 is a front perspective view of the fiber distribution terminal of FIG. 3 with an example optical splitter exploded from the rotatable arrangement.
Figure 8:
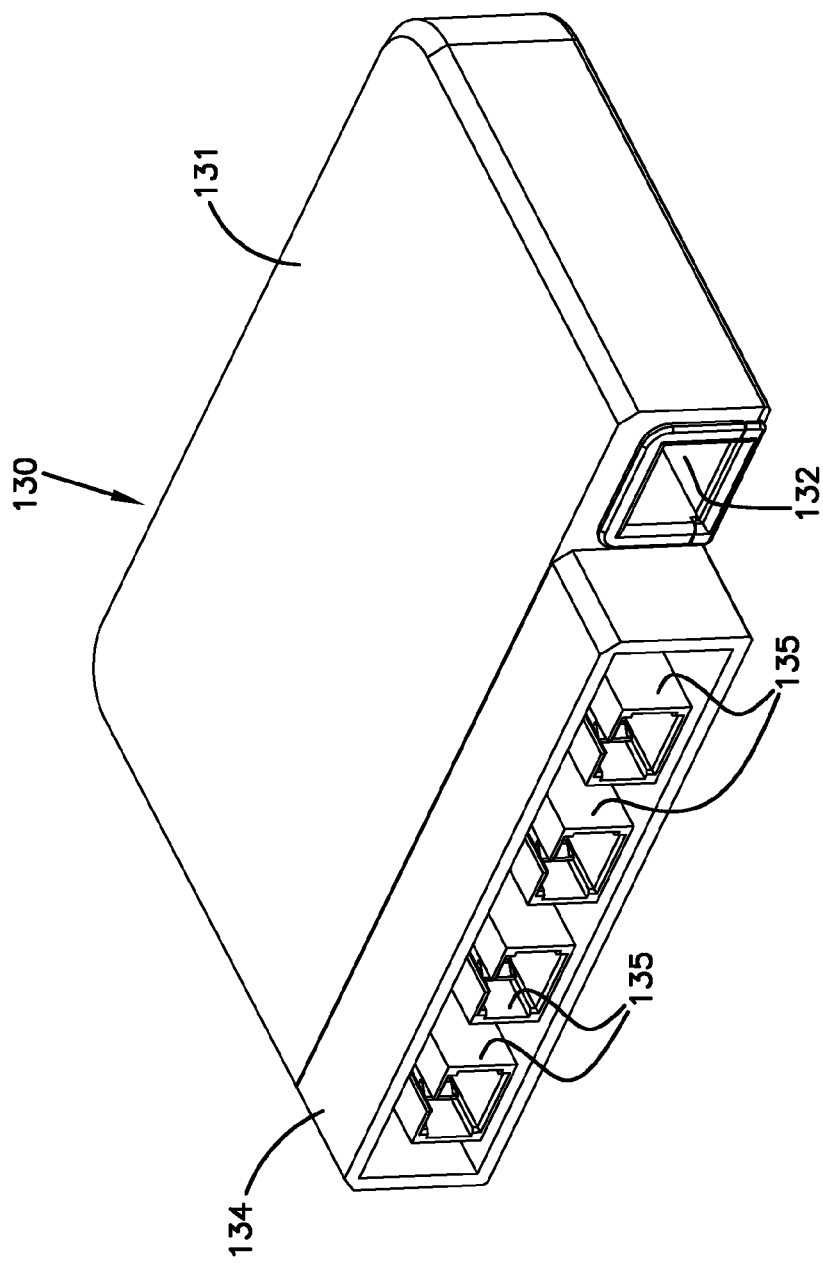
FIG. 8 is a perspective view of a first example splitter module suitable for use as the optical splitter in FIG. 7.
Figure 9:
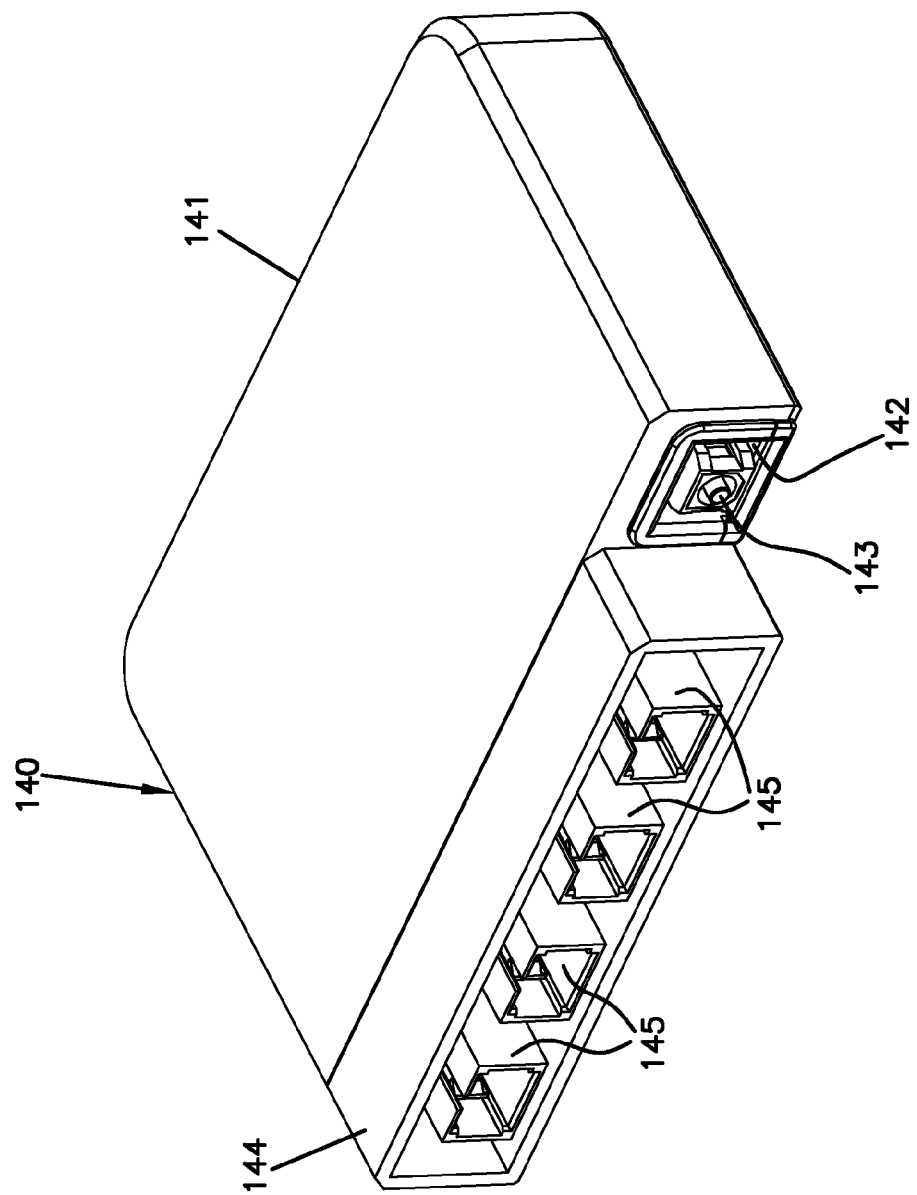
FIG. 9 is a perspective view of a second example splitter module suitable for use as the optical splitter in FIG. 7.
Figure 10:
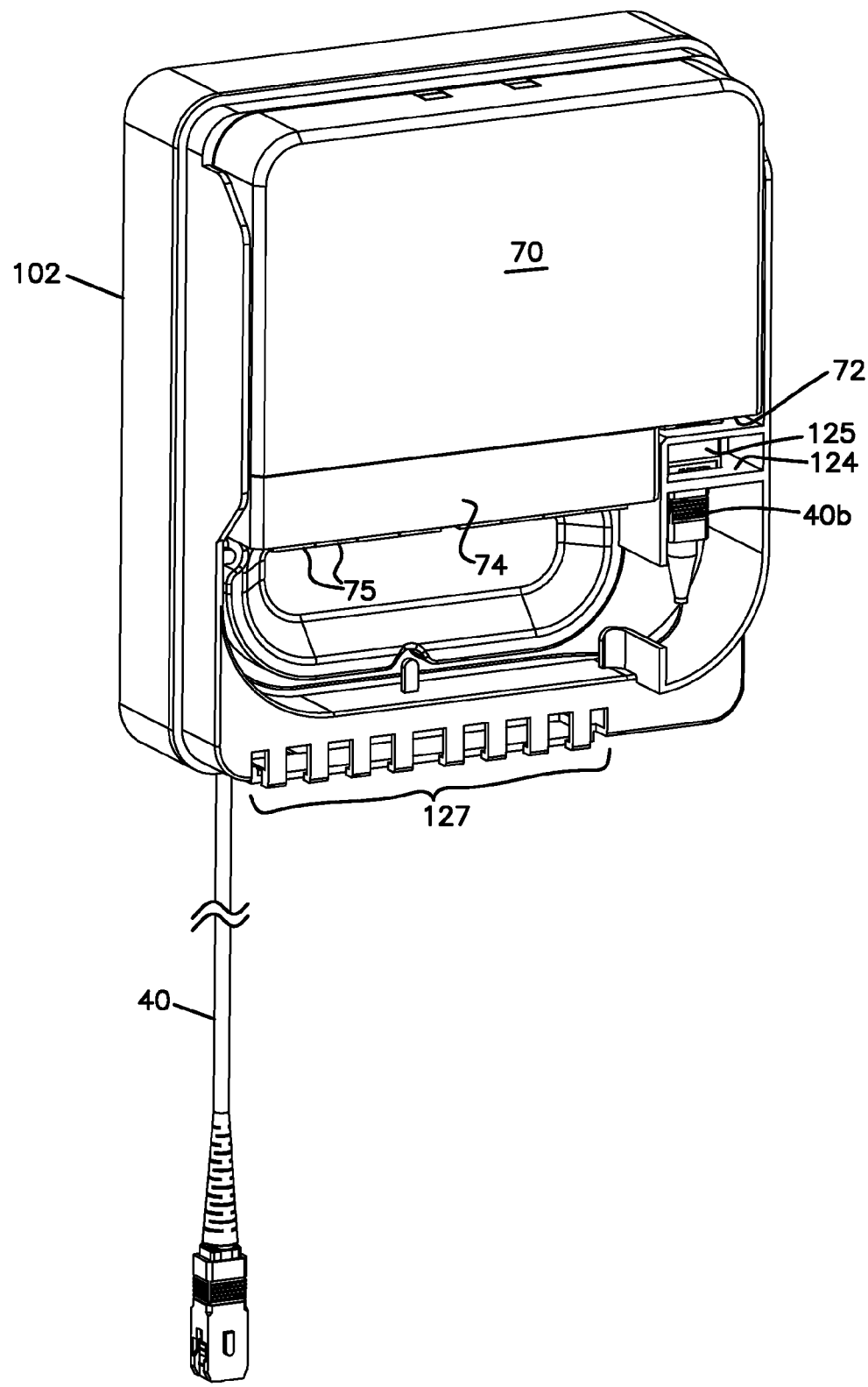
FIG. 10 is a front perspective view of the fiber distribution terminal of FIG. 7 with the example optical splitter assembled to the rotatable arrangement.

FIGS. 8 and 9 illustrate example implementations of optical splitters 130, 140, respectively, that are examples of configurations for the optical splitters 70 of FIG. 7. Each of the optical splitters 130, 140 has a common peripheral profile despite having a different number of output ports. Accordingly, either of the optical splitters 130, 140 can fit into the same space within a terminal 30, hub 20, or other enclosure. In the example shown, the input port of the optical splitter 130, 140 is disposed at a common side with the output ports. In other implementations, however, the input port can be disposed at a different side of the splitter 130, 140 from the output ports. In certain implementations, the optical splitters 130, 140 can include multiple input ports.

As shown in FIG. 8, the example optical splitter module 130 has a splitter body/housing 131 defining an input region 132 and an output region 134. In the example shown, the input region 132 includes an adapter defining an empty port at which the connectorized end 40a of the cable 40 can be received. For example, the connectorized end 40a can be stored at a fixed location within the distribution terminal 100 so that mounting the splitter 130 to the terminal 100 causes the connectorized end 40a to enter the adapter. The opposite end of the adapter receives a connectorized end of an internal fiber leading to an optical splitter within the housing 131. In other implementations, the input region 132 may include the connectorized end of an internal fiber leading to the optical splitter within the housing 131 (see FIG. 9). In the example shown, the output region 134 includes multiple adapter output ports 135 at which first ends 50a of the patch cords 50 can be received. In the example shown, the output region 134 includes four adapter output ports 135.

As shown in FIG. 9, the example optical splitter module 140 has a splitter body/housing 141 defining an input region 142 and an output region 144. In the example shown, the input region 142 includes a connectorized end 143 of an internal fiber leading to an optical splitter within the housing 141. The connectorized end 143 is configured to be received at the adapter 125 when the splitter module 140 is installed at the tray 120 (see FIG. 10). In other implementations, the input region 142 may include an adapter defining an empty outward-facing port, such as that shown in FIG. 8. In the example shown, the output region 144 includes multiple adapter ports 145 at which first ends 50a of the patch cords 50 can be received. In the example shown, the output region 144 includes eight adapter output ports 145.

In some implementations, the splitter body 131 of the splitter module 130 has the same dimensions as the splitter body 141 of the splitter module 140. In certain implementations, the output region 134 of the splitter module 130 has the same dimensions as the output region 144 of the splitter module 140 (e.g., compare FIGS. 8 and 9). In some such implementations, the adapter ports of the output region 134 accommodating fewer output paths are more spaced apart than the adapter ports of the output region 144 accommodating more output paths. In some such implementations, the adapter ports of the output region 134 accommodating fewer output paths can include SC-type adapters and the adapter ports of the output region 144 accommodating more output paths can include LC-type adapters, LX.5-type adapters, or other such high density adapters.

Installing the optical splitter modules 70, 130, 140 only when service is needed reduces the initial installation cost of the network. Furthermore, locating the adapters 135, 145 on the splitters 70, 130, 140 further reduces the initial installation cost of the network by reducing the number of components that must be installed at the fiber distribution terminals 100 before service is requested. In addition, the optical splitter modules 70, 130, 140 described above also can be installed at the fiber distribution hub 20 as the optical splitters 26. For example, the optical splitters 70, 130, 140 of the fiber distribution terminals 100 can be interchangeable with the splitters 26 at the fiber distribution hub 20.

Figure 11:
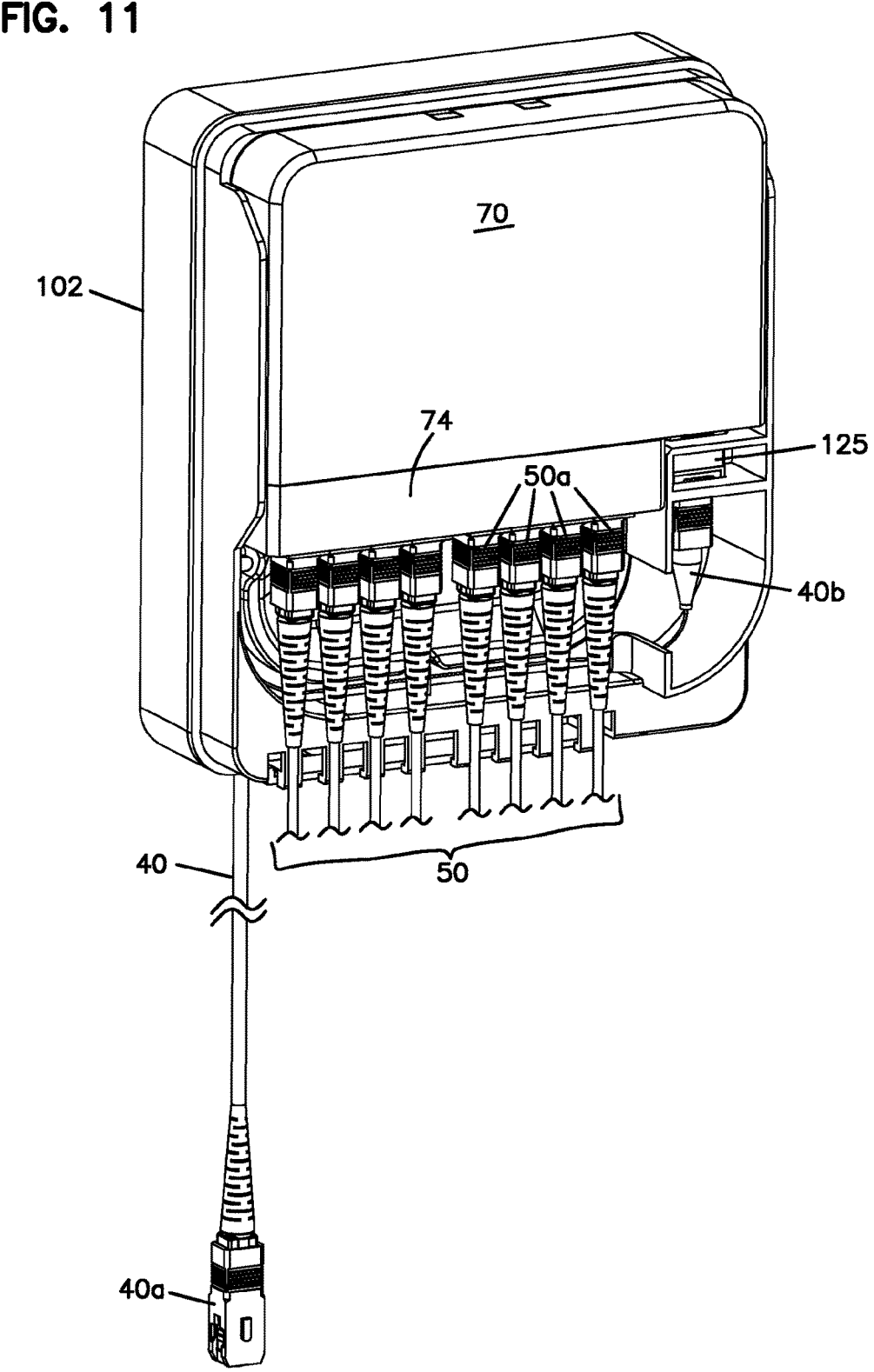
FIG. 11 is a front perspective view of the fiber distribution terminal of FIG. 10 with patch cords plugged into adapter outputs of the optical splitter.
Figure 12:
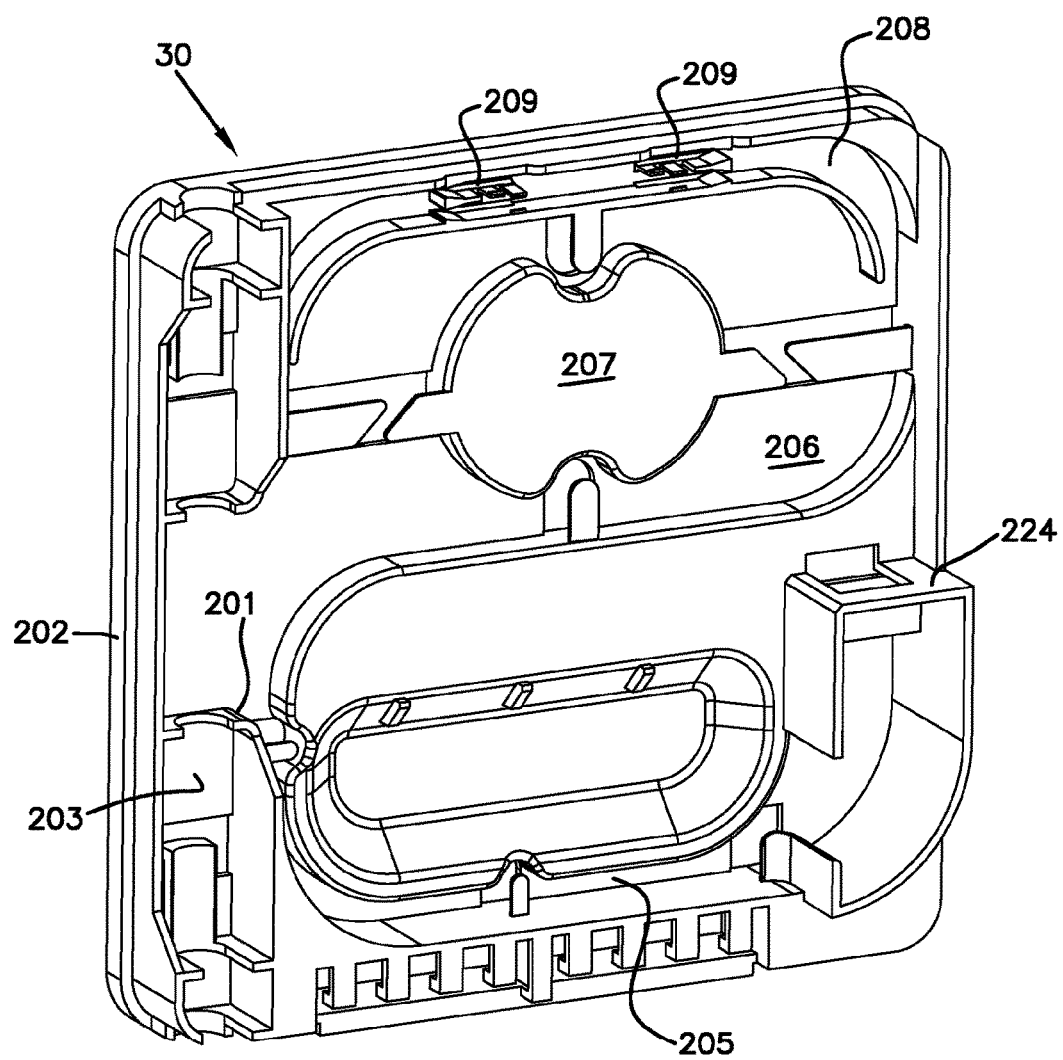
FIG. 12 is a front perspective view of another example fiber distribution terminal shown empty and with a cover removed.

As shown in FIG. 11, the patch cords 50 can be used to connect the ONT's 60 to the fiber distribution terminal 100. For example, the first ends 50a of the patch cords 50 can be inserted into the output ports 135, 145 of the splitter module 70, 130, 140 as needed. For example, the patch cords 50 can be routed onto the tray 120 through ports 127 (see FIG. 5). A gasket or other sealing member can be provided at the ports 127 to weather-proof the interior of the fiber distribution terminal 100. After deployment of the fiber distribution terminal 100, any remaining unused length of the fiber optic cable 40 can remain coiled on the drum portion of the rotatable arrangement 106 for storage within the housing 101 of the fiber distribution terminal 100.

FIGS. 12-15 illustrate an alternative type of fiber distribution terminal 200 for use in a fiber distribution system in which a single cable or cable assembly 90 is routed from the hub 20 to the terminals 200 on each floor 12b-12d. The example terminal 200 does not include a rotatable cable storage spool.

Rather, the terminal 200 includes a base 202 defining a channel 203 through which the cable assembly 90 can be routed. The channel 203 defines a breakout region 201 at which an optical fiber of the cable assembly 90 can be accessed and pulled into the base 202. The breakout region 201 leads to a routing passage 206 that provides slack storage around a spool or bend radius limiter 207. A splicing passage 208 leads from the routing passage 206 to one or more optical splice holders 209. A pigtail passage 205 also connects to the routing passage 206 and/or to the splicing passage 208. The pigtail passage 205 extends to a holding location 224 that is configured to hold an optical adapter 225 (FIG. 13).

Figure 13:
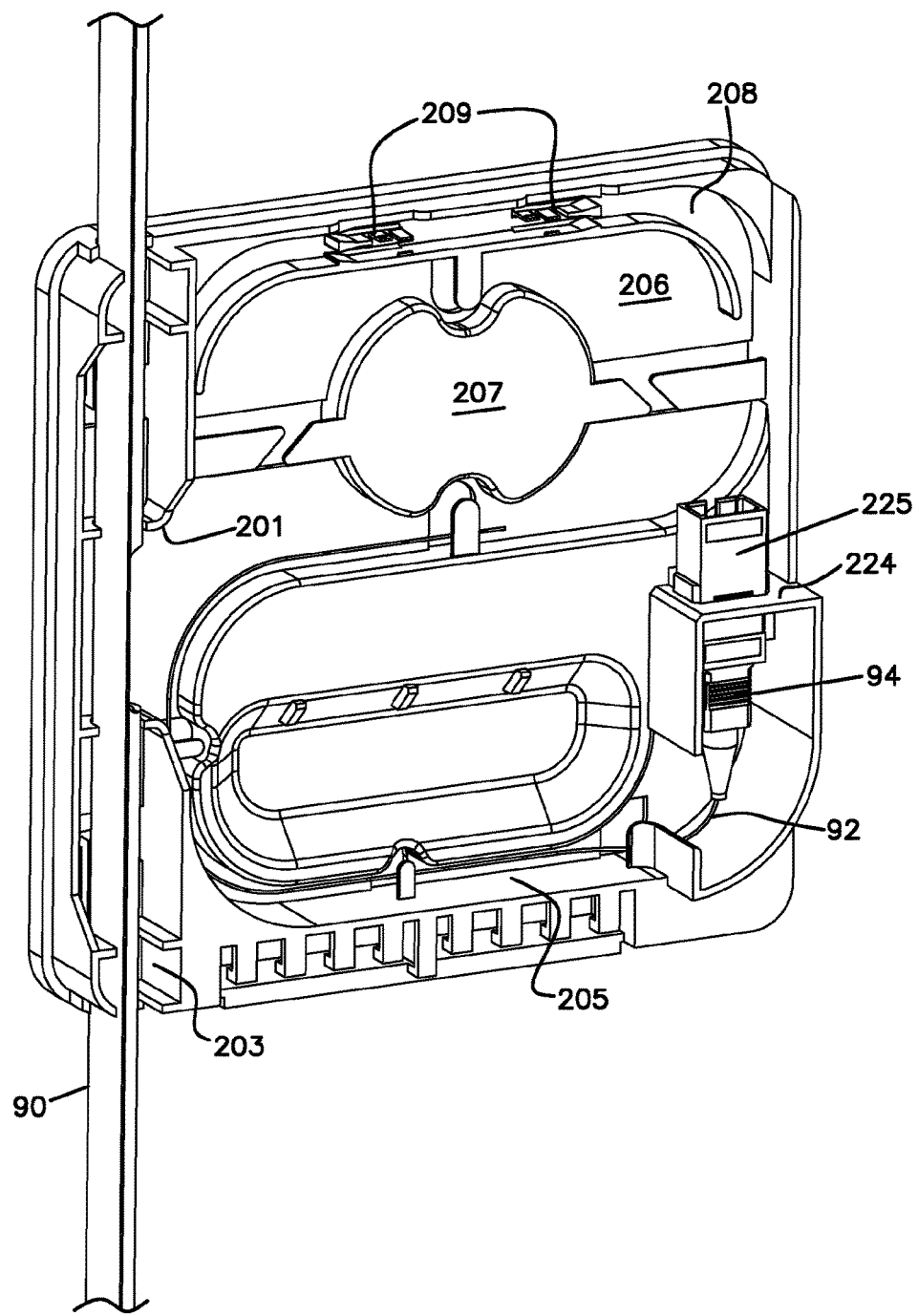
FIG. 13 is a front perspective view of the fiber distribution terminal of FIG. 12 shown with a riser cable routed therethrough and a splice pigtail shown partially routed through the terminal.

As shown in FIG. 13, the cable assembly 90, which is routed through the MDU 12 along a riser or other ducting, is disposed within the base channel 203. An optical adapter 225 is mounted to the holding location 224. A connectorized end 94 of a splice pigtail 92 is plugged into one port of the optical adapter 225. The remaining length of the splice pigtail 92 is routed through the pigtail passage 205 to the splicing passage 208. In certain implementations, excess length of the splice pigtail 92 can be stored in the routing passage 206 before the unconnectorized end of the splice pigtail 92 is routed to the splicing passage 208. An optical fiber can be broken out from the cable assembly 90, routed through the breakout region 201, along the routing passage 206, to the splicing passage 208. The optical fiber of the cable assembly 90 can be spliced (e.g., mechanical splice, fusion splice, etc.) to the splice pigtail 92 and stored at one of the splice holders 209. Thereby, optical signals are carried from the hub 20, along the fiber of the cable assembly 90, along the splice pigtail 92, to the second port of the optical adapter 225.

Figure 14:
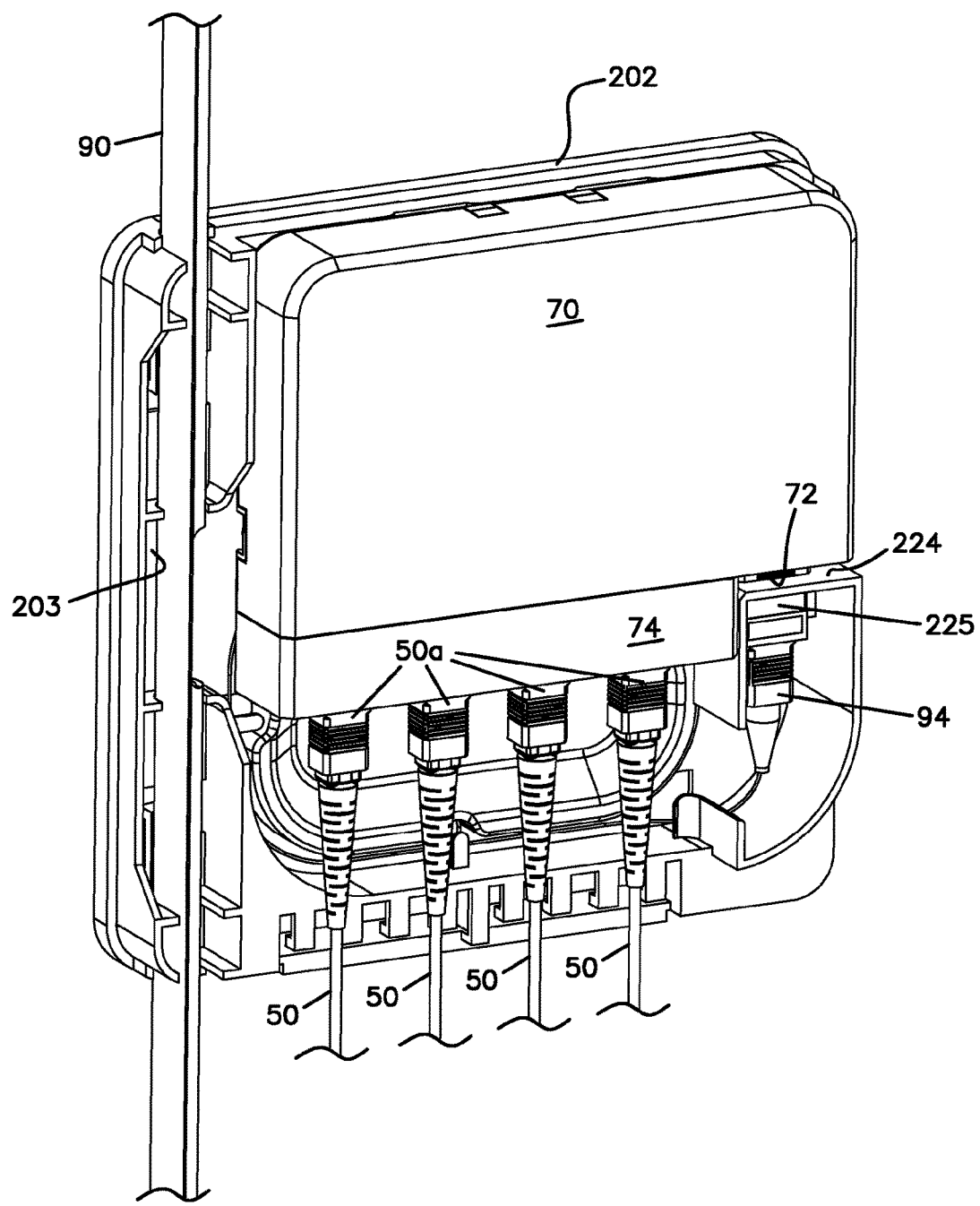
FIG. 14 is a front perspective view of the fiber distribution terminal of FIG. 13 shown with an optical splitter mounted thereto and subscriber patch cords plugged into the outputs of the splitter.
Figure 15:
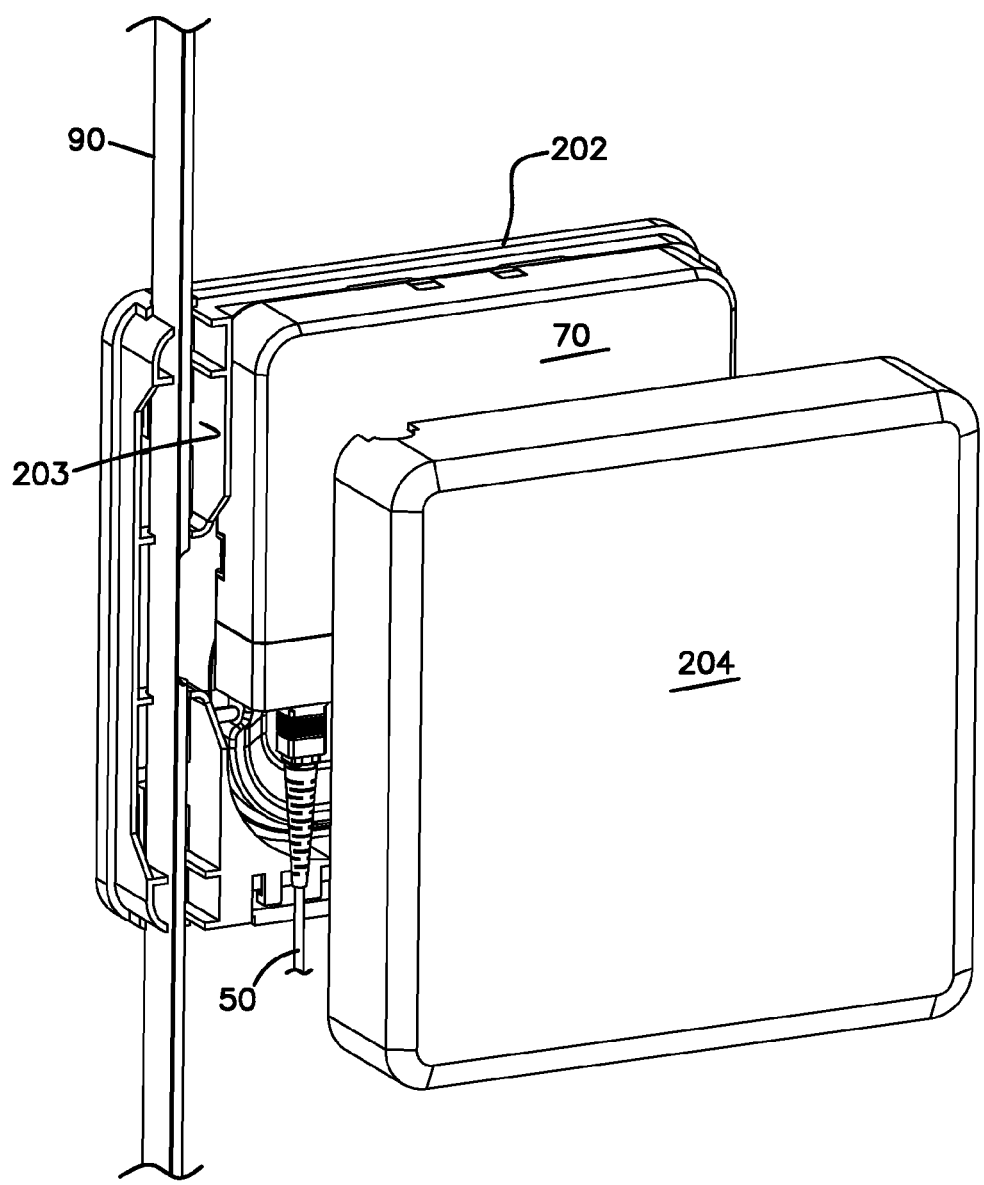
FIG. 15 is a front perspective view of the fiber distribution terminal of FIG. 12 shown with a cover exploded out from a base of the fiber distribution terminal.
Figure 16:
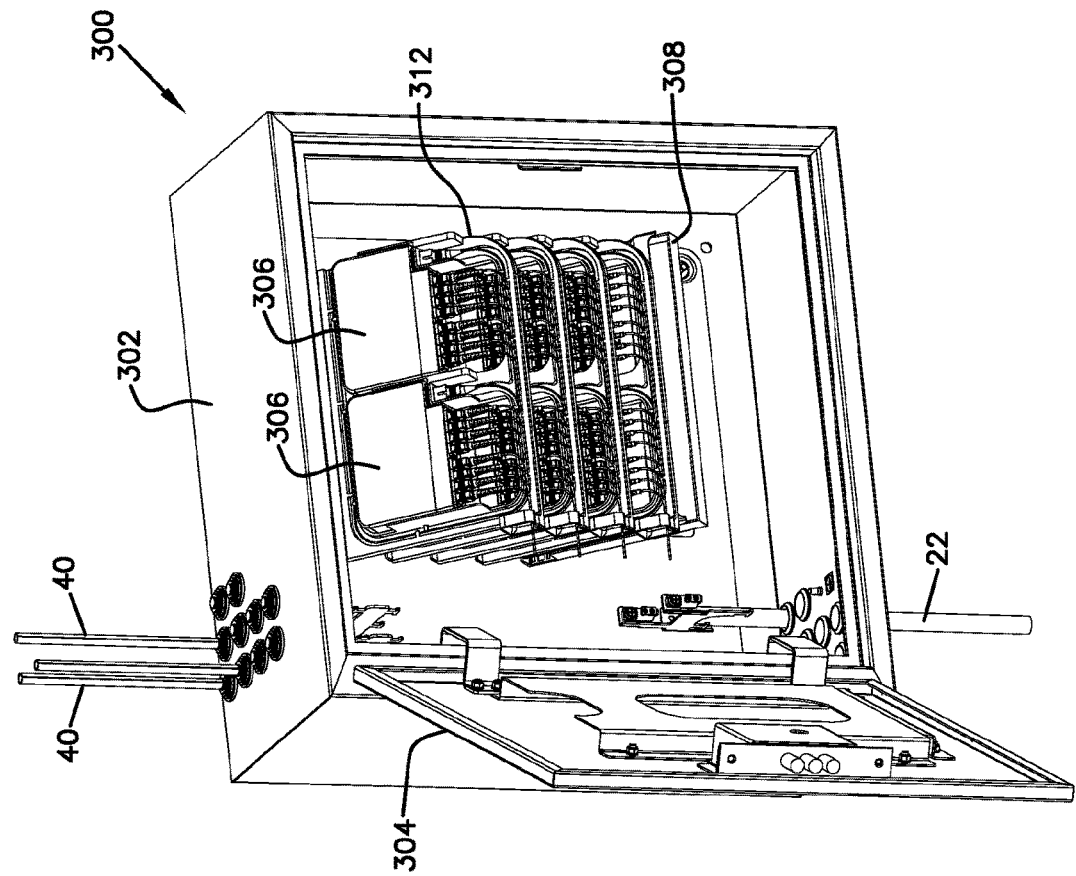
FIG. 16 is a front perspective view of a fiber distribution hub including optical splitters.
Figure 17:
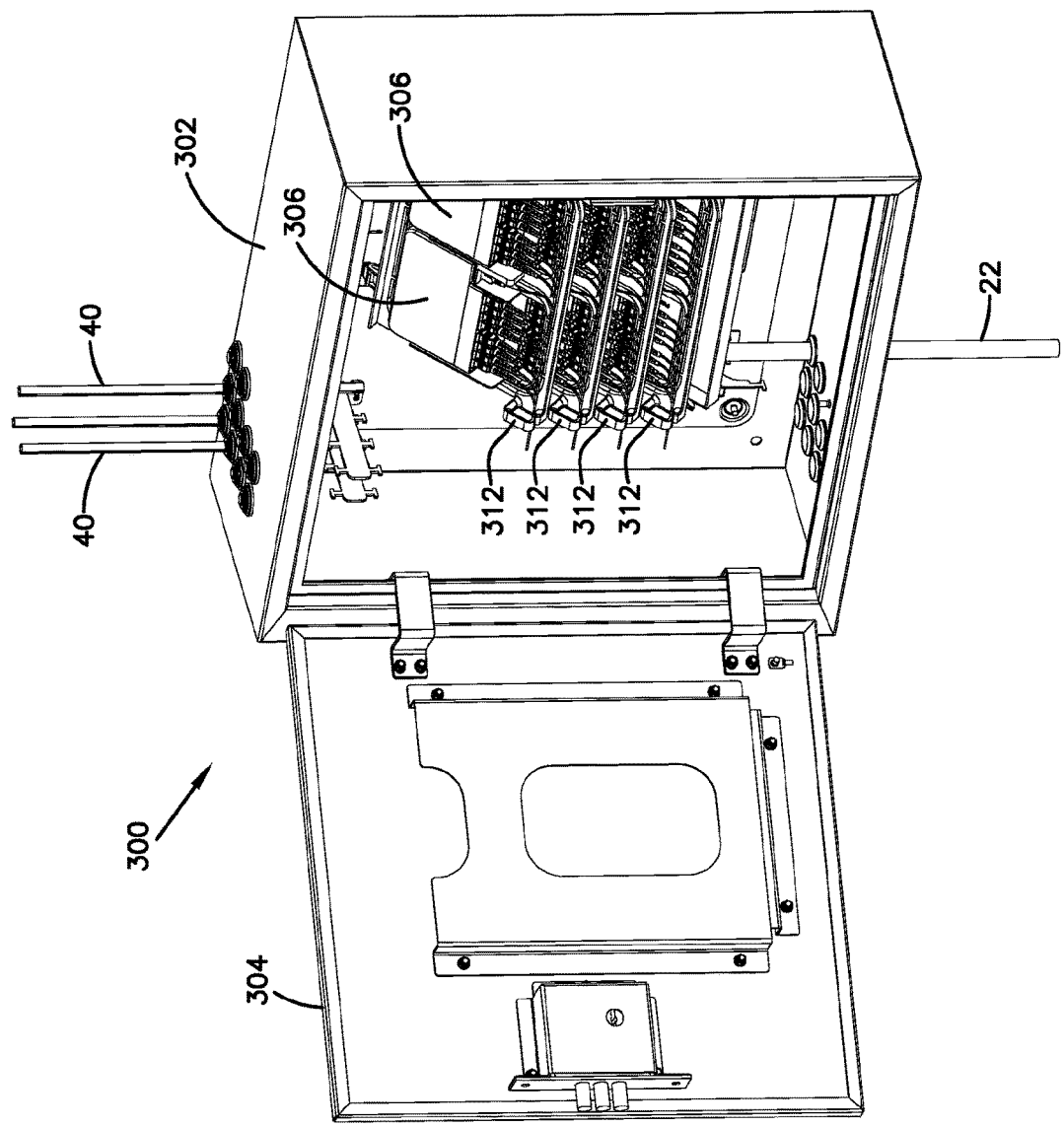
FIG. 17 is a further front perspective view of the fiber distribution hub of FIG. 16.
Figure 18:
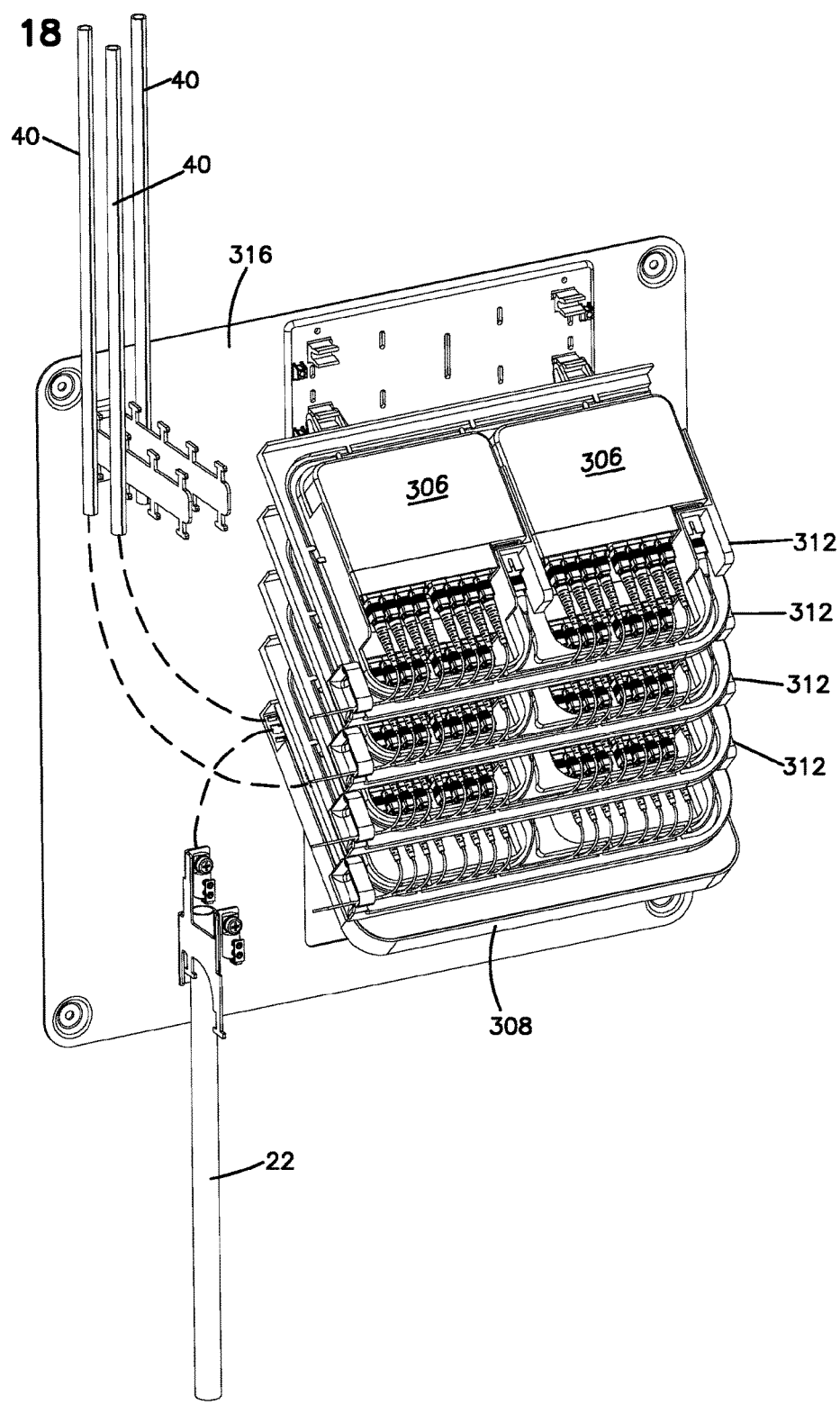
FIG. 18 is a perspective view like FIG. 16, without the enclosure shown.
Figure 19:
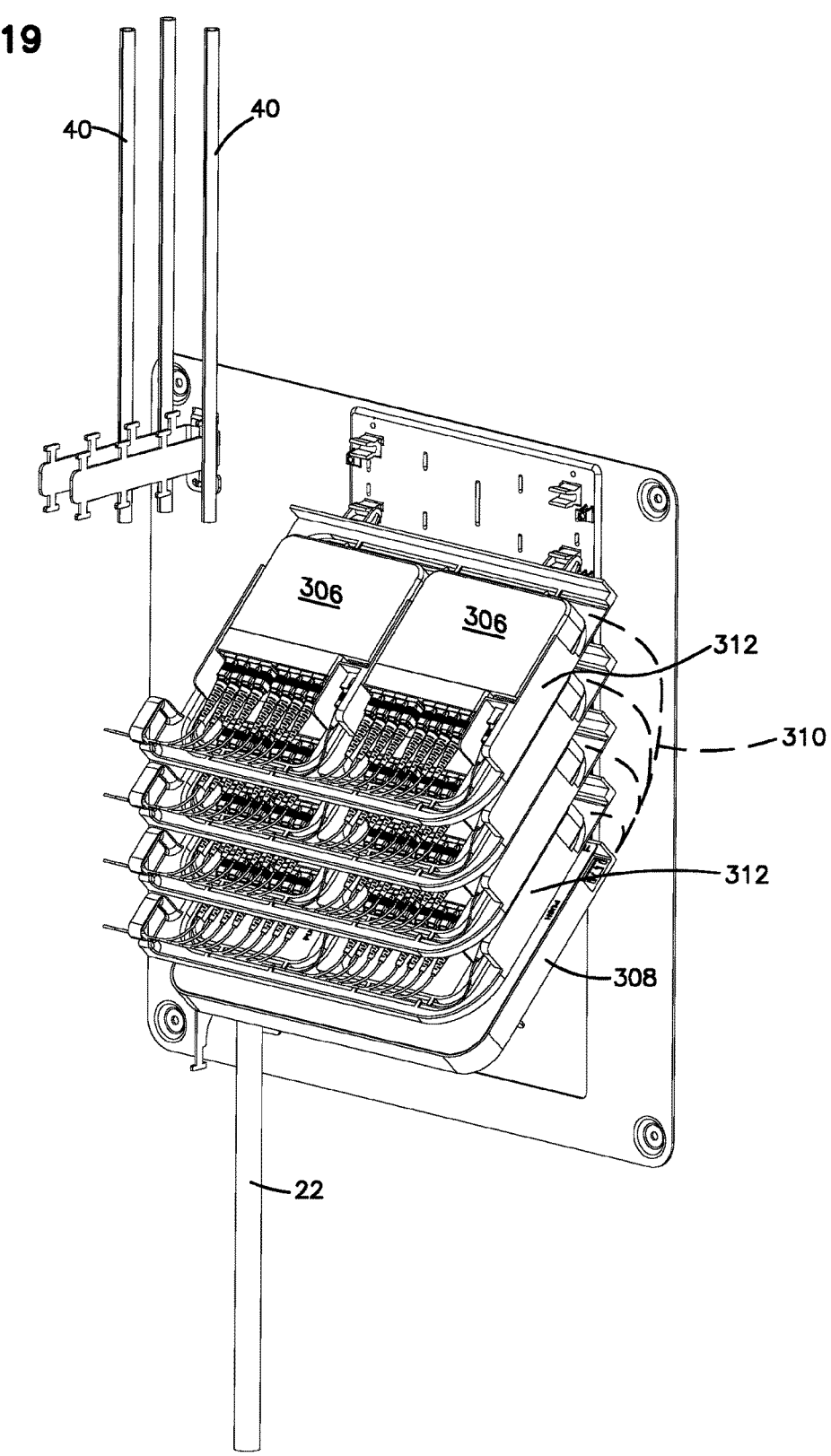
FIG. 19 is a view like FIG. 17, without the enclosure shown.
Figure 20:
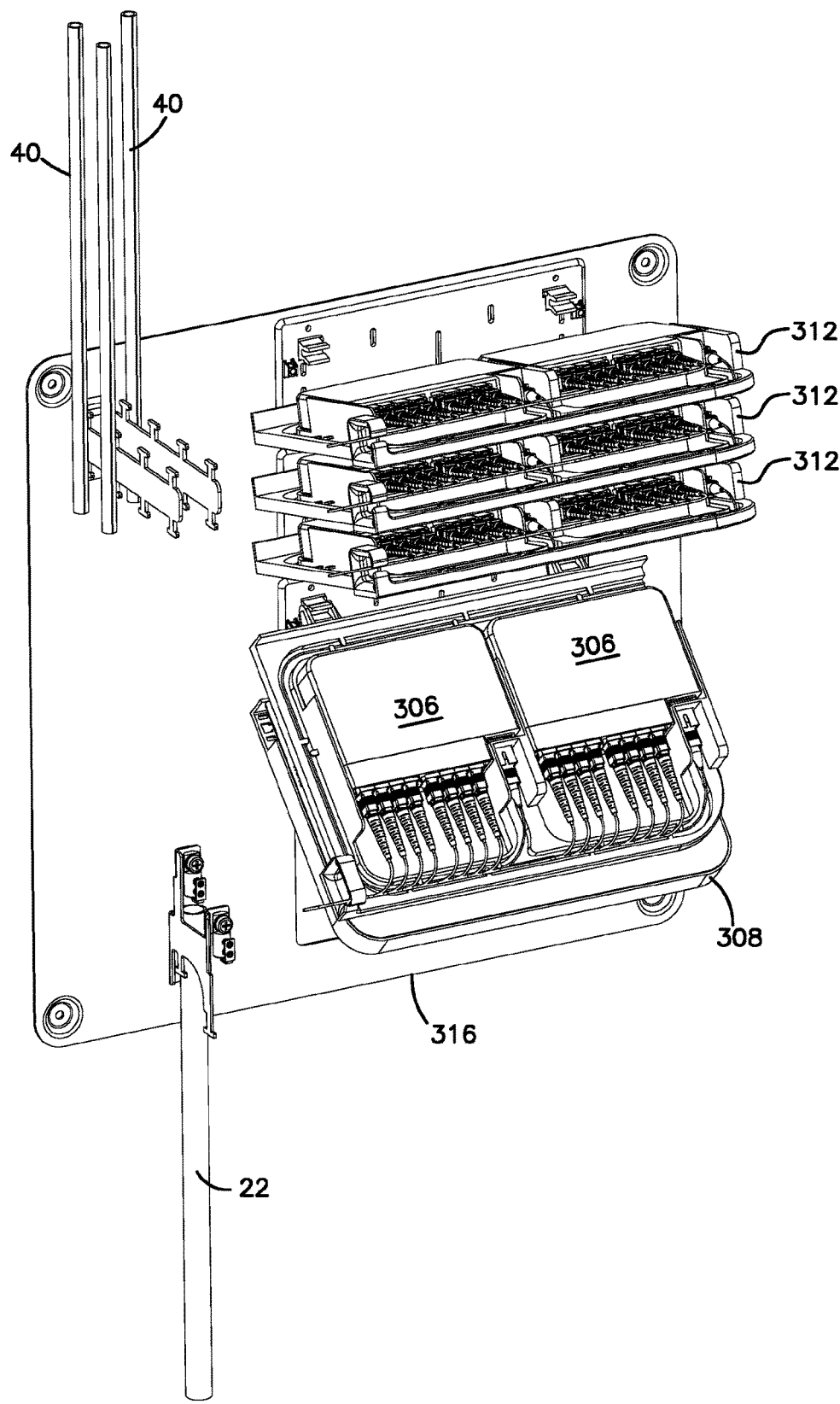
FIG. 20 is a view like FIG. 18, showing several splitter trays pivoted upwardly to access a lower tray.
Figure 21:
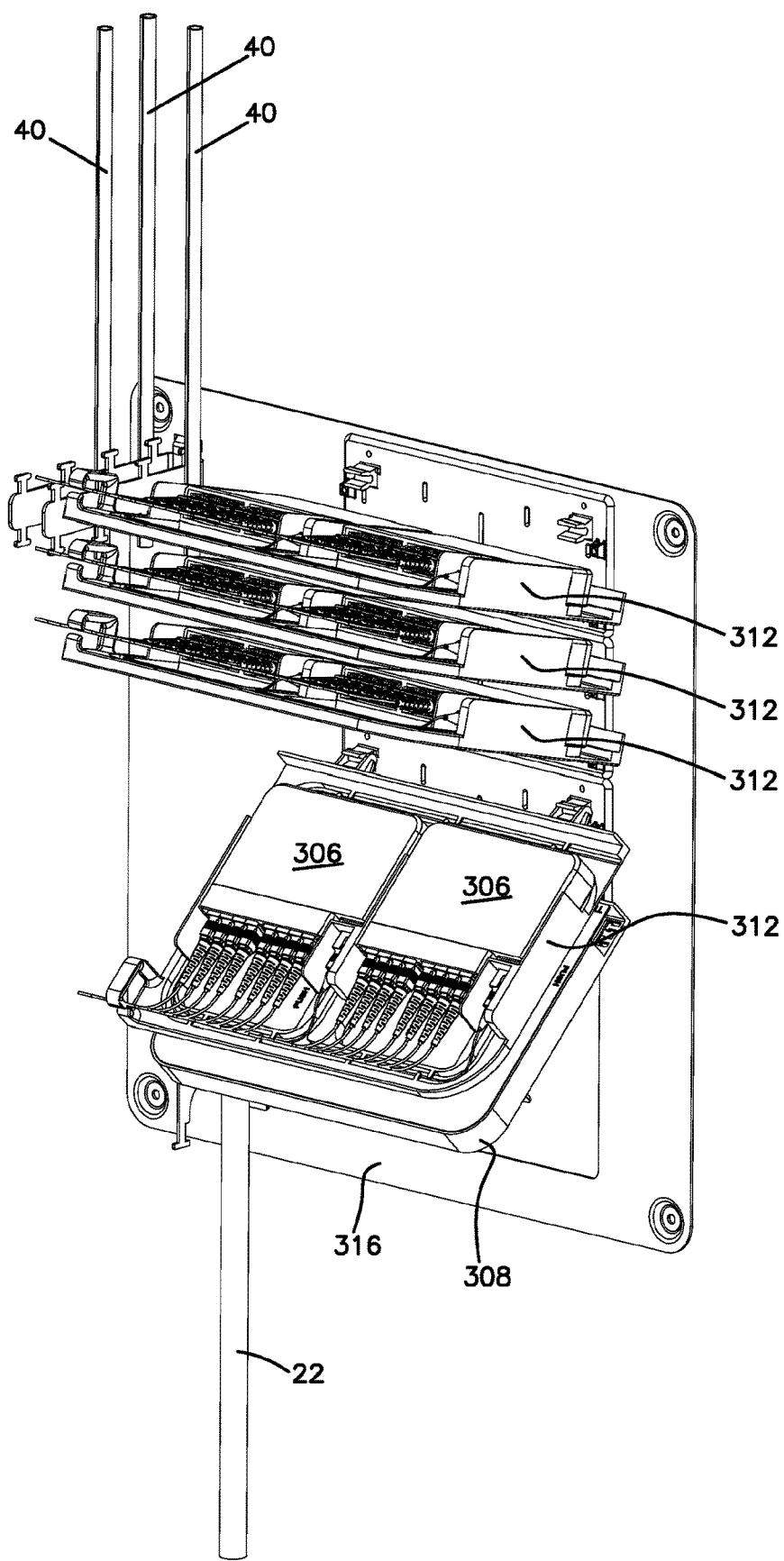
FIG. 21 is a further perspective view showing the pivoted trays.
Figure 22:
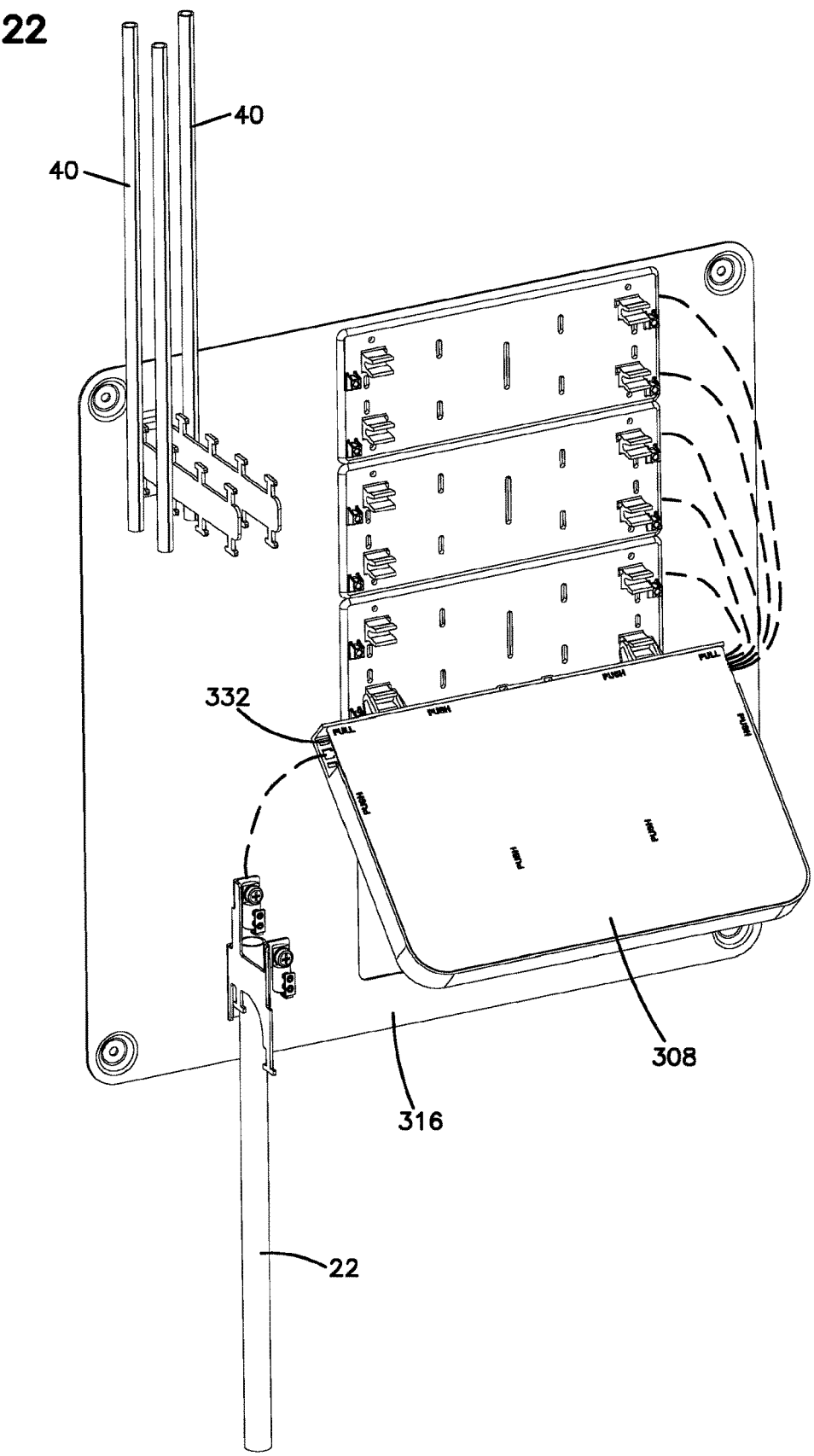
FIG. 22 shows the arrangement of FIG. 20, with the splitter trays removed, and showing a splice tray.
Figure 23:
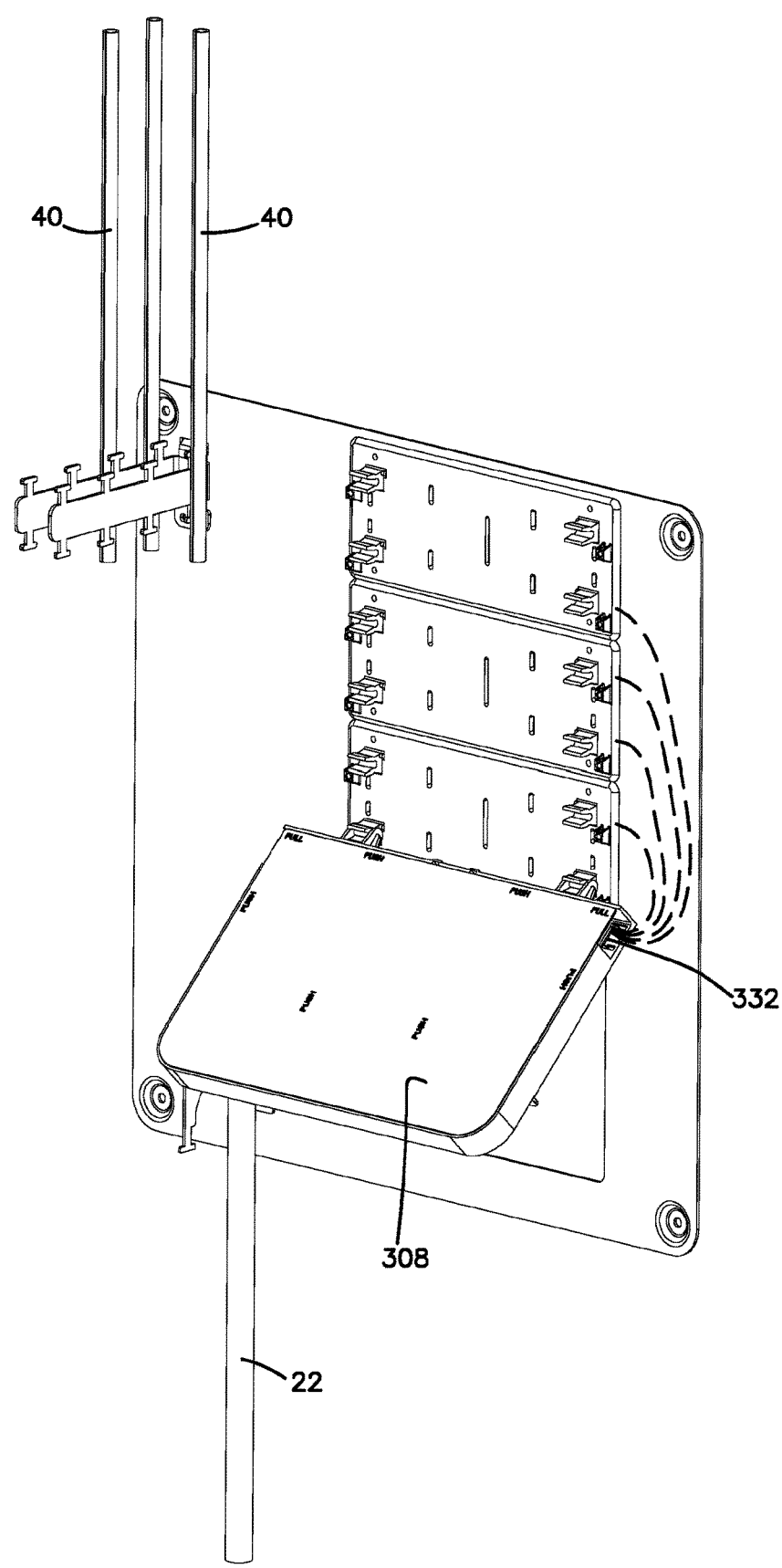
FIG. 23 shows a further perspective view of the arrangement of FIG. 22.
Figure 24:
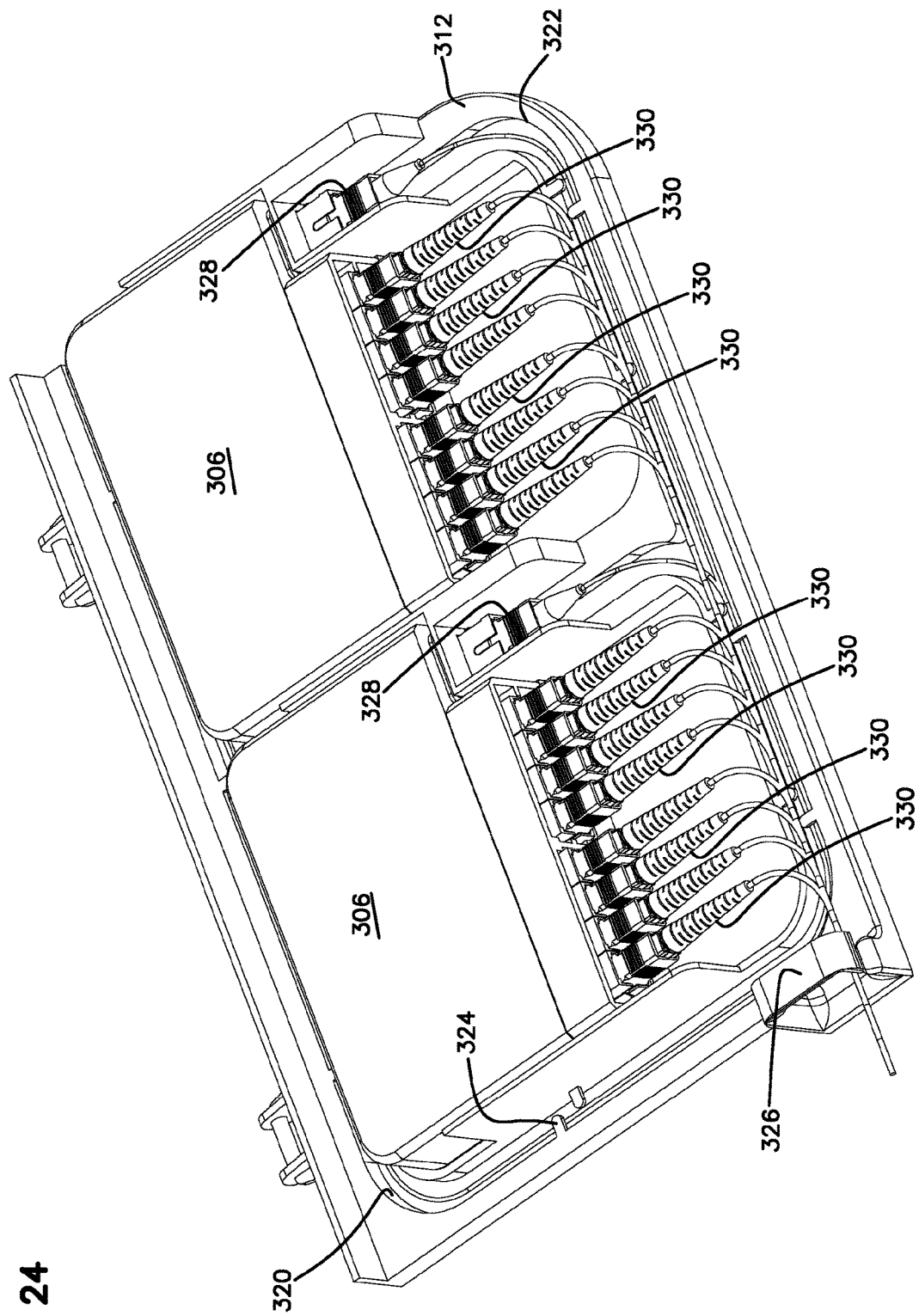
FIG. 24 is a perspective view of one of the splitter trays, including two optical splitters and showing output cables connected to each of the optical splitters.
Figure 25:
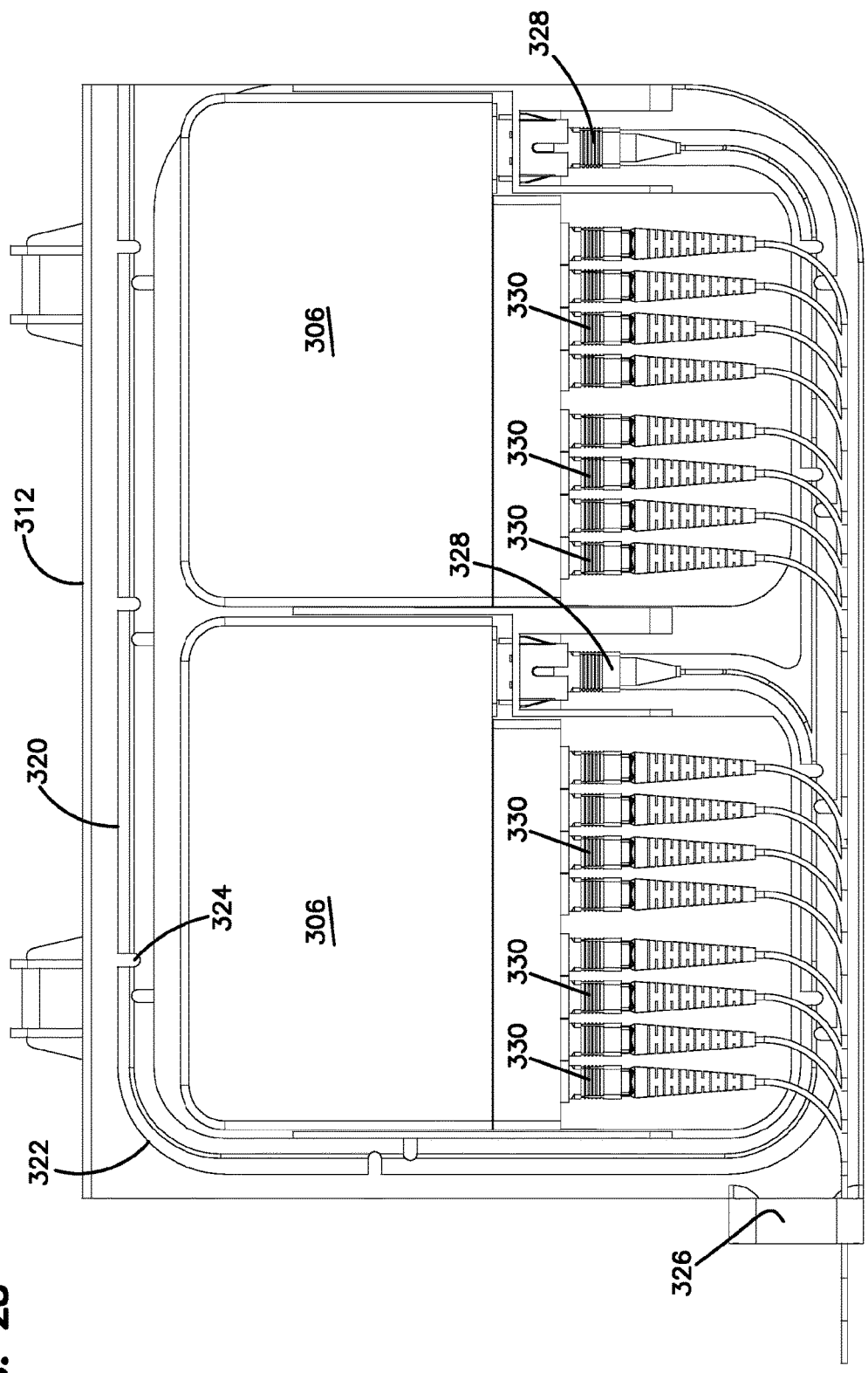
FIG. 25 is a top plan view of the splitter tray of FIG. 24.
Figure 26:
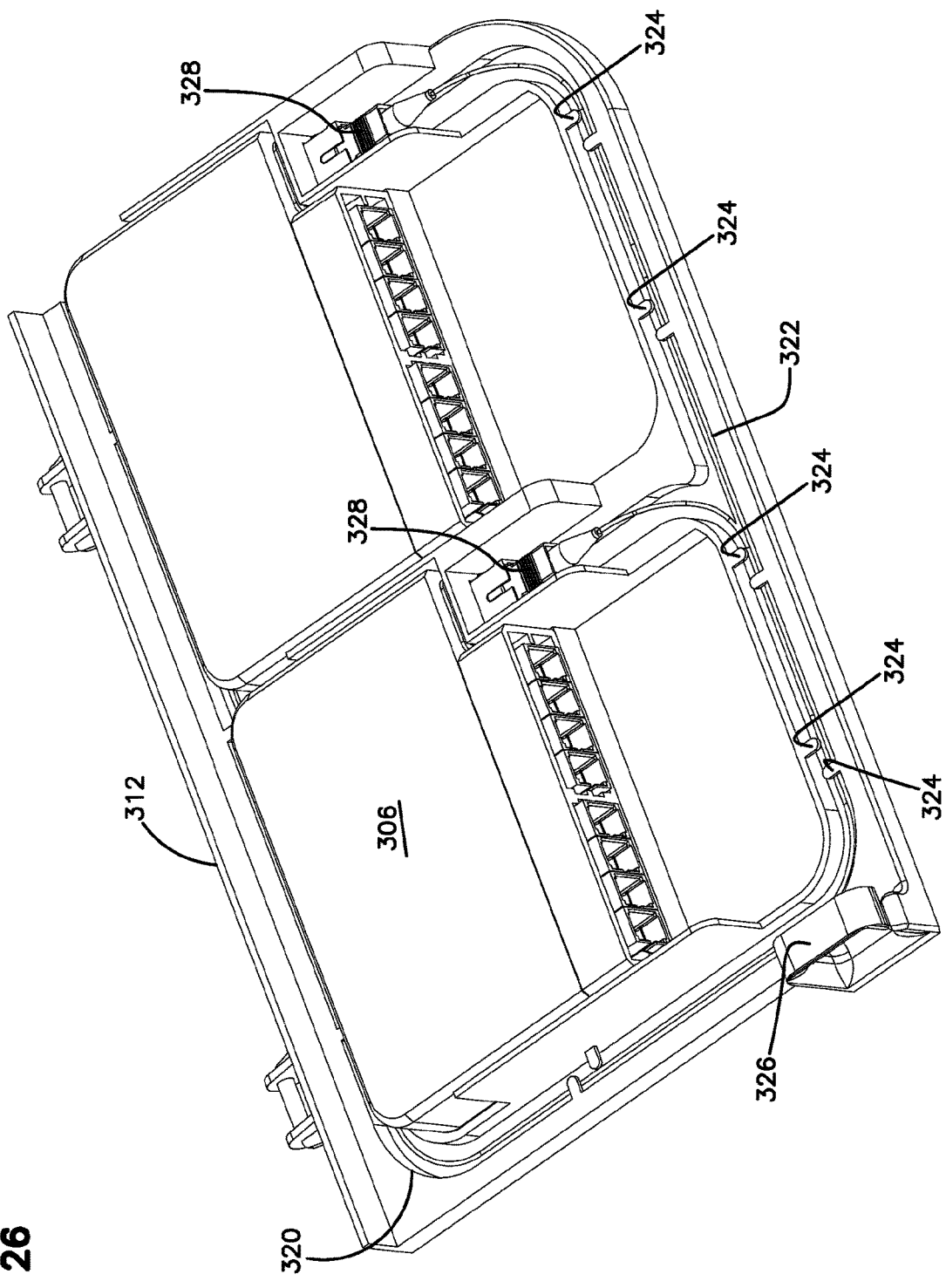
FIG. 26 is a view of the splitter tray of FIG. 24, with the output cables not shown.
Figure 27:
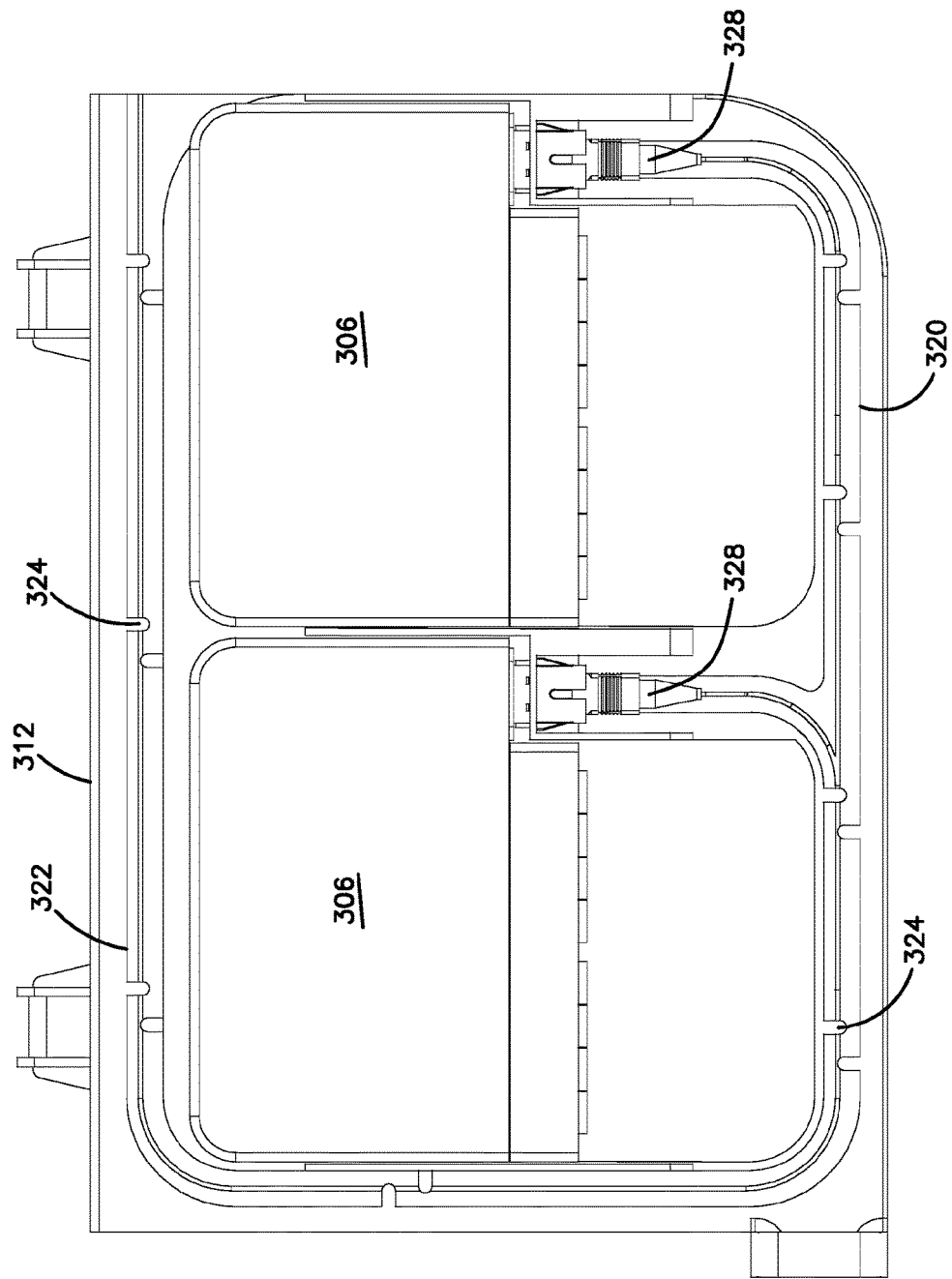
FIG. 27 is a top plan view of the arrangement of FIG. 26.
Figure 28:
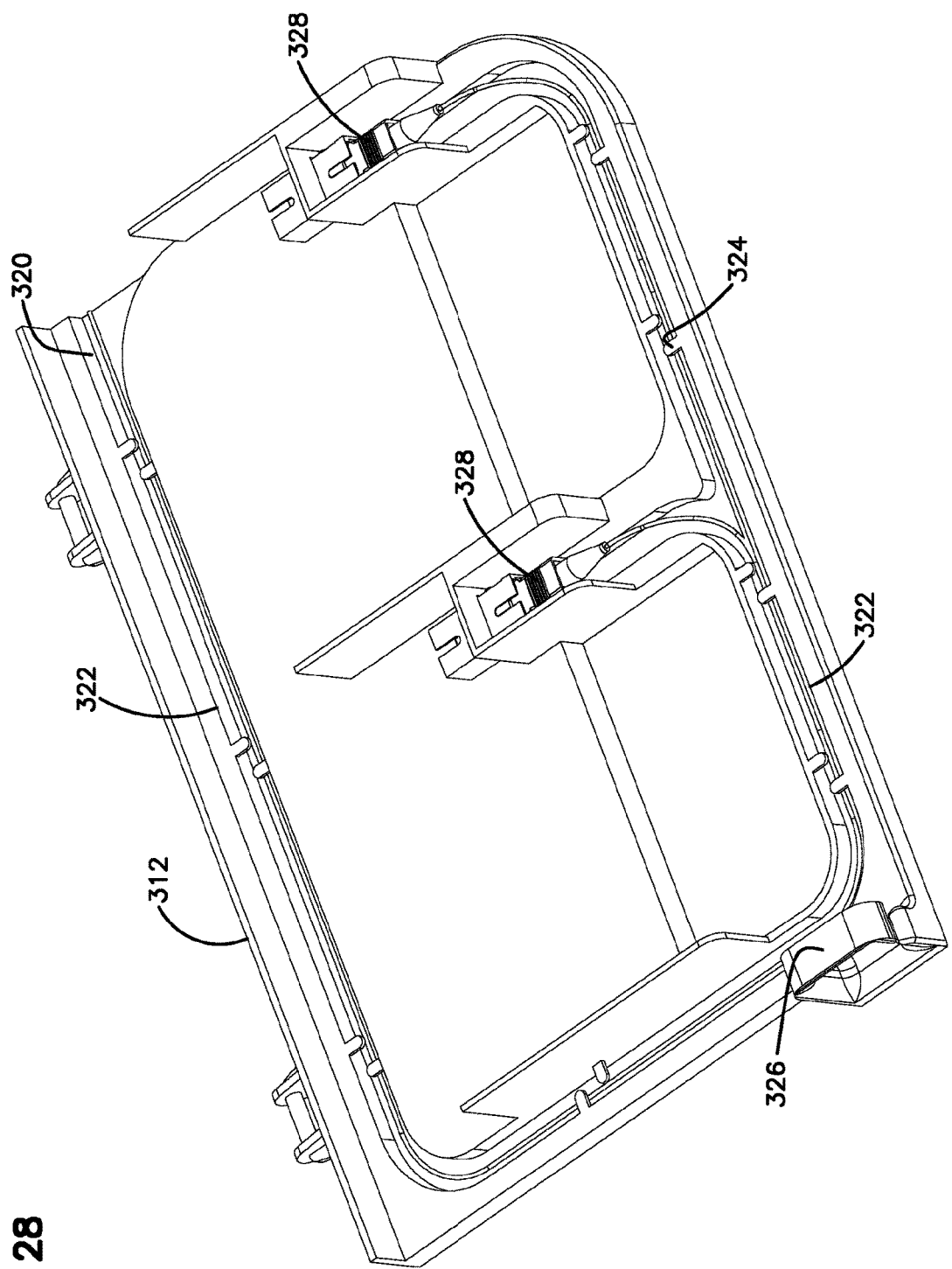
FIG. 28 shows the splitter tray of FIG. 26, without the optical splitters shown.
Figure 29:
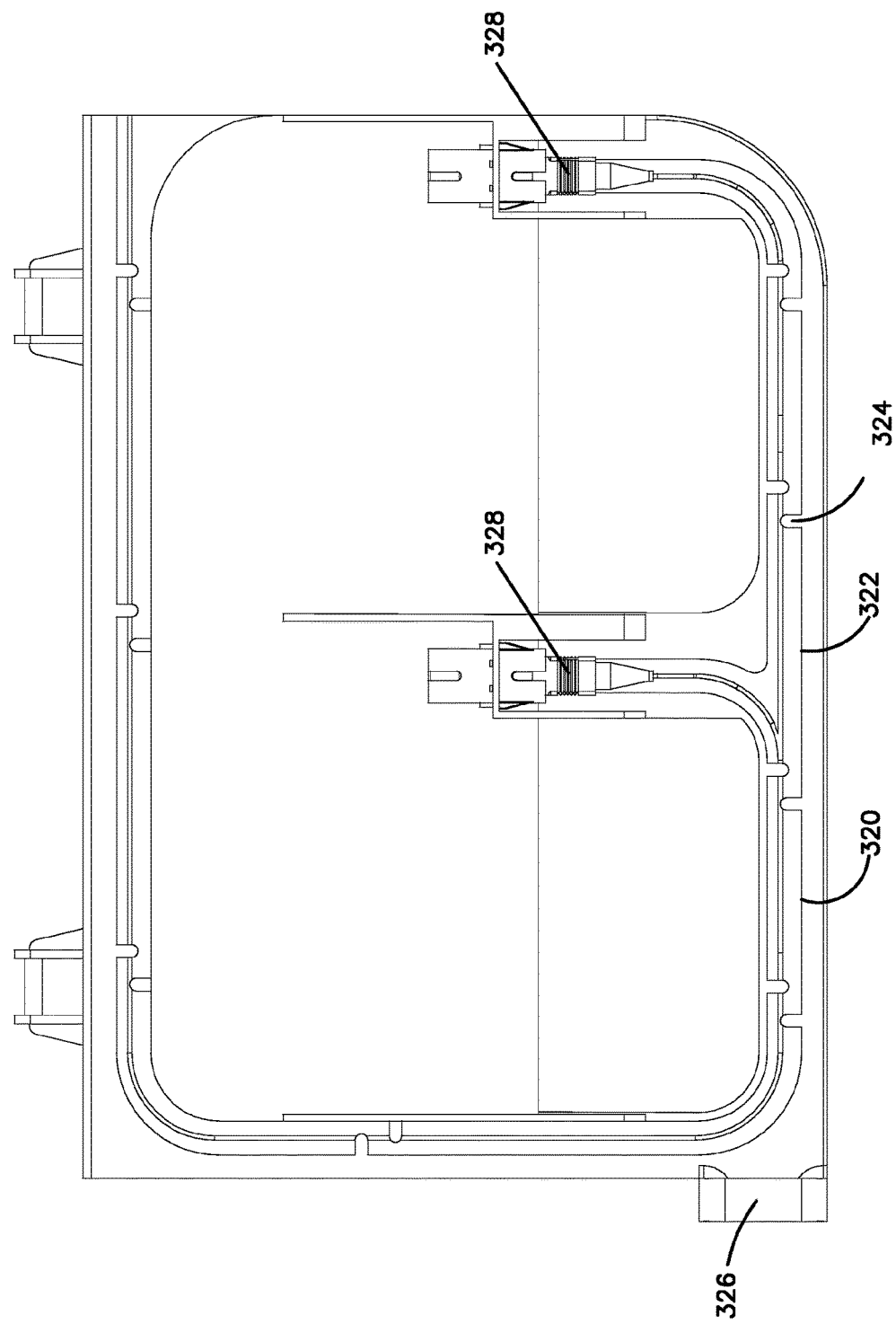
FIG. 29 is a top plan view of the arrangement of FIG. 28.

As shown in FIG. 14, an optical splitter 70 can be mounted to the base 202 of the terminal 200. Any of the optical splitters 70, 130, 140 described herein are suitable for mounting to the base 202. The input connector 73 of the splitter 70 plugs into the second port of the adapter 225 to receive the optical signals from the hub 20. One or more patch cords 50 can be plugged into the output ports at the splitter output region 74 to carry the split optical signals to the ONTs 60. As shown in FIG. 15, a cover 204 can be mounted to the base 202 before and/or after the splitter 70 is mounted to the terminal 200. The cover 204 provides protection to the splitter 70, fibers, and connections contained within the terminal 200.

Referring now to FIGS. 16-29, a fiber distribution hub 300 is shown having an enclosure 302 and a door 304, which hingedly mounts to enclosure 302. A fiber feed 22 enters fiber distribution hub 300 for connection to optical splitters 306. Outputs from the optical splitters 306 are shown as fiber optic cables 40, which route to one or more fiber distribution devices that are installed at different locations within a building. For example, fiber distribution hub 300 can be located in a basement. Fibers from fiber feed 22 can be spliced at splice tray 308 to splitter inputs 310, which lead to each splitter tray 312. Each splitter tray 312 holds one or more splitters 306 with a mounting device like the type noted above for terminals 100, 200. Splitters 306 in the example include one input 328 and eight outputs 330. Splitters 306 are constructed in a similar manner as previously described optical splitters 70, 130, 140. Splitter 306 is interchangeable with splitters 70, 130, 140.

Splice tray 308 and splitter trays 312 are mounted to a backing plate 316. Splitter trays 312 are pivotally mounted so as to permit access to a desired splitter tray in the stack of splitter trays 312. The pivoting splitter trays 312 can also allow access to splice tray 308 as desired. Each splitter tray 312 holds two optical splitters 306 and the respective splitter inputs 328.

As shown, each splitter tray 312 includes cable routing for routing of the splitter inputs 328, which are outputs from the splice tray in one example. The routing pathways 320 extend around a perimeter of splitter tray 312. Cable routing 320 can include cable management troughs 322, fingers 324 and rings 326. Splice tray 308 includes a fiber input 332 and a fiber output 334. Splice tray 308 opens up and allows internal storage of the fiber splice.

Fiber distribution hubs 20, 300 are shown as centralized hubs for feed fiber 22. In some cases, feed fiber 22 can be split out to multiple hubs so as to distribute the splitting and splicing functions among multiple hubs 20, 300. In either case, splitters 70, 130, 140, 306, can be used throughout the system, in the hubs and in the local devices.

Figure 30:
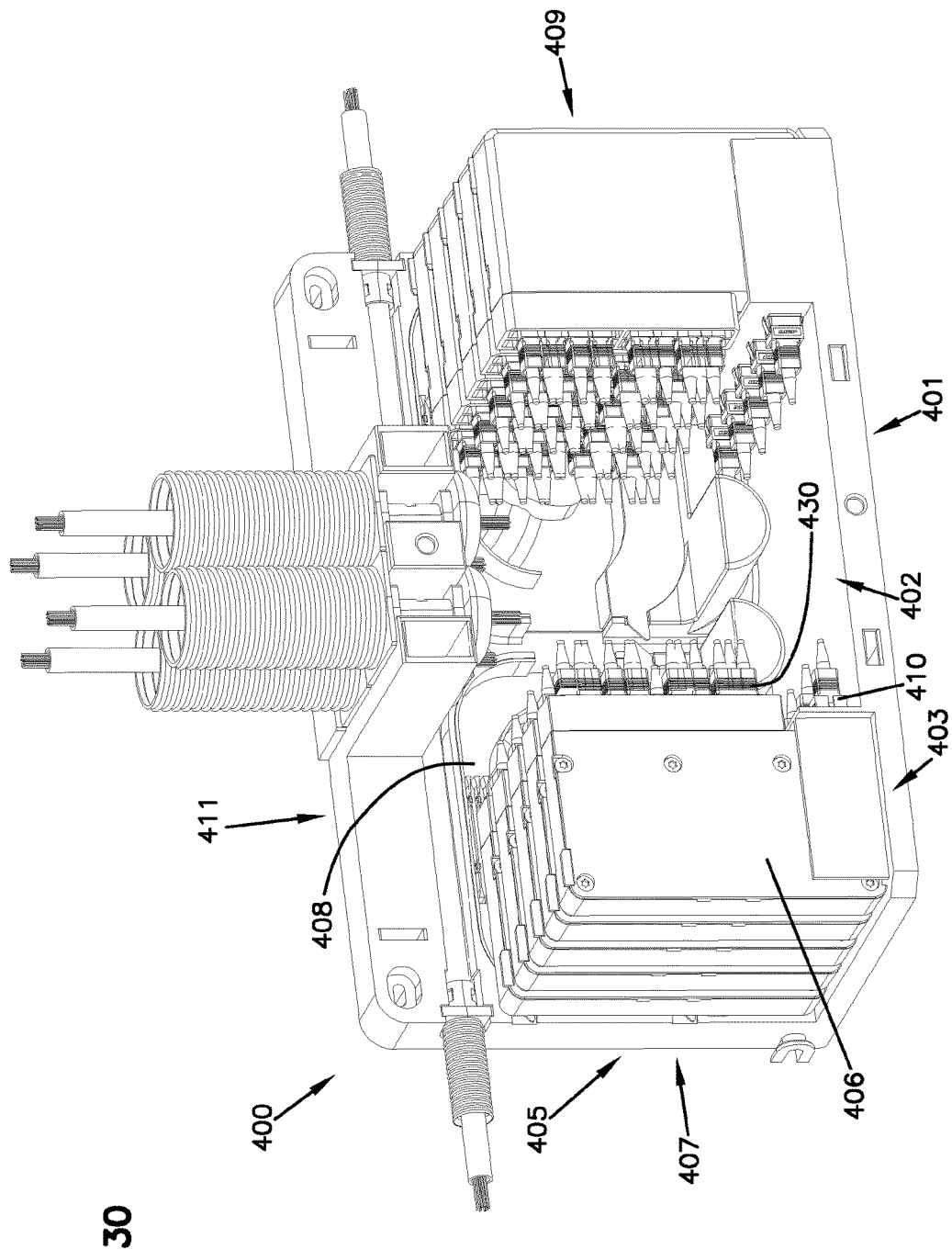
FIG. 30 is a front perspective view of another fiber distribution hub including optical splitters.

FIG. 30 illustrates another fiber distribution hub 400 similar to the hub 300 illustrated in FIGS. 16-29. The fiber distribution hub 400 includes an enclosure 402 and is shown without a cover to illustrate the internal features thereof. In the fiber distribution hub 400, the optical splitters 406 are oriented in a horizontally stacked arrangement adjacent the bottom 401 of the enclosure 402. The optical splitters 406 are arranged in a direction from a front 403 of the hub 400 toward a back 405 of the hub 400. As in the hub 300 of FIGS. 16-29, the optical splitters 406 are configured to receive an input signal from a fiber feed 22 that enters fiber distribution hub 400. In the example of the hub 400, fiber feeds 22 enter from sides 407, 409 of the enclosure 402 and fibers from the fiber feed 22 are spliced to splitter inputs 410 at a splice region 408 within the enclosure 402. Outputs from the optical splitters 406 are shown as fiber optic cables 40, which exit the enclosure from a top 411 and route to one or more fiber distribution devices that are installed at different locations within a building. For example, as in hub 300, hub 400 can be located in a basement. Each of the splitters 406 may be mounted to the enclosure 402 with a mounting device like the type noted above for terminals 100, 200, and 300. Splitters 406 in the example include one input 410 and eight outputs 430. Splitters 406 are constructed in a similar manner as previously described optical splitters 70, 130, 140, and 306. Splitter 406 is interchangeable with splitters 70, 130, 140, and 306.

Referring now to FIGS. 31-37, another fiber distribution hub 500 similar to the hub 400 illustrated in FIG. 30 is shown. The fiber distribution hub 500 includes an enclosure 502 for housing fiber optic splitters 506 in a manner similar to the arrangement shown in FIG. 30. In FIG. 32, the enclosure 502 is shown without a cover 504 to illustrate the splitters 506 located within the enclosure 502. In the fiber distribution hub 500, in addition to the splitters 506, a plurality of fanouts 580 are located above the enclosure 502. The fanouts 580 are oriented in a stacked arrangement similar to the splitters 506 therebelow in a direction from the front 503 of the hub 500 toward the back 505 of the hub 500. As in the hub 400 of FIG. 30, fiber feed 22 enters fiber distribution hub 500 for connection to the optical splitters 506. Similar to the hub 400 of FIG. 30, the fiber feed 22 enters from the sides 507, 509 of the enclosure 502 and fibers from the fiber feed 22 are spliced to splitter inputs 510 at a splice region 508 within the enclosure 502. However, in contrast to the arrangement shown in FIG. 30, the riser cables 40 are spliced into pigtails at the fanouts 580 located above the enclosure 502. The connectorized pigtails then lead to the outputs 530 of the splitters 506. In this manner, the riser cables 40 do not have to be preterminated with connectors, which can often lead to issues in providing the correct length for the individual cables.

Figure 34:
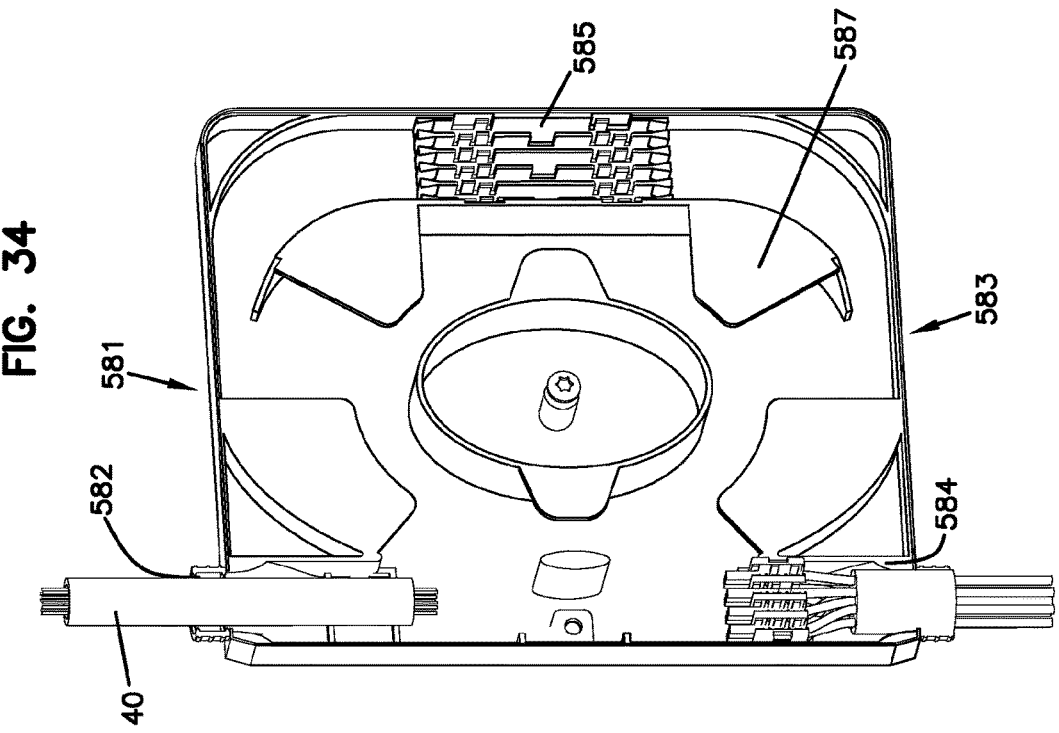
FIG. 34 illustrates the fanout of FIG. 33 with the cover thereof removed to show the internal features thereof.
Figure 33:
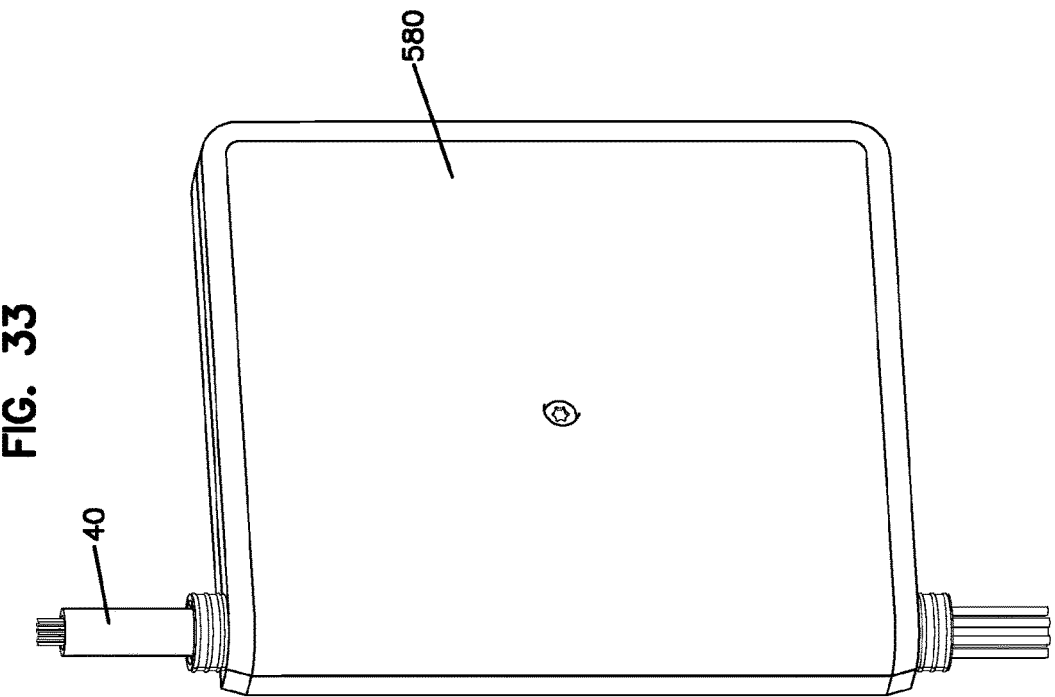
FIG. 33 illustrates one of the fanouts of the hub of FIG. 31 in isolation.

The fanouts 580 are shown in isolation in FIGS. 33 and 34. Each fanout 580 includes a riser cable port 582 at a top 581 of the fanout 580 and a pigtail port 584 at a bottom 583 of the fanout 580. A splice region 585 is provided within the fanout 580 as well as a cable management spool 587 for managing fibers within the fanout 580 without violating minimum bend radius requirements.

Figure 37:
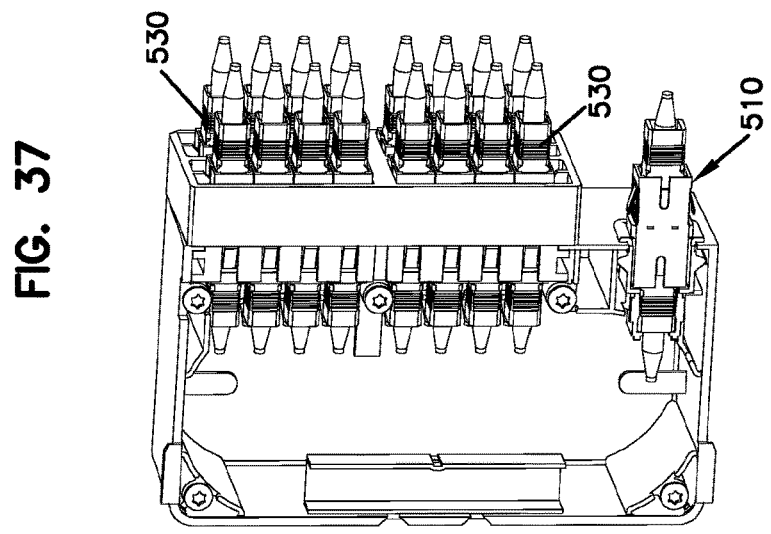
FIG. 37 illustrates the optical splitter of FIGS. 35-36 with the cover thereof removed to show the internal features thereof.
Figure 35:
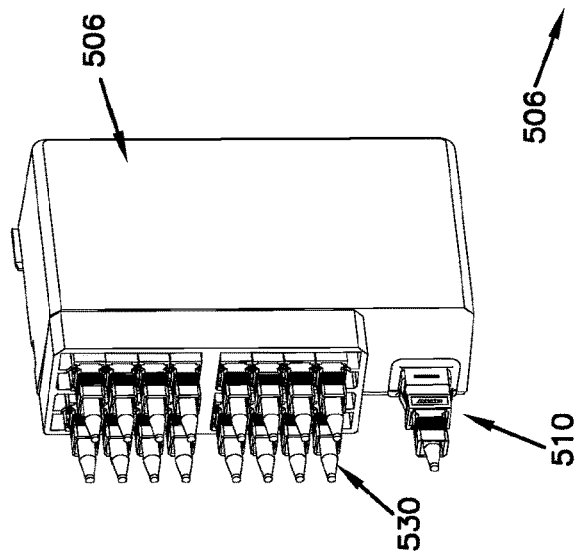
FIG. 35 is a front, right side perspective view of one of the optical splitters of the hub of FIG. 31.
Figure 36:
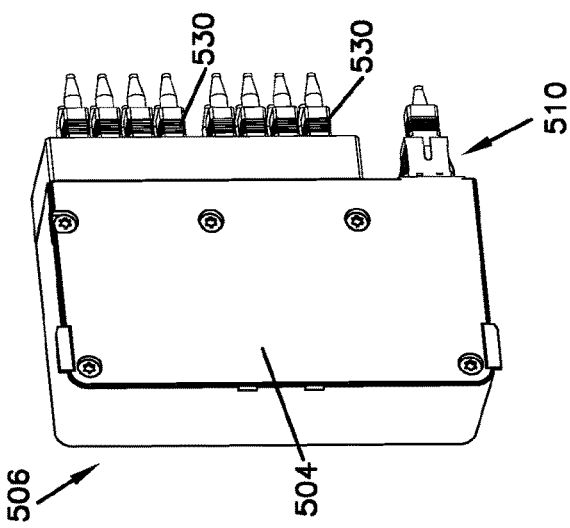
FIG. 36 is a rear, left side perspective view of the optical splitter of FIG. 35.
Figure 38:
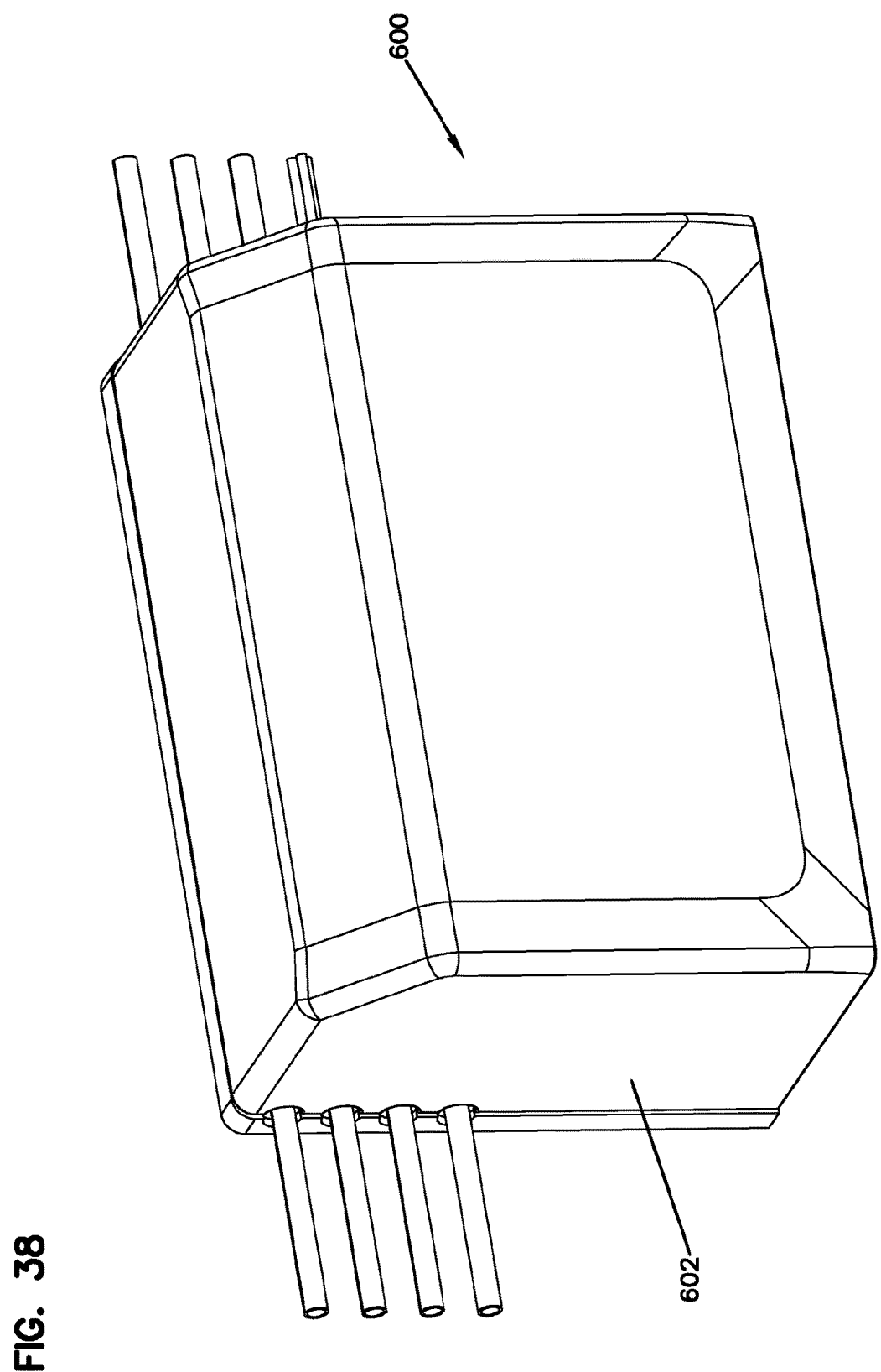
FIG. 38 is a front perspective view of another fiber distribution hub including optical splitters.
Figure 39:
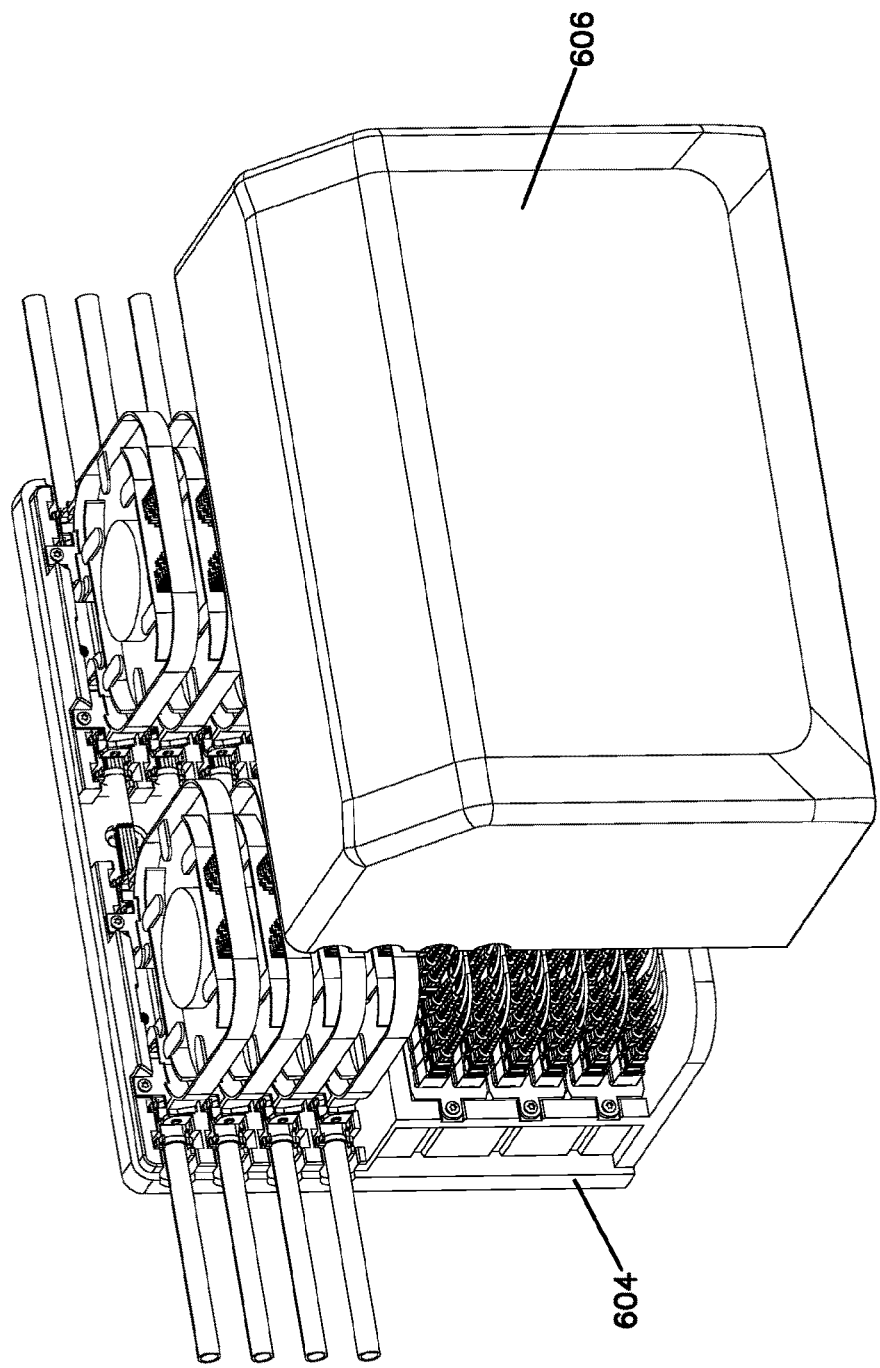
FIG. 39 shows the fiber distribution hub of FIG. 38, with a cover partially removed.
Figure 40:
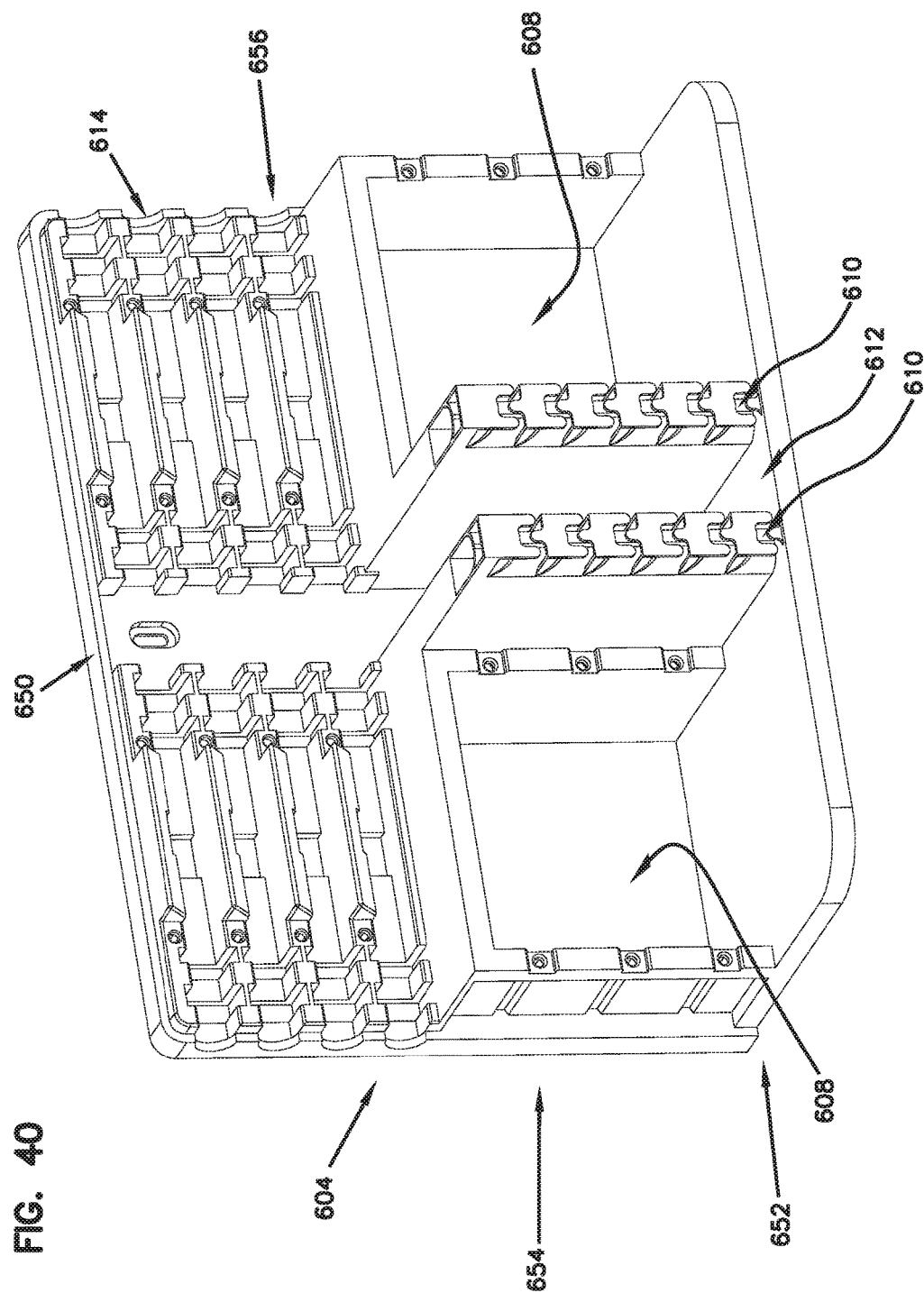
FIG. 40 shows a basepart of the fiber distribution hub of FIG. 38.

The splitters 506 are shown in isolation in FIGS. 35-37. The splitter 506 is shown in FIG. 37 without a cover 511 thereof for illustrating the internal structure thereof. In the depicted example of the hub 500, the splitters 506 are 1×16 splitters. As in the earlier described embodiments, each splitter 506 may be mounted to the enclosure 502 with a mounting device like the type noted above. Splitters 506 are constructed in a similar manner as previously described optical splitters 70, 130, 140, 306, and 406. Splitter 506 is interchangeable with splitters 70, 130, 140, 306, and 406.

Referring now to FIGS. 38-55, another fiber distribution hub 600 is shown. The fiber distribution hub includes an enclosure 602 including a basepart 604 and a cover 606. In the illustrated embodiment, cables enter and exit from the sides of hub 600. Basepart 604 includes a first major side 650, a second major side 652 generally parallel to first major side 650, a first minor side 654, and a second minor side 656 oppositely disposed to first minor side 654. First minor side 654 and second minor side 656 extend generally perpendicularly between first major side 650 and second major side 652. Basepart 604 includes a splitter area 608 on each side of basepart 604, a cable management area 610 adjacent each splitter area, and a central channel 612. Central channel 612 communicates with upper cable termination and splice tray area 614. Basepart 604 can be wall mounted if desired.

Figure 41:
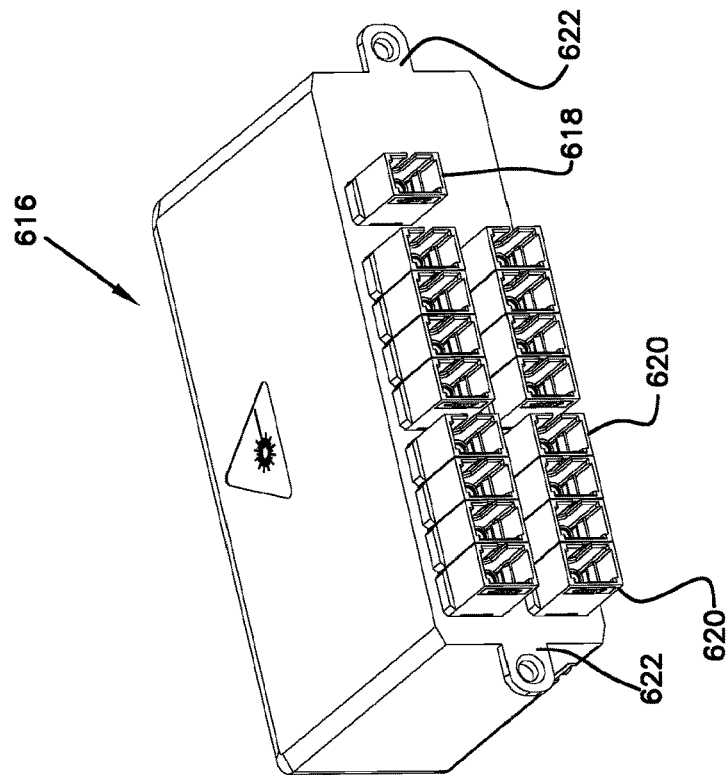
FIG. 41 shows one splitter usable in the fiber distribution hub of FIG. 39.
Figure 42:
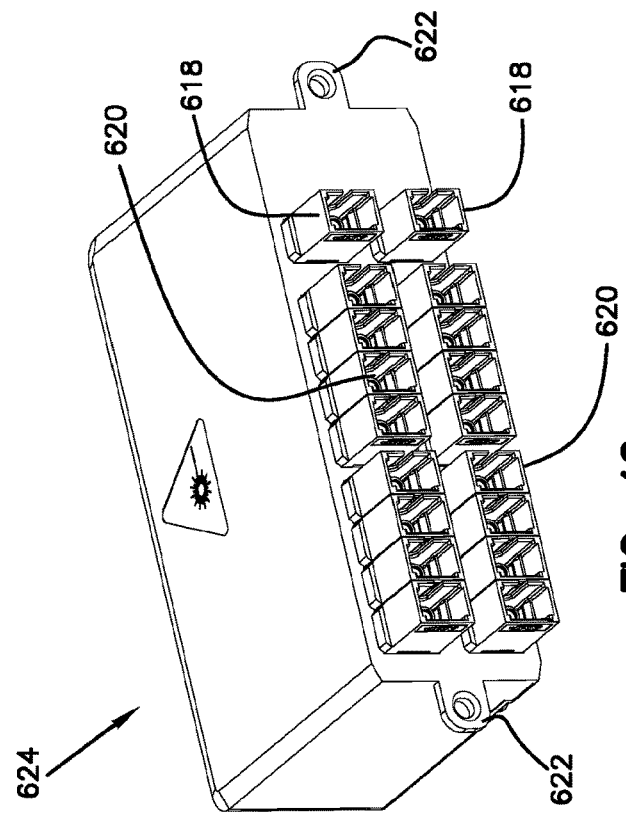
FIG. 42 shows another splitter usable in the fiber distribution hub of FIG. 38.
Figure 43:
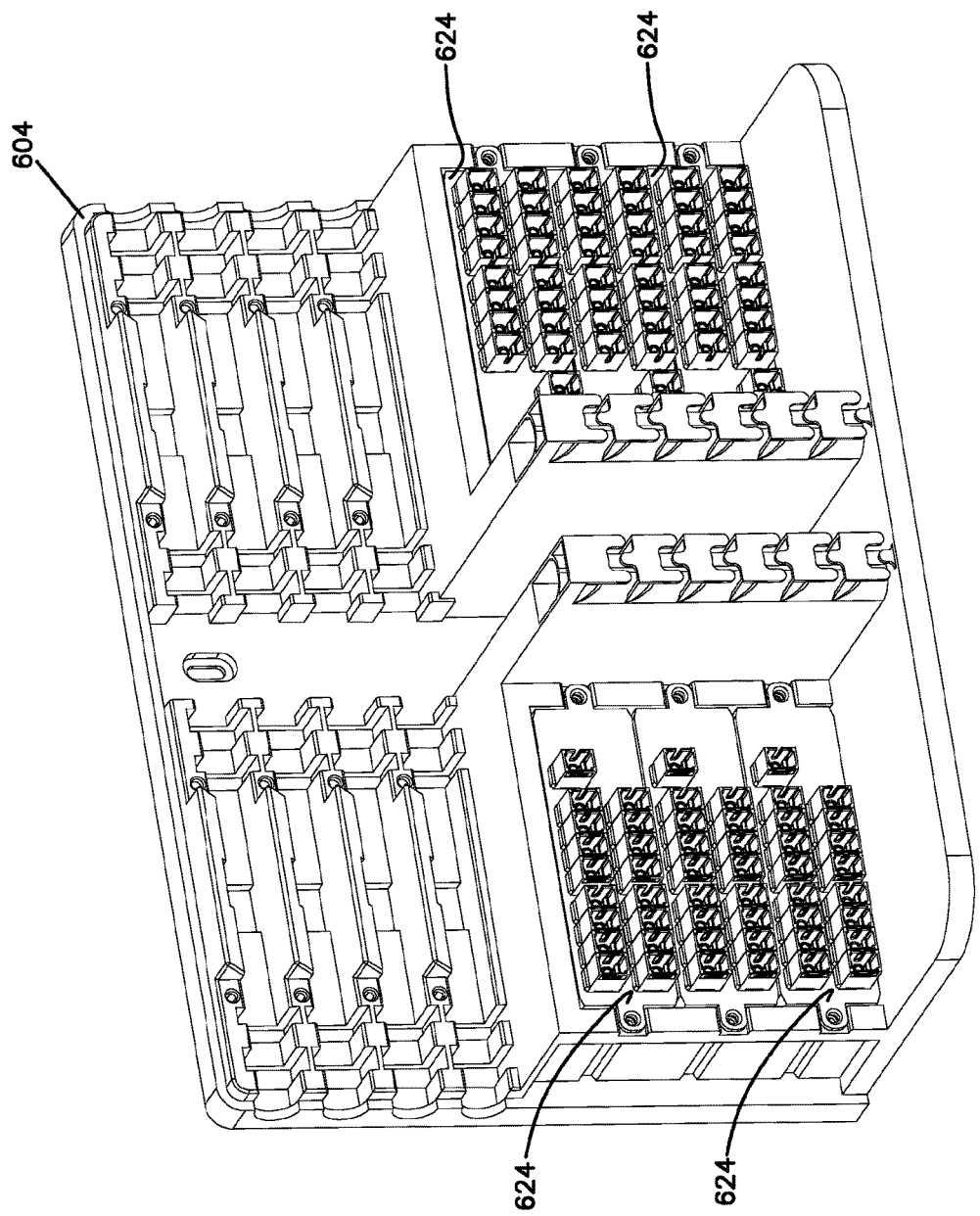
FIG. 43 shows the basepart with splitter modules mounted to the basepart.

As shown in FIGS. 41 and 42, first example splitter 616 includes an input 618 and a plurality of outputs 620 in the form of adapters. First splitter 616 mounts with flanges 622 to basepart 604. A second splitter 624 includes two inputs 618 and a plurality of outputs 620 in the form of adapters. First splitter 616 is a 1×16 splitter. Second splitter 624 is a 2×1×8 splitter. FIG. 43 shows a plurality of second splitters 624 mounted to basepart 604.

Figure 44:
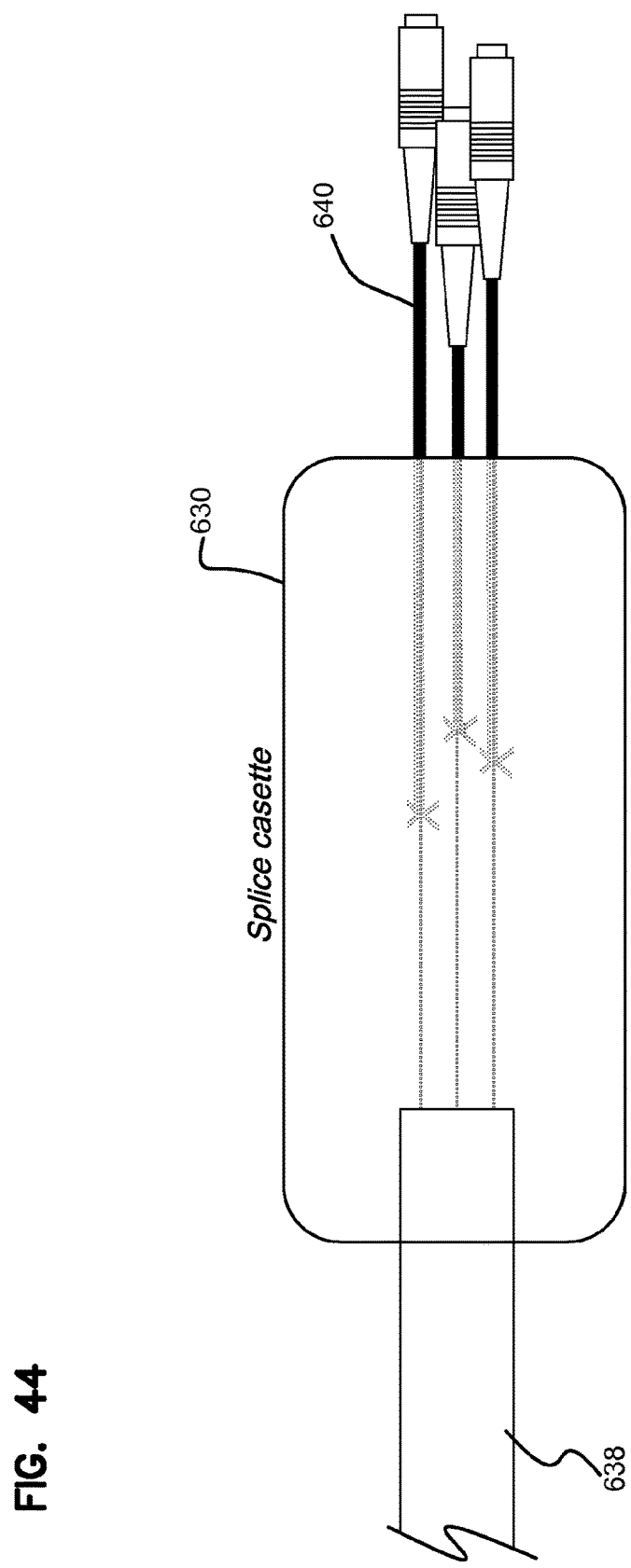
FIG. 44 illustrates splicing of connectorized pigtails to a riser cable in a splice cassette.
Figure 46:
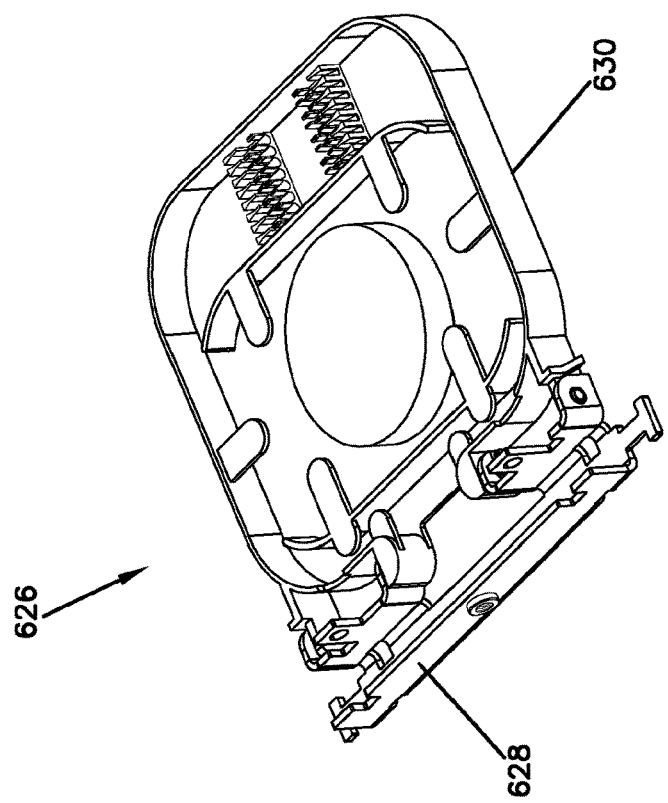
FIG. 46 is another view of the splice tray with integrated cable termination.
Figure 45:
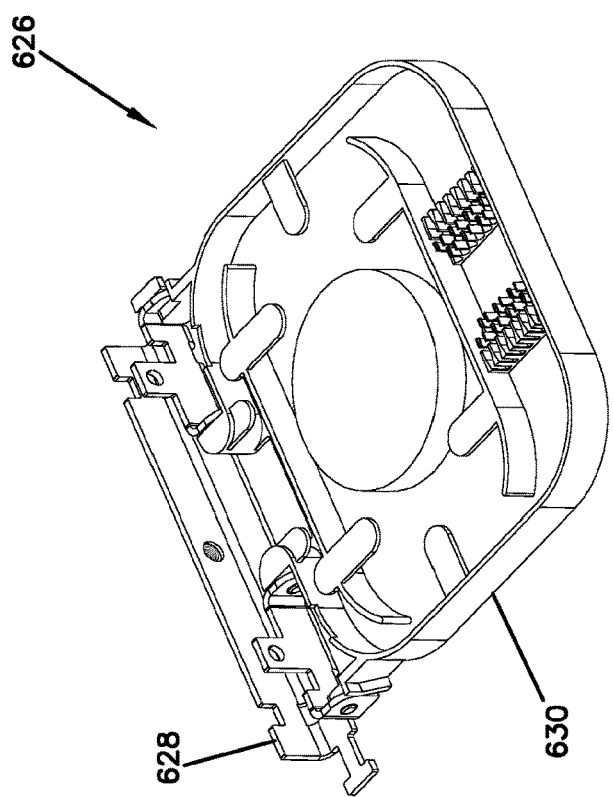
FIG. 45 shows a splice tray with integrated cable termination.
Figure 50:
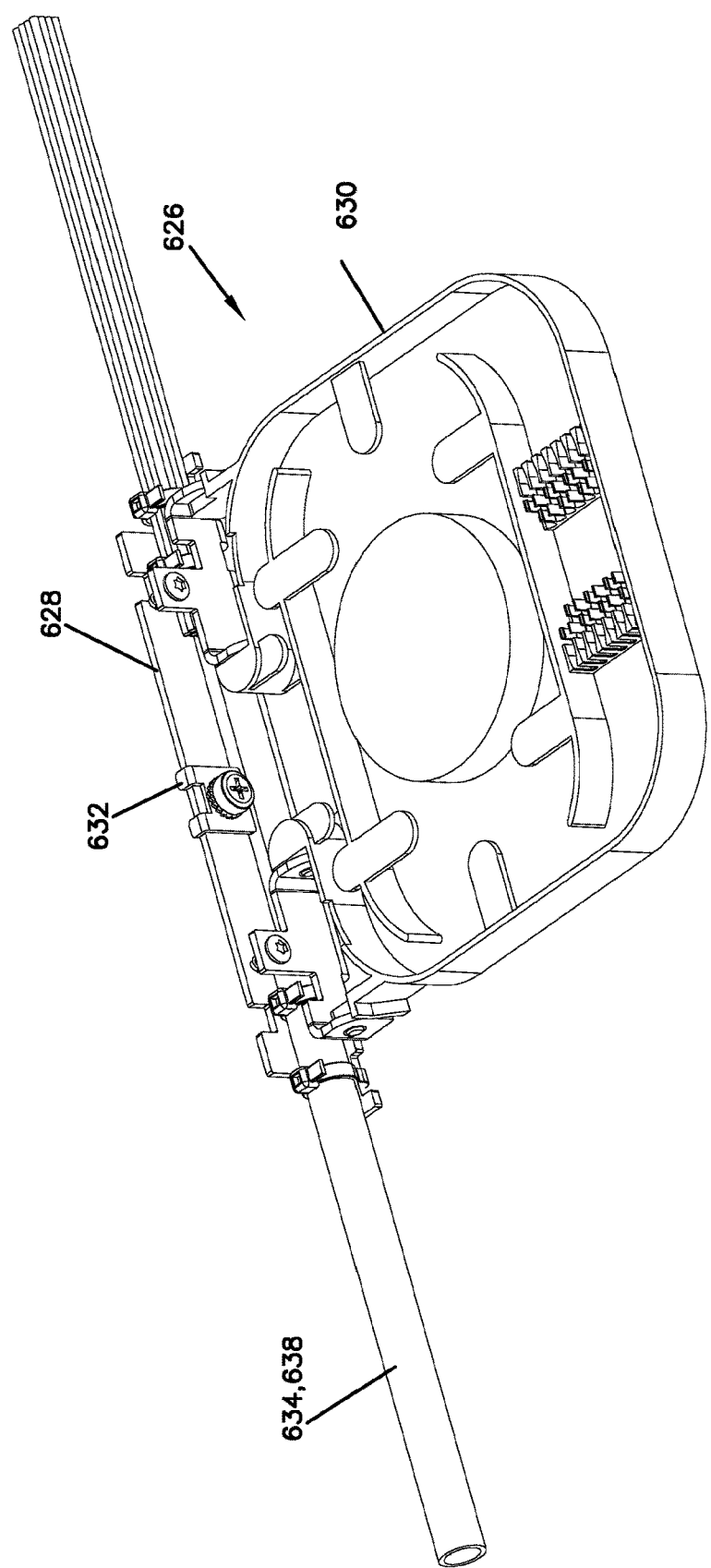
FIG. 50 shows the splice tray terminated to a cable and including a strength member termination.

FIG. 44 illustrates a riser cable which can be spliced to pigtails for connection to the splitter outputs 620 of hub 600. The riser cable can also be provided with connectorized pigtails without the need for a splice or splice cassette.

In FIGS. 45 through 55, a splice tray with integrated cable termination 626 is shown. Splice tray 626 includes a cable termination bracket 628 and a pivotally mounted splice cassette 630 for holding cable and splices. Cables entering and exiting splice tray 626 are terminated on cable termination bracket 628. For example, a riser cable 638 or a feeder cable 634 is connected at an outside portion of cable termination bracket 628. In the example shown, an opposite end of cable termination bracket 628 is connected to connectorized pigtails 636, 640.

FIGS. 49A-C show pivoting movement of splice cassette 630 relative to cable termination bracket 628.

A strength member termination device 632 can be used with cable termination bracket 628 to terminate certain cables, such as feeder cables or riser cables.

Figure 51:
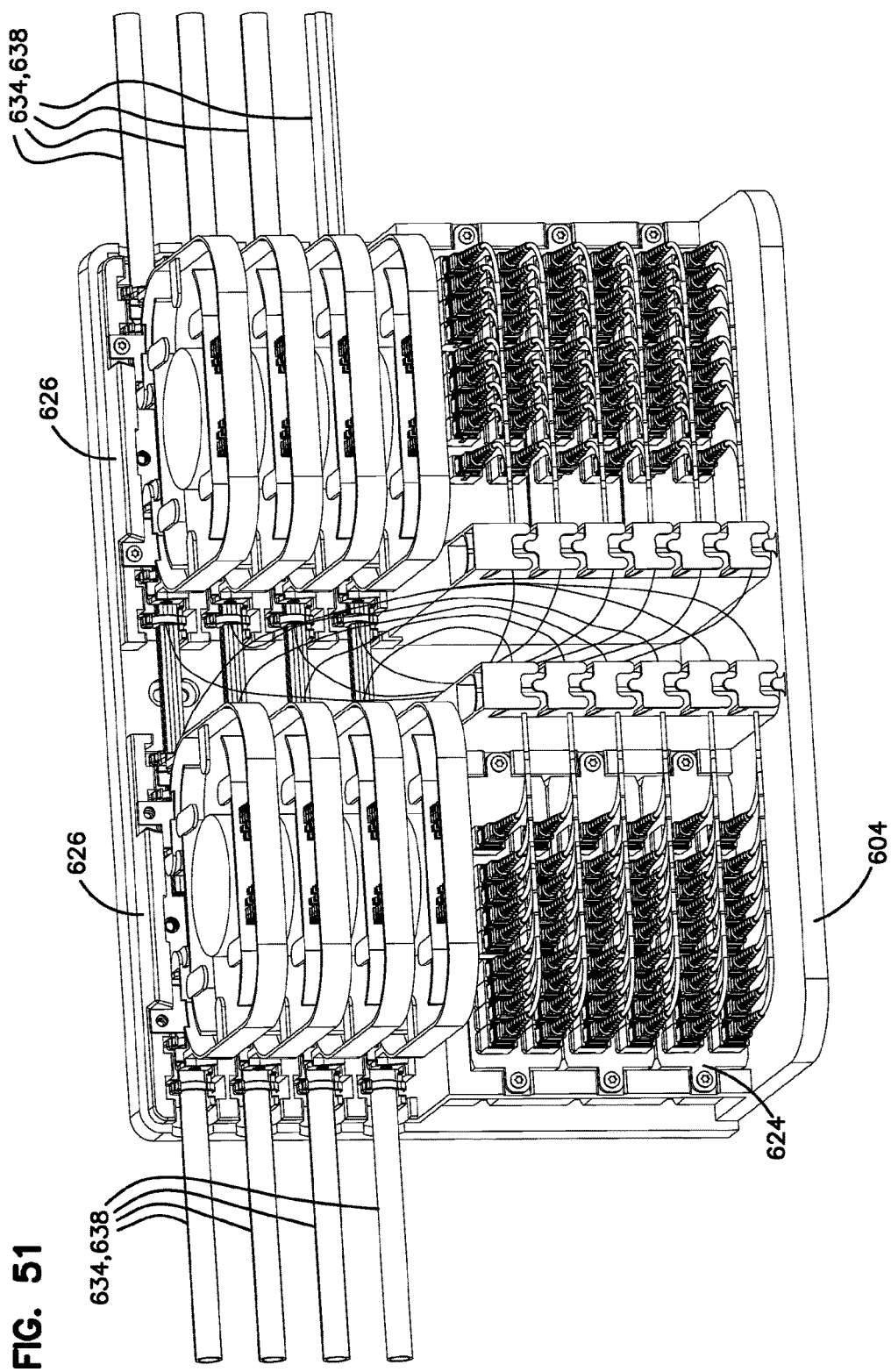
FIG. 51 shows the basepart including splitters, and splice trays with integrated cable terminations along with representative cables.

FIG. 51 illustrates the cable routing from feeder cable 634 to pigtails 636 which are used as inputs to splitters 616, 626. Splicing of the feeder cables to the pigtails occurs on splice cassette 630. Riser cables 638 can also be provided as part of hub 600 for connecting to pigtails (spliced on) which are connected to the outputs of the splitters 616, 624.

Figure 52:
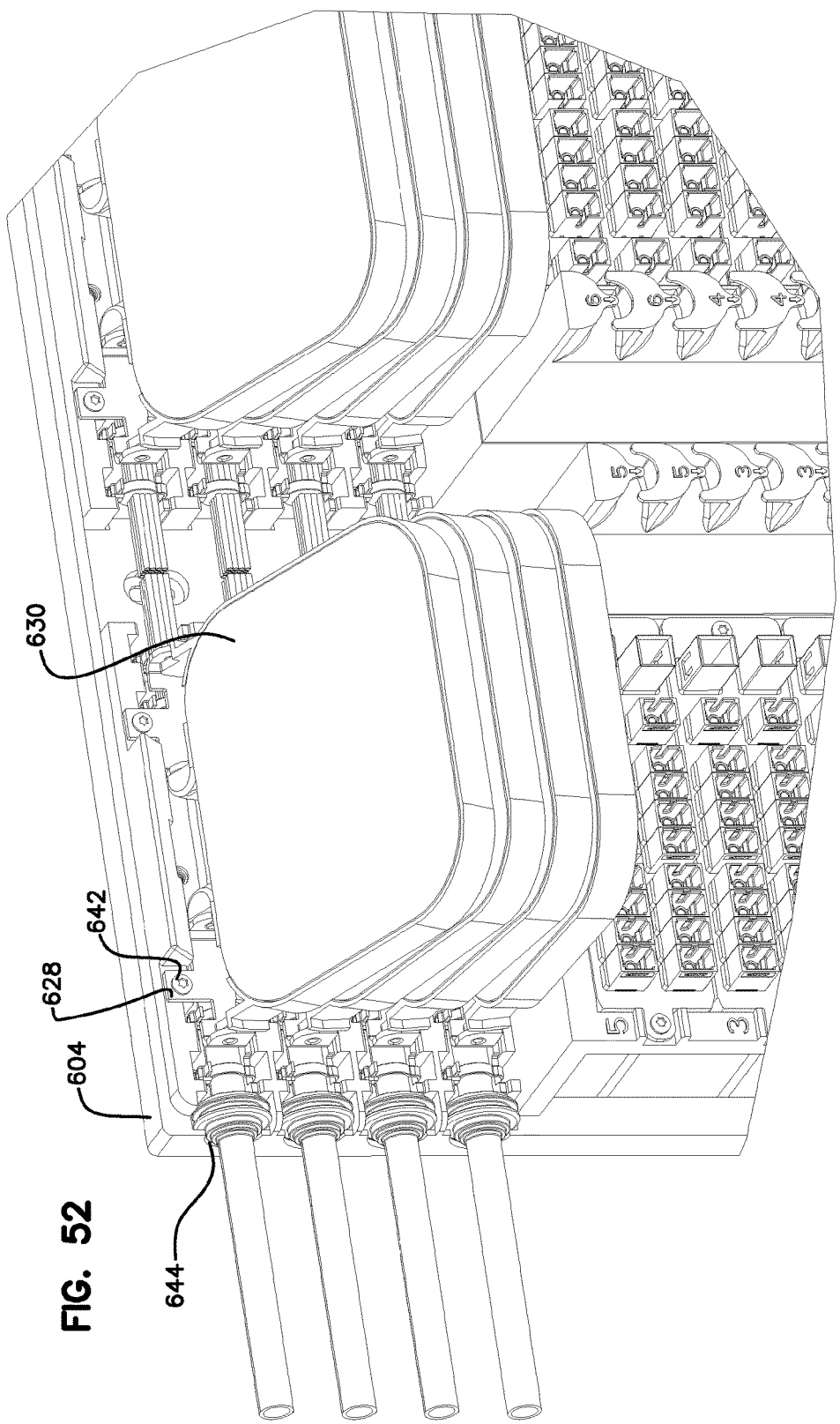
FIG. 52 shows the mounting of the splice trays and cable terminations to the basepart.

Referring now to FIG. 52, splice tray 626 is shown being mounted to basepart 604 with fasteners wherein the cables 634, 636, 638, 640 are positioned in a recess 644.

Figure 53:
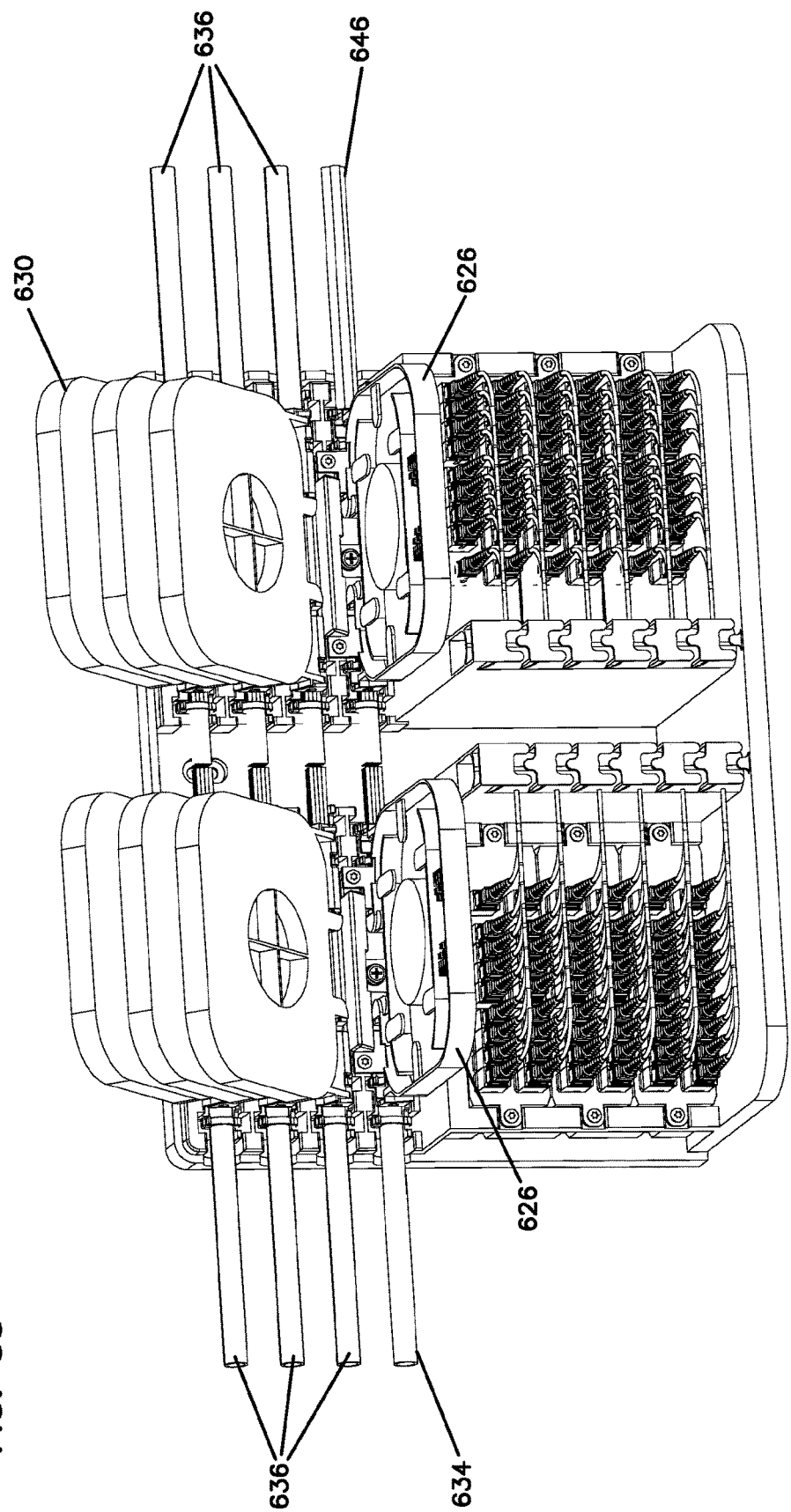
FIG. 53 shows the various cables which can be connected to the hub, and the pivoting movement of the splice cassettes to access a selected splice cassette.
Figure 54:
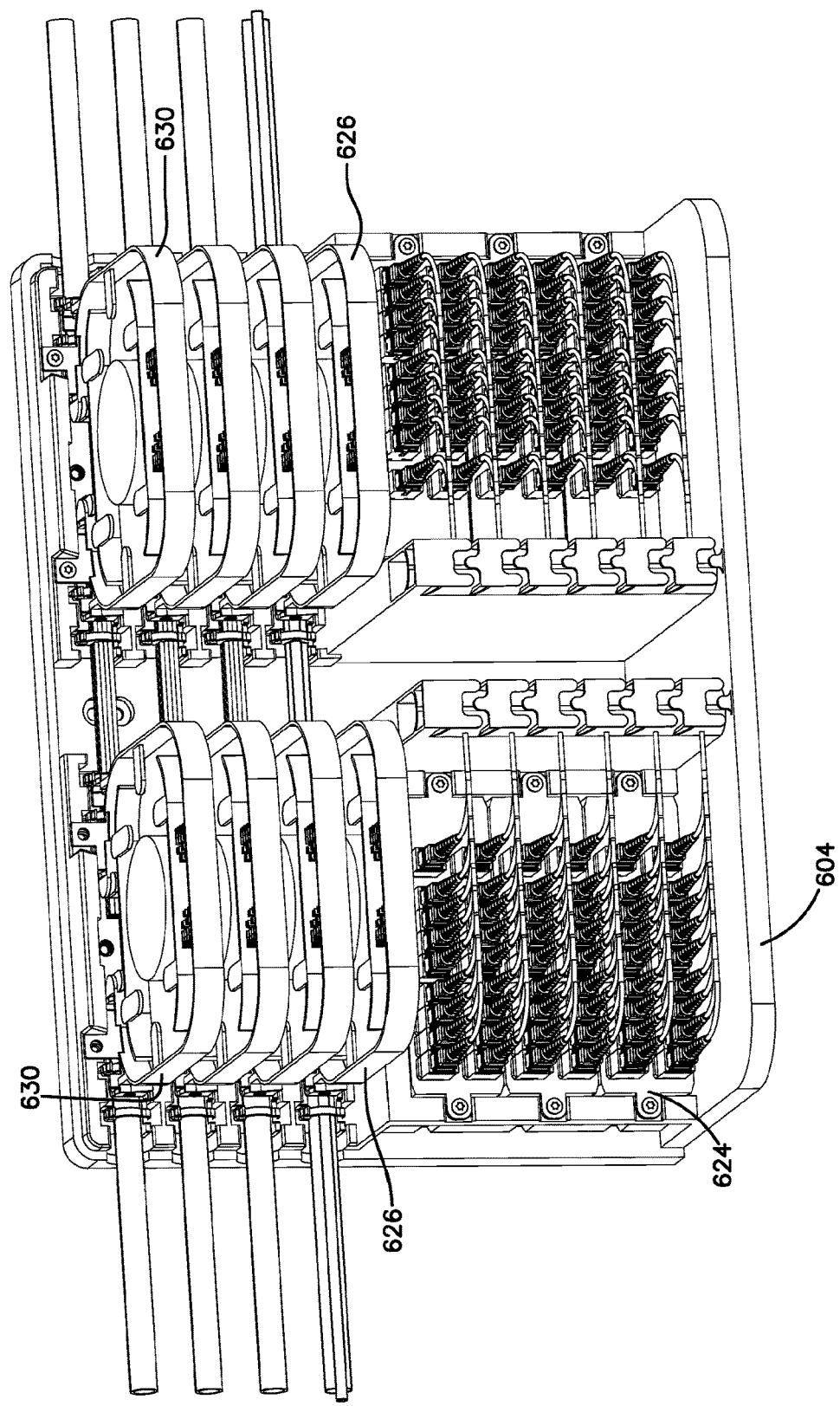
FIG. 54 shows the internal components of the hub with representative cables.
Figure 55:
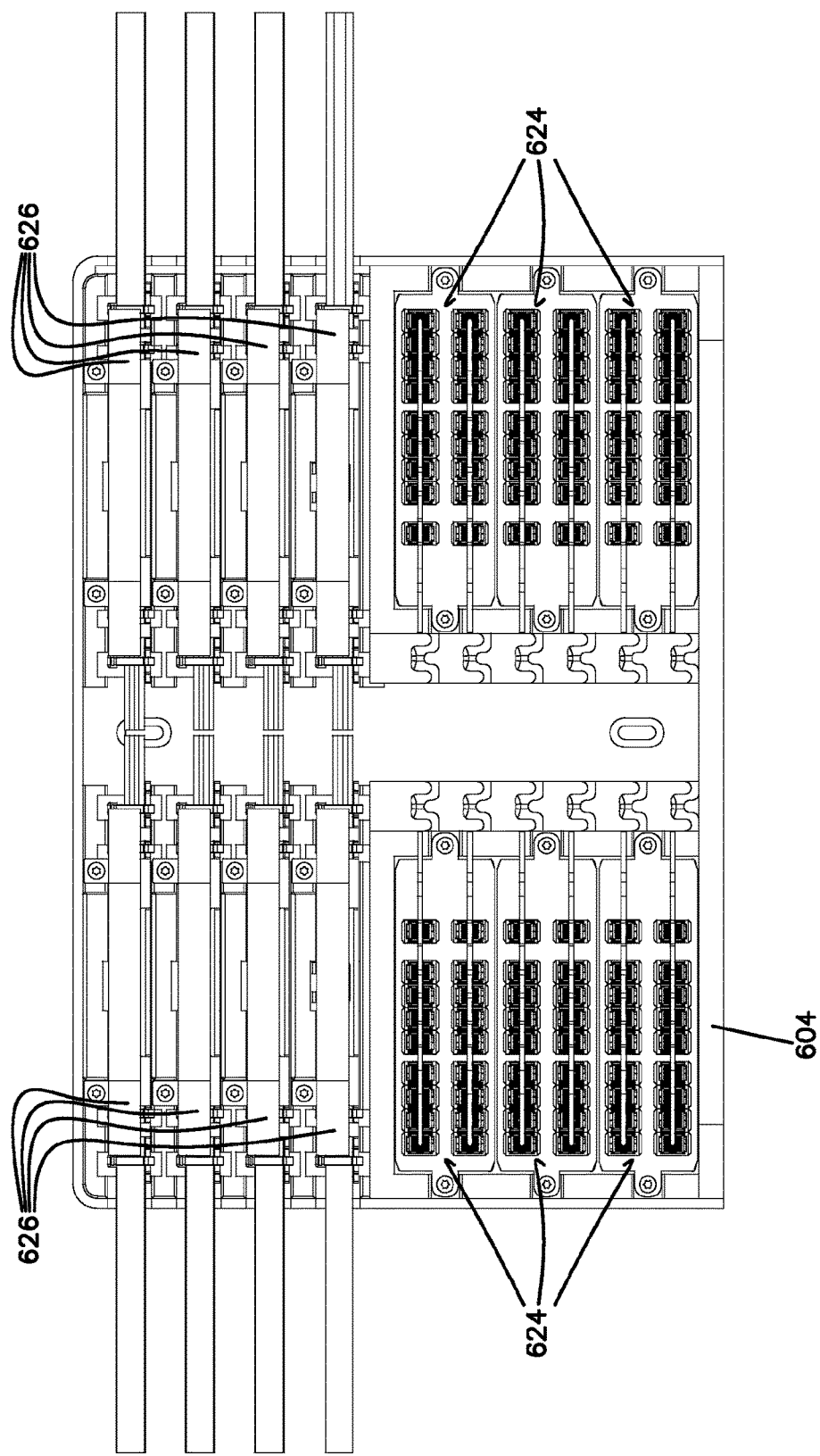
FIG. 55 is a front view of the internal components of the hub of FIG. 54.
Figure 56:
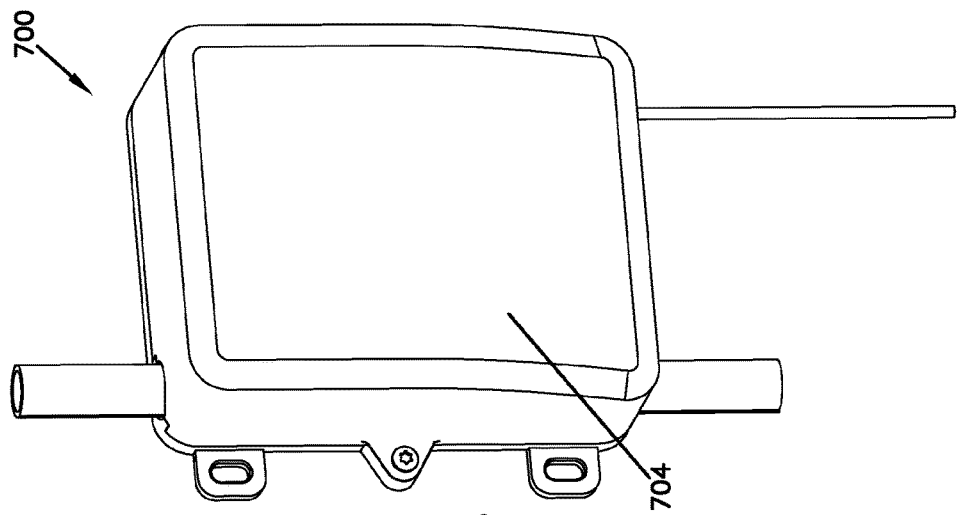
FIG. 56 shows an alternative embodiment of a fiber distribution terminal.
Figure 57:
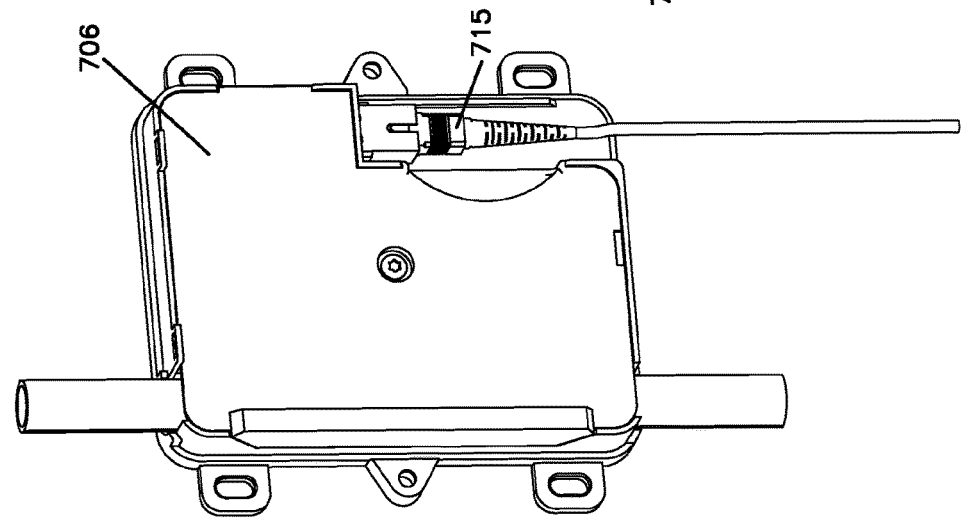
FIG. 57 shows the fiber distribution terminal of FIG. 56 without the outer cover.
Figure 58:
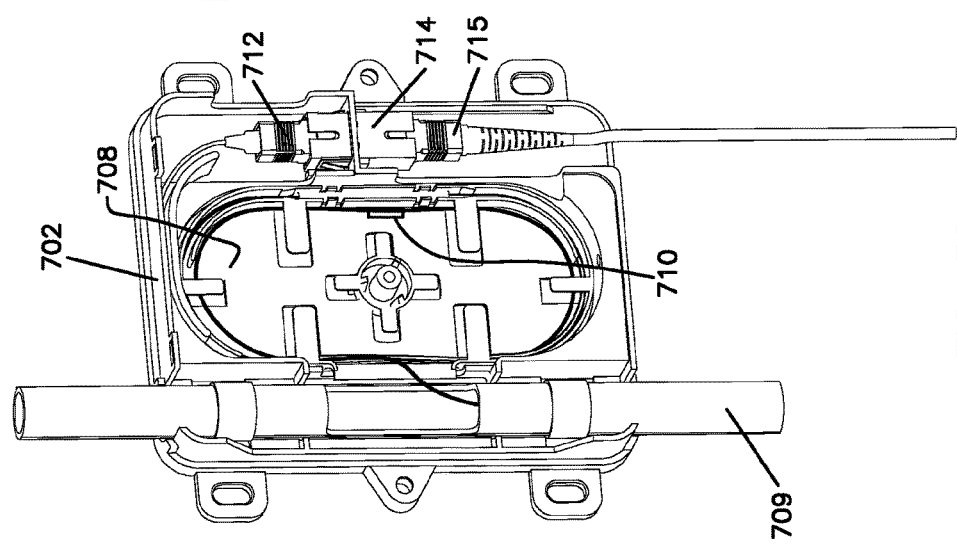
FIG. 58 shows the fiber distribution terminal of FIG. 57, without the internal cover, and illustrating a single splice to a single output cable from the riser cable, and a single output cable.
Figure 59:
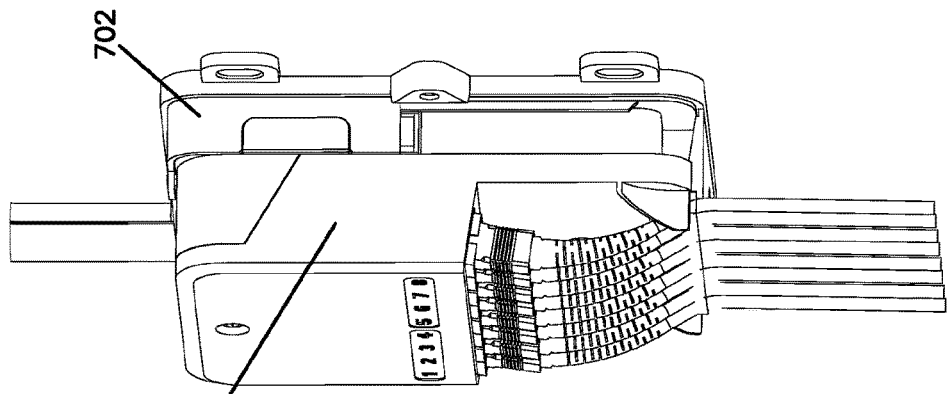
FIG. 59 shows the fiber distribution terminal of FIG. 56 including a plurality of outputs and including an internal splitter.
Figure 61:
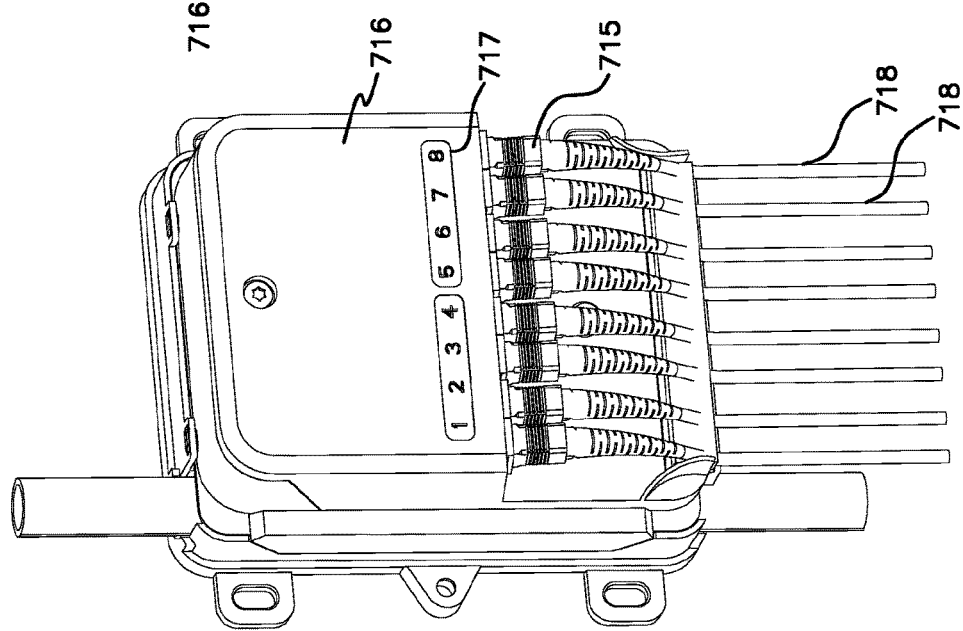
FIG. 61 shows the splitter mounted to the base.
Figure 60:
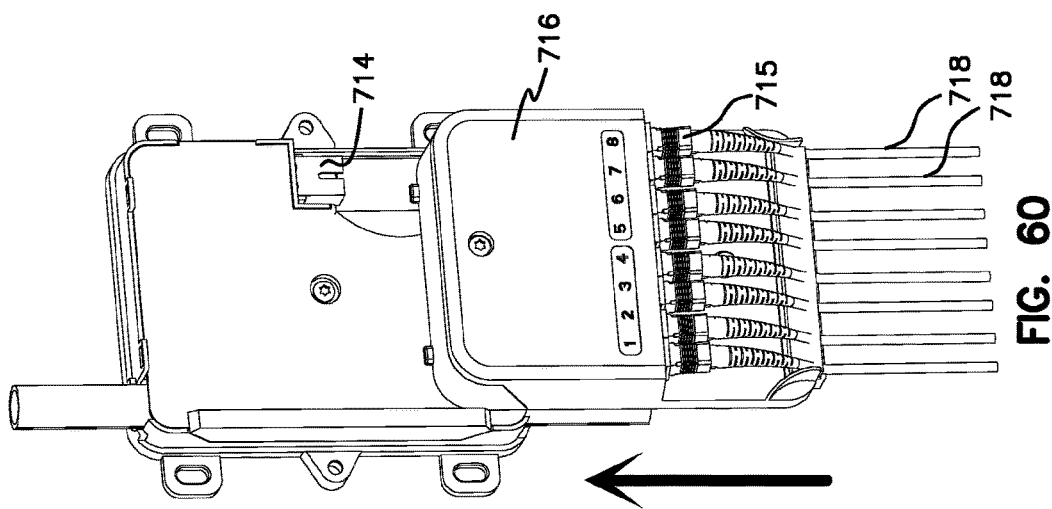
FIG. 60 shows a splitter module being mounted to the adapter to create multiple outputs from a single splice from the riser cable.
Figure 62:
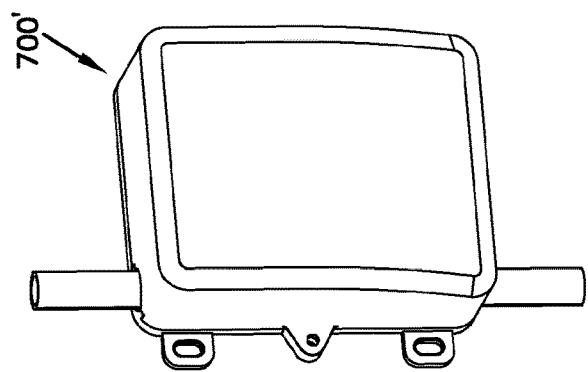
FIGS. 62-69 show various views of an alternative embodiment of a fiber distribution terminal including a splitter which connects to an adapter which is connected to a connector spliced to the riser cable.
Figure 63:
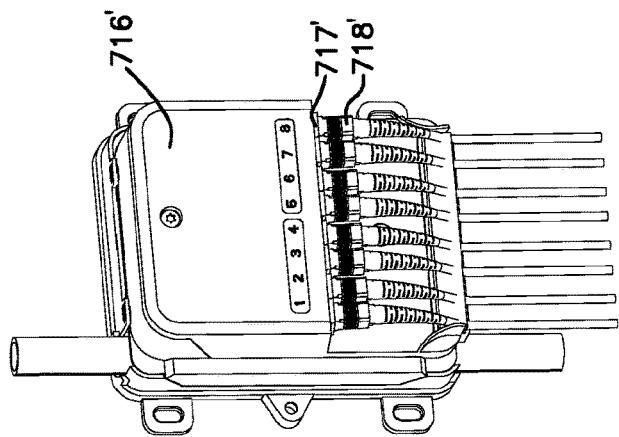
Figure 64:
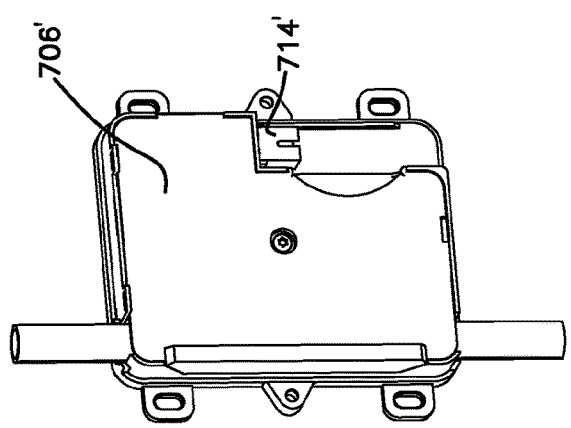
Figure 65:
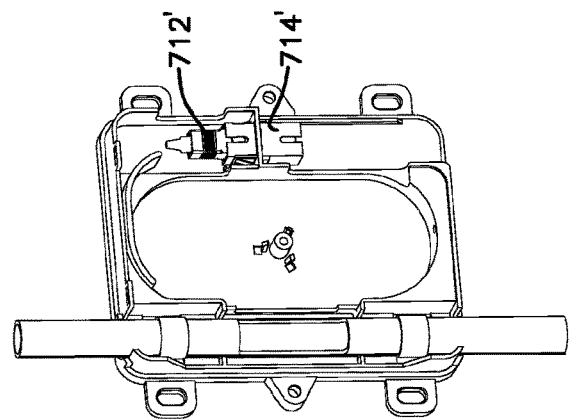
Figure 69:
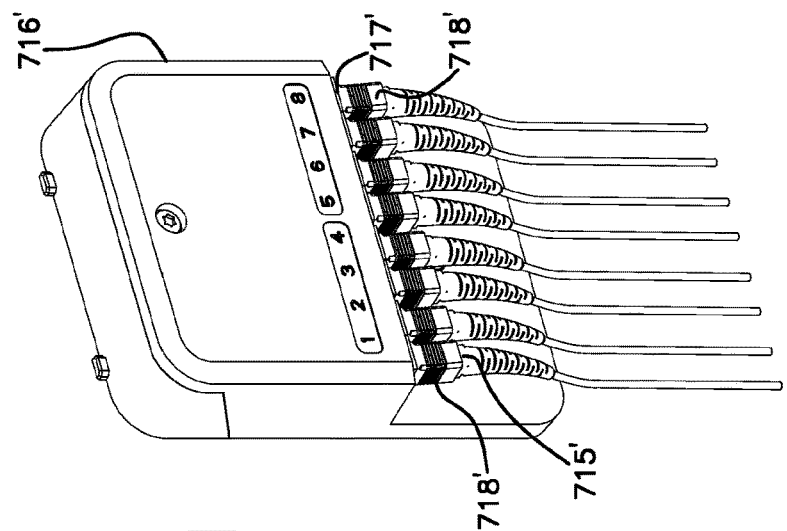
Figure 67:
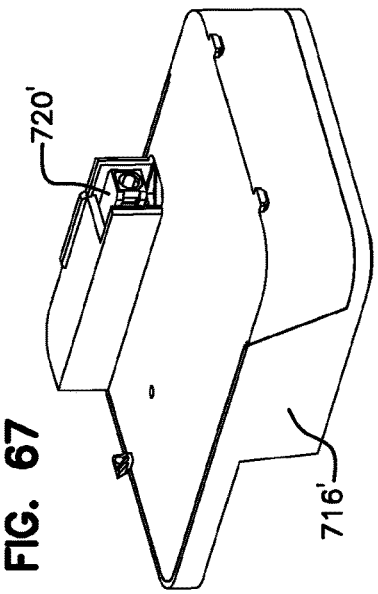
Figure 66:
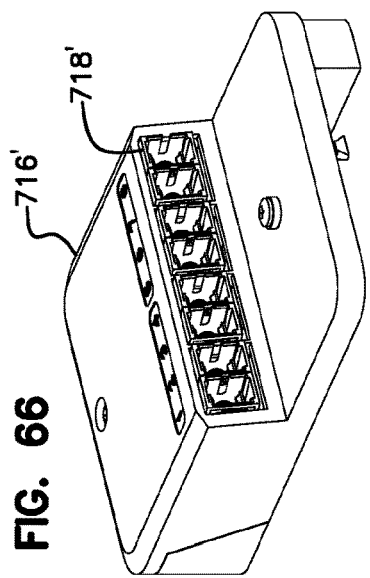
Figure 68:
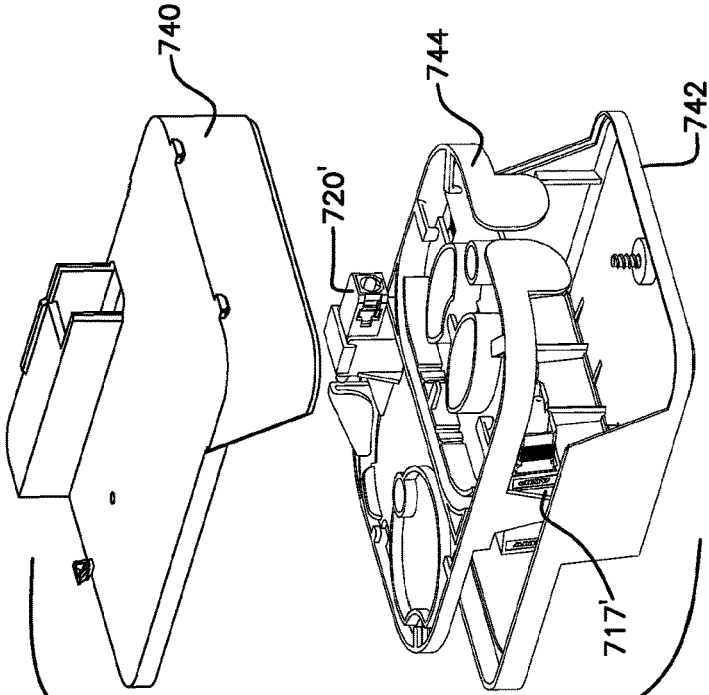

Referring now to FIG. 53, several of the splice cassettes 630 are shown pivoted upwardly to allow for access to a selected lower splice cassette 630. FIG. 53 also illustrates the feeder cable 634 which is an input to one or more of the splitters, and the output riser cables 638. Each of the feeder cable 634 and the riser cables 634 are spliced to connectorized pigtails which are connected through splitters 616, 624 as inputs, and outputs, respectively. In a further example, an external drop cable 646 can be provided for connection to one or more splitters 616, 624 as desired.

As shown in FIGS. 56-69, a fiber distribution terminal 700 includes a base 702, and an external cover 704. An internal cover 706 is positioned over a cable area 708 which covers a splice 710 and cable 711 from riser cable 709. A connector 712 extends from splice 710 and mates with adapter 714. Output connector 715 with cable connects to connector 712 to provide service to a single customer or outlet.

If additional customers or outlets are in need of service, a splitter 716 can be used instead of output connector 715. Splitter 716 includes a plurality of outputs 718 each with an output adapter 717 matable to an output connector 715 with cable.

A splitter input connector 720' is illustrated in the modified version of fiber distribution terminal 700' shown in FIGS. 62-69. Similar parts are noted with an apostrophe in FIGS. 62-69 relative to FIGS. 56-61. The splitter input connector 720 is on the rear of splitter 716 and not visible in FIGS. 56-61. Splitter 716 mounts with a sliding motion in the illustrated examples. Splitter 716 can be easily added after installation of terminal 700, when single service is no longer needed, and additional outputs are desired for servicing multiple customers or multiple units/outlets.

The splitter 716' of FIGS. 62-69 includes a base 740, a front cover 742, and an intermediate tray 744. Tray 744 holds output connector 720' and output adapters 717'.

Various features of splitters 716, 716' are noted. As shown the splitter-outputs are adapters, and the splitter-input is a connector.

The splitter output and splitter input are in the opposite direction in one implementation.

The input-adapter is placed in the base (not in splitter) to be able to add a single customer pigtail, if desired.

The splitter output is facing downwards, and the splitter-input is upwards in one implementation.

The pigtail for a single customer (in case of no splitter) is leaving the box at the bottom (same exit-direction as for pigtail exit in case of a splitter) in one implementation.

The splitter output adapters are placed generally in the center of the splitter module, in one implementation The splitter input connector is placed generally in the middle of the module but in a different height level; underneath the splitter out adapters in one implementation.

The output adapters of the splitter are placed vertically to keep the width small in one implementation.

The input connector is placed horizontally to keep height small in one implementation.

The pigtail boots clicked in the splitter out adapter (splitter out) are within the splitter footprint in one implementation.

The splitter has side bend-protection for the pigtail attached in the splitter adapter out ports in one implementation.

In one implementation, the width of the splitter is around 90 mm, the length is around 120 mm.

The adapters can be provided at a slight angle for extra access by the user in one implementation.

A sealing foam strip can be added to the splitter to close the pigtail opening between splitter and outer cover which can be added over the splitter like cover 704 in one implementation.

A fixating screw can be added to fix the splitter to the base; with the screw direction is aligned with the feeder-adapter mating direction in one implementation.

Figure 70:
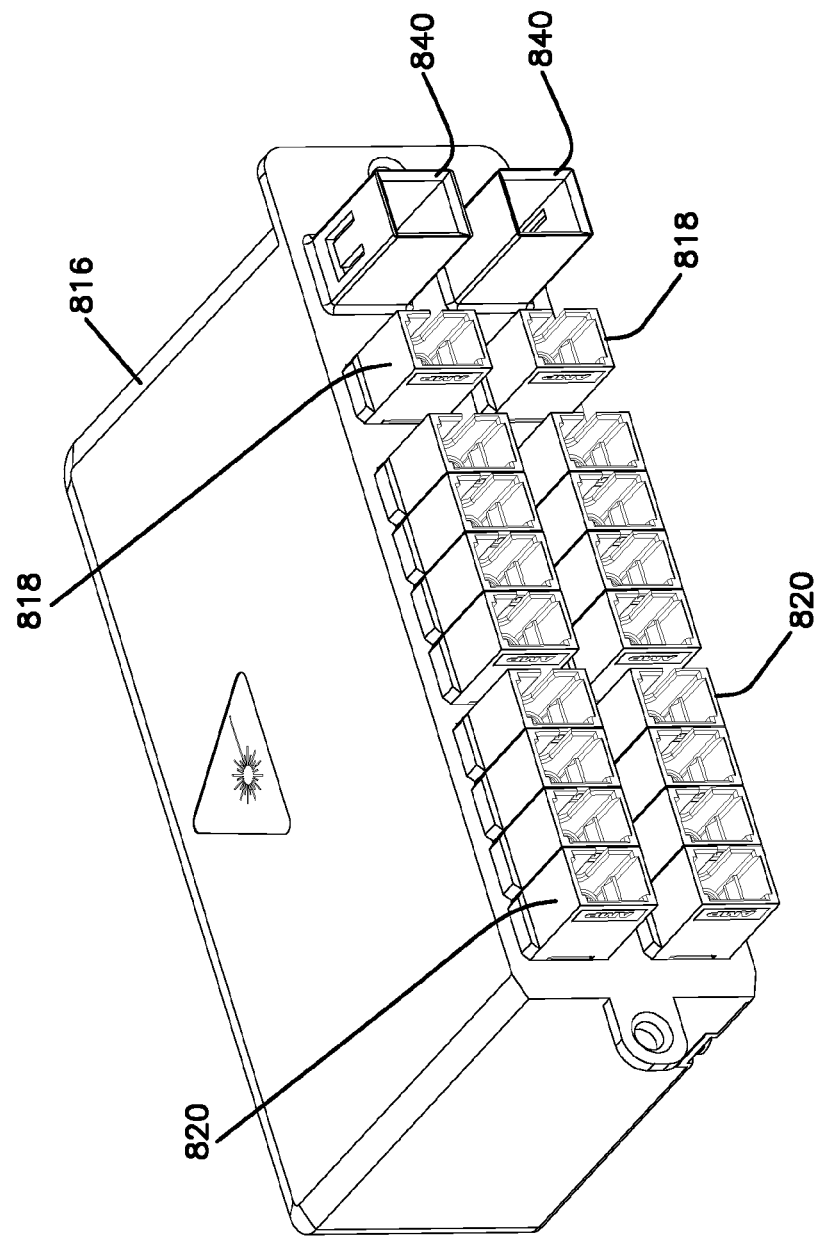
FIGS. 70 and 71 show a splitter module including connector storage for storage of a connectorized cable.
Figure 71:
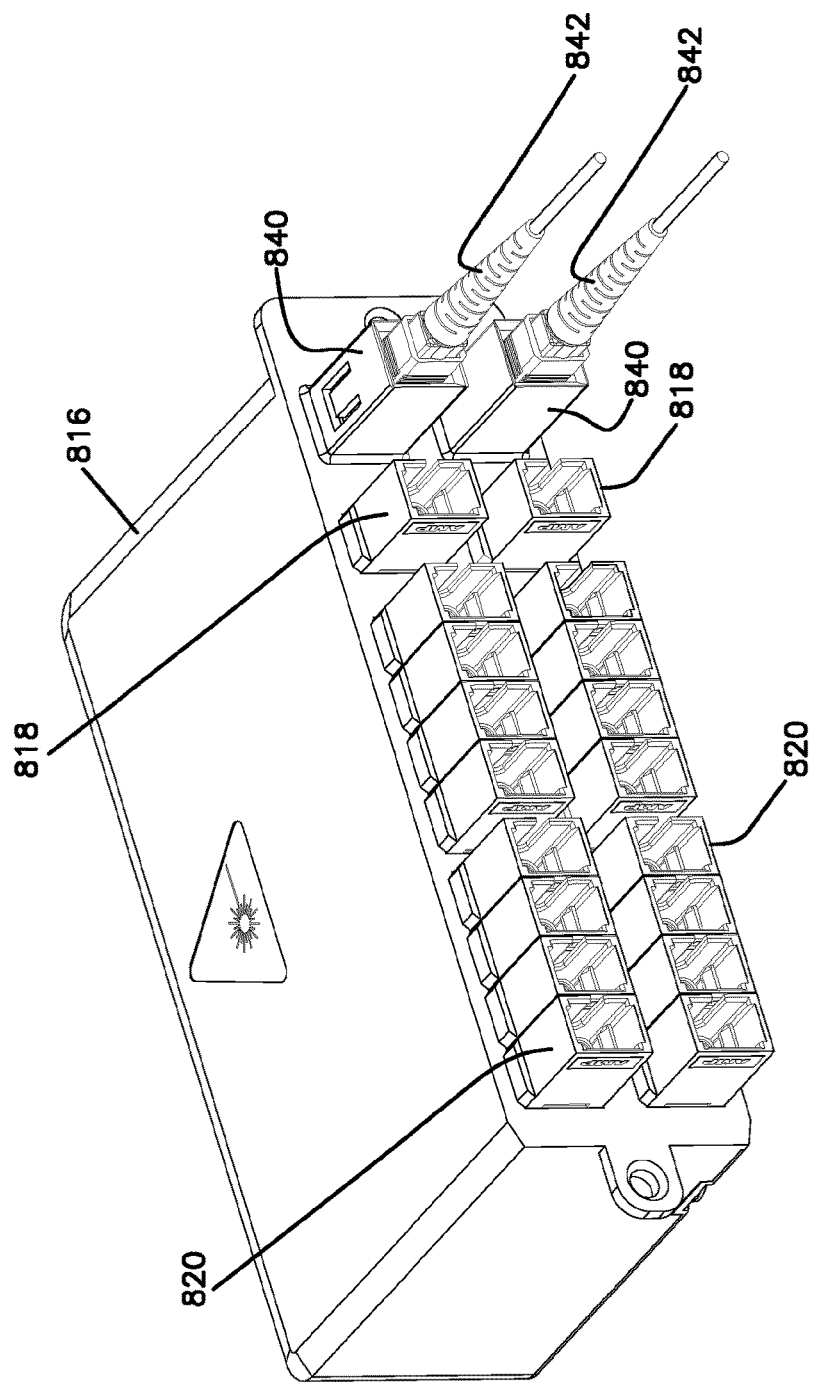

Referring now to FIGS. 70 and 71, splitter 816 includes inputs 818 in the form of adapters, and splitter outputs 820 in the form of adapters. Splitter 816 also includes one or more connector storage locations 840. Two locations 840 are shown for splitter 816. Each location 840 can store a connector 842 for later use as an output connector for outputs 820. Such a situation can occur if the connector or cable in one of outputs 820 becomes damaged. Connector 842 can be used to change out the damaged connector/cable and provide a ready to use back up signal path. Location 840 stores an end of connector 842 in a protective manner and also keeps it organized for a future deployment. Connector 842 is an extra pigtail of the riser cable in one example.

In one implementation, location 840 is located close to the central channel of the hub.

With the above systems, splitters can be mounted in a hub and/or in an MDU or floor box as desired. Various of the systems provide flexibility for adding splitters as needed after initial installation of the system. Various of the systems utilize splicing for adding pigtails to cables which are not preconnectorized. However, the above systems can be used with preconnectorized cables, in the case of feeder, riser, or other.

Various modifications and alterations of this disclosure will become apparent to those skilled in the art without departing from the scope and spirit of this disclosure, and it should be understood that the scope of this disclosure is not to be unduly limited to the illustrative examples set forth herein.

LIST OF REFERENCE NUMERALS AND CORRESPONDING FEATURES 10 fiber optic distribution system
12 multi-dwelling unit
12a-12d floors
14 a riser
20 fiber distribution hub
21 a service provider
22 feed fiber
24 a housing
26 optical splitters
30 fiber distribution terminals
40 fiber optic cables
40a, 40b first and second ends
50 patch cords
50a, 50b first and second connectorized ends
60 optical network terminals
70 optical splitter
71 splitter body
72 input region
74 output region
75 connection interface
90 cable assembly
92 splice pigtail
94 connectorized end
100 fiber distribution terminal
101 a housing
102 a base
104 a front cover
106 rotatable arrangement
108 axis of rotation
109 spindle
110 spool
112 drum portion
114 flange
120 management tray
121 base
122 aperture
123 channel 124 holding location
125 adapter
126 mounting interface
127 ports
130 optical splitter module
131 splitter body
132 input region
134 output region
135 adapter output port
140 optical splitter module
141 splitter body
142 input region
143 connectorized end
144 output region
145 adapter output port
200 alternative fiber distribution terminal
201 breakout region
202 base
203 channel
204 cover
205 pigtail passage
206 routing passage
207 spool
208 splice passage
209 splice holder
224 holding location
225 optical adapter
300 fiber distribution hub
302 enclosure
304 door
306 optical splitter
308 splice tray
310 splitter inputs
312 splitter tray
316 backing plate
320 cable routings
322 troughs
324 fingers
326 rings
328 input to splitter
330 outputs from splitter
332 fiber input
334 fiber output
400 fiber distribution hub
401 bottom
402 enclosure
403 front
405 back
406 splitter
407 side
408 splice region
409 side
410 splitter input
411 top
430 splitter output
500 fiber distribution hub
502 enclosure
503 front
504 cover
505 back
506 splitter
507 side
508 splice region
509 side
510 splitter input
530 splitter output
580 fanout
581 top
582 riser cable port
583 bottom
584 pigtail port
585 splice region
587 cable management spool
600 fiber distribution hub
602 enclosure
604 base part
606 cover
608 splitter area
610 cable management area
612 central channel
614 cable termination and splice tray area
616 first splitter
618 input
620 outputs
622 flanges
624 second splitter
626 splice tray
628 cable termination bracket
630 splice cassette
632 strength member termination device
634 feeder cable
636 pigtails
638 riser cable
640 pigtails
642 fasteners
644 recess
646 external drop cable
700 fiber distribution terminal
700' modified fiber distribution terminal
702 base
704 external cover
706 internal cover
708 cable area
709 riser
710 splice
711 cable
712 connector
714 adapter
715 output connector
716 splitter
717 output adapter
718 outputs
720 splitter input connector
740 base
742 front cover
744 intermediate tray
816 splitter
818 input to splitter
820 outputs from splitter
840 connector storage location
842 connector

What is claimed is:

1. A fiber distribution hub comprising:
an enclosure including a basepart and a cover, the basepart including a first major side, a second major side generally parallel to the first major side, a first minor side, and a second minor side oppositely disposed to the first minor side, wherein the first minor side and the second minor side extend generally perpendicularly between the first major side and the second major side;
wherein the basepart includes first and second splitter areas located adjacent each of the respective first and second minor sides of the basepart, each of the first and second splitter areas being located adjacent the second major side of the basepart, the basepart also including first and second cable management areas, the respective first and second cable management areas being located adjacent the respective first and second splitter areas, and a central channel defined between the first and second cable management areas, the central channel communicating with an upper cable termination and splice tray area, the upper cable termination and splice tray area being positioned adjacent to the first major side of the basepart;

a plurality of splitter modules located in each of the first and second splitter areas, each of the plurality of splitter modules including at least one input and a plurality of outputs in the form of adapters;

a plurality of splice trays located in the upper cable termination and splice tray area and separate from the plurality of splitter modules, each of the plurality of splice trays including integrated cable termination, wherein the splice trays each include a cable termination bracket and a pivotally mounted splice cassette for holding cable and splices, wherein cables entering and exiting the splice trays are terminated on the cable termination bracket, and wherein a riser cable or a feeder cable is connected at an outside portion of the cable termination bracket, and an opposite end of the cable termination bracket is connected to connectorized pigtails.

2. The fiber distribution hub of claim 1, wherein each splice cassette includes cable loop storage and cable splice holders.

3. The fiber distribution hub of claim 1, wherein the plurality of splice trays are provided in two columns, wherein the connectorized pigtails are positioned in the central channel.

4. The fiber distribution hub of claim 1, wherein the at least one input and a plurality of outputs in the form of adapters face a front of the hub.

5. The fiber distribution hub of claim 1, wherein pivot axes of the splice cassettes extend horizontally and transversely to the front of the hub.

6. The fiber distribution hub of claim 1, wherein axes of the cables entering the splice trays extend horizontally and transversely to the front of the hub.

7. The fiber distribution hub of claim 1, wherein the cable management area and the splitter area are formed together as one piece.

* * * * *